(12) United States Patent
Lin et al.

(10) Patent No.: US 11,719,911 B2
(45) Date of Patent: Aug. 8, 2023

(54) IMAGING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Yu-Chun Ke, Taichung (TW); Jin Sen Wang, Taichung (TW); Wei-Yu Chen, Taichung (TW); Chun-Yen Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 184 days.

(21) Appl. No.: 17/115,731

(22) Filed: Dec. 8, 2020

(65) Prior Publication Data

US 2021/0255429 A1   Aug. 19, 2021

Related U.S. Application Data

(63) Continuation-in-part of application No. 16/897,737, filed on Jun. 10, 2020.

(30) Foreign Application Priority Data

Feb. 14, 2020   (TW) .................................. 109104629

(51) Int. Cl.
*G02B 13/00* (2006.01)
*G02B 9/64* (2006.01)
(Continued)

(52) U.S. Cl.
CPC ........... *G02B 9/64* (2013.01); *G02B 13/0045* (2013.01); *G02B 13/02* (2013.01); *G02B 27/0025* (2013.01)

(58) Field of Classification Search
CPC ...... G02B 13/0045; G02B 9/64; G02B 13/04; G02B 13/0015; G02B 13/06; G02B 13/02; G02B 27/002; H04N 5/2254
See application file for complete search history.

(56) References Cited

U.S. PATENT DOCUMENTS

| 9,961,244 B2 | 5/2018 | Liao et al. |
| 2018/0196226 A1 | 7/2018 | Chang et al. |

(Continued)

FOREIGN PATENT DOCUMENTS

| CN | 204028445 | 12/2014 |
| CN | 107678133 A | 2/2018 |

(Continued)

OTHER PUBLICATIONS

Machine Translation of CN113126248A (Year: 2021).*

*Primary Examiner* — Darryl J Collins
*Assistant Examiner* — Matthew Y Lee
(74) *Attorney, Agent, or Firm* — Maschoff Brennan

(57) ABSTRACT

An imaging optical lens assembly includes seven lens elements which are, in order from an object side to an image side along an optical path: a first lens element, a second lens element, a third lens element, a fourth lens element, a fifth lens element, a sixth lens element and a seventh lens element. The third lens element with positive refractive power has an image-side surface being convex in a paraxial region thereof. The fourth lens element has negative refractive power. The fifth lens element has an object-side surface being concave in a paraxial region thereof. The sixth lens element with negative refractive power has an object-side surface being convex in a paraxial region thereof and an image-side surface being concave in a paraxial region thereof, and the image-side surface of the sixth lens element has at least one critical point in an off-axis region thereof.

38 Claims, 46 Drawing Sheets

(51) Int. Cl.
*G02B 13/02* (2006.01)
*G02B 27/00* (2006.01)

(56) References Cited

U.S. PATENT DOCUMENTS

| | | |
|---|---|---|
| 2018/0196235 A1 | 7/2018 | Chang et al. |
| 2019/0196151 A1 | 6/2019 | Chen et al. |
| 2020/0012078 A1 | 1/2020 | Kuo |
| 2020/0209554 A1* | 7/2020 | Ko ................. G02B 9/64 |
| 2021/0063704 A1* | 3/2021 | Son ................. H04N 5/2254 |
| 2021/0199926 A1* | 7/2021 | Xu ................. G02B 27/0025 |

FOREIGN PATENT DOCUMENTS

| | | | |
|---|---|---|---|
| CN | 107942487 A | 4/2018 | |
| CN | 108107550 A | 6/2018 | |
| CN | 109283665 A | 1/2019 | |
| CN | 109407278 A | 3/2019 | |
| CN | 109407280 A | 3/2019 | |
| CN | 110031956 A | 7/2019 | |
| CN | 110221402 A | 9/2019 | |
| CN | 210166555 U | 3/2020 | |
| CN | 111077652 A | 4/2020 | |
| CN | 113126248 A * | 7/2021 | ......... G02B 13/0045 |
| TW | I640798 B | 11/2018 | |
| TW | 201947274 A | 12/2019 | |
| WO | 2021/128064 A1 | 7/2021 | |
| WO | 2021/159406 A1 | 8/2021 | |

* cited by examiner

IMAGING OPTICAL LENS ASSEMBLY, IMAGE CAPTURING UNIT AND ELECTRONIC DEVICE

RELATED APPLICATIONS

This application is a continuation-in-part patent application of U.S. application Ser. No. 16/897,737, filed on Jun. 10, 2020, which claims priority to Taiwan Application 109104629, filed on Feb. 14, 2020, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

There are a total of seven lens elements in the imaging optical lens assembly. The third lens element with positive refractive power has an image-side surface being convex in a paraxial region thereof. The fourth lens element has negative refractive power. The fifth lens element has an object-side surface being concave in a paraxial region thereof. The sixth lens element with negative refractive power has an object-side surface being convex in a paraxial region thereof and an image-side surface being concave in a paraxial region thereof. The image-side surface of the sixth lens element has at least one critical point in an off-axis region thereof.

When a focal length of the imaging optical lens assembly is f, a focal length of the second lens element is f2, a focal length of the third lens element is f3, a curvature radius of an object-side surface of the first lens element is R1, a curvature radius of the object-side surface of the sixth lens element is R11, a curvature radius of the image-side surface of the sixth lens element is R12, an Abbe number of the second lens element is V2, and a refractive index of the second lens element is N2, the following conditions are satisfied:

$-0.60 < f/R1 < 1.10$;

$f3/f2 < 1.60$;

$(|R11|+|R12|)/f < 2.50$; and $30 < V2/N2$.

According to another aspect of the present disclosure, an imaging optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

There are a total of seven lens elements in the imaging optical lens assembly. The third lens element with positive refractive power has an image-side surface being convex in a paraxial region thereof. The fifth lens element has an object-side surface being concave in a paraxial region thereof. The sixth lens element with negative refractive power has an object-side surface being convex in a paraxial region thereof and an image-side surface being concave in a paraxial region thereof. The image-side surface of the sixth lens element has at least one critical point in an off-axis region thereof.

When a focal length of the imaging optical lens assembly is f, a focal length of the second lens element is f2, a focal length of the third lens element is f3, a curvature radius of an object-side surface of the first lens element is R1, a curvature radius of the object-side surface of the sixth lens element is R11, a curvature radius of the image-side surface of the sixth lens element is R12, an Abbe number of the second lens element is V2, and a refractive index of the second lens element is N2, the following conditions are satisfied:

$-0.60 < f/R1 < 0.50$;

$f3/f2 < 1.60$;

$(|R11|+|R12|)/f < 2.50$; and $30 < V2/N2$.

According to another aspect of the present disclosure, an imaging optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

There are a total of seven lens elements in the imaging optical lens assembly. The third lens element with positive refractive power has an image-side surface being convex in a paraxial region thereof. The fifth lens element has an object-side surface being concave in a paraxial region thereof. The sixth lens element with negative refractive power has an object-side surface being convex in a paraxial region thereof and an image-side surface being concave in a paraxial region thereof. The object-side surface of the sixth lens element has at least one critical point in an off-axis region thereof, and the image-side surface of the sixth lens element has at least one critical point in an off-axis region thereof.

When a focal length of the imaging optical lens assembly is f, a focal length of the third lens element is f3, a focal length of the fifth lens element is f5, a curvature radius of an object-side surface of the first lens element is R1, an Abbe number of the second lens element is V2, an Abbe number of the sixth lens element is V6, an Abbe number of the seventh lens element is V7, and a refractive index of the second lens element is N2, the following conditions are satisfied:

$f/R1<0.50;$ $f5/f3<1.20;$ $V7/V6<2.50;$ and $30<V2/N2.$

According to another aspect of the present disclosure, an imaging optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element.

There are a total of seven lens elements in the imaging optical lens assembly. The sixth lens element has an object-side surface being convex in a paraxial region thereof and an image-side surface being concave in a paraxial region thereof. The image-side surface of the sixth lens element has at least one critical point in an off-axis region thereof. At least one of an object-side surface and an image-side surface of at least one of the seven lens elements includes at least one freeform surface.

When an Abbe number of the second lens element is V2, an Abbe number of the sixth lens element is V6, an Abbe number of the seventh lens element is V7, a maximum field of view of the imaging optical lens assembly is FOV, and a refractive index of the second lens element is N2, the following conditions are satisfied:

$V7/V6<2.50;$ $100\ [\text{deg.}]<FOV<175\ [\text{deg.}];$ and $30<V2/N2.$

According to another aspect of the present disclosure, an image capturing unit includes one of the aforementioned imaging optical lens assemblies and an image sensor, wherein the image sensor is disposed on an image surface of the imaging optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
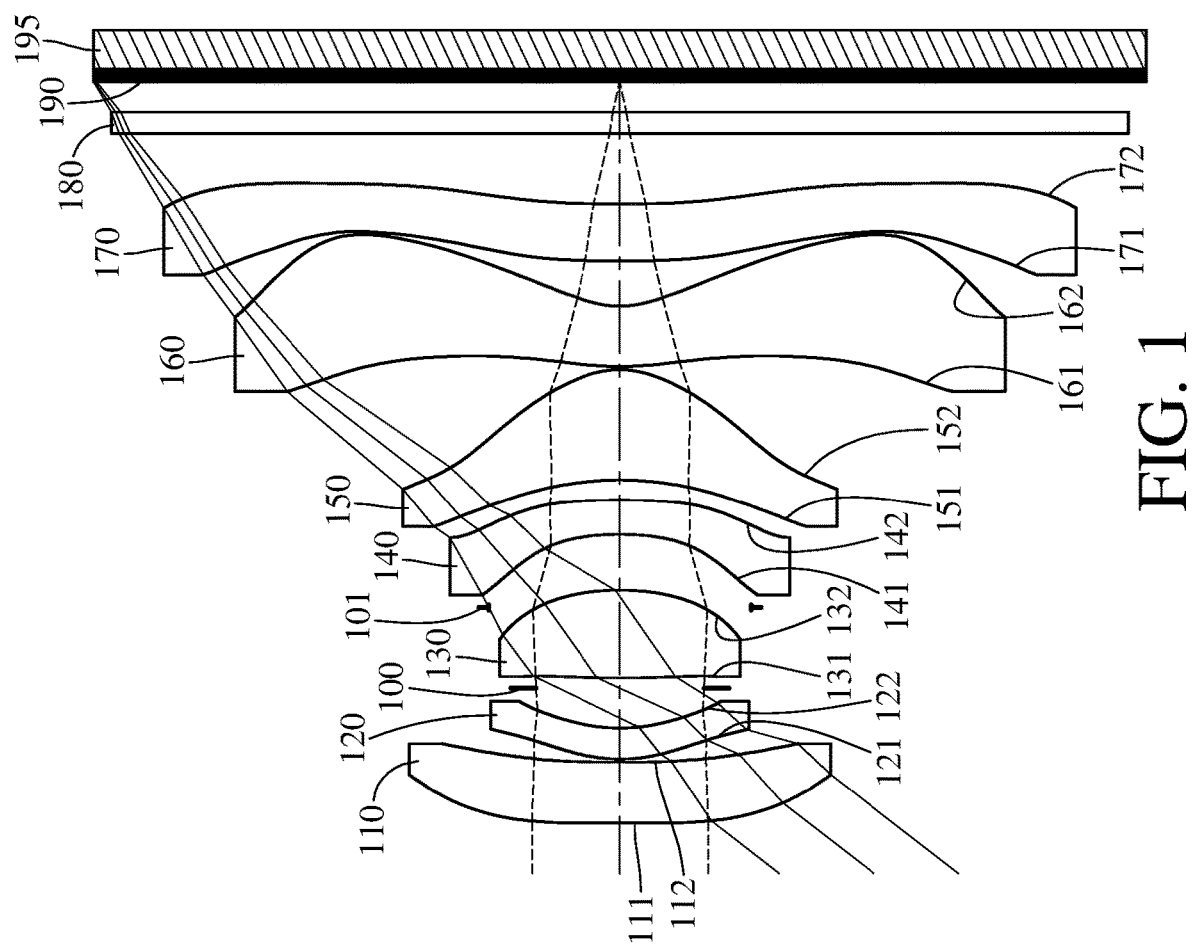
FIG. 1 is a cross-sectional view of an image capturing unit according to the 1st embodiment of the present disclosure.

An imaging optical lens assembly includes seven lens elements. The seven lens elements are, in order from an object side to an image side along an optical path, a first lens element, a second lens element, a third lens element, a fourth lens element, a fifth lens element, a sixth lens element and a seventh lens element. There are a total of seven lens elements in the imaging optical lens assembly.

According to the present disclosure, at least one of an object-side surface and an image-side surface of at least one of the seven lens elements can include at least one freeform surface. Therefore, it is favorable for reducing the size of the imaging optical lens assembly and correcting aberrations such as distortion; furthermore, capturing low-distortion images is favorable for the imaging optical lens assembly to be applicable to various applications, especially for wide field-of-view designs. In the present disclosure, a freeform surface (FFS) is a non-axisymmetric aspheric surface. Moreover, on a plane which is perpendicular to the optical axis and passes through an intersection point between a freeform surface and the optical axis, an intersection line between the freeform surface and the plane can be a shape which is not a straight line passing through the optical axis. Therefore, it is favorable for increasing the shape variation of the freeform surface so as to further correct aberrations.

The first lens element can have negative refractive power. Therefore, it is favorable for providing a wide-angle lens configuration to gather light from a large field of view. The first lens element can have an object-side surface being concave in a paraxial region thereof. Therefore, it is favorable for adjusting incident light path so as to improve image quality of wide field of view configuration.

The second lens element can have an object-side surface being convex in a paraxial region thereof. Therefore, it is favorable for collaborating with the first lens element to correct aberrations. The second lens element can have an image-side surface being concave in a paraxial region thereof. Therefore, it is favorable for correcting astigmatism.

The third lens element can have positive refractive power. Therefore, it is favorable for providing sufficient light convergence capability and reducing the total track length of the imaging optical lens assembly so as to achieve compactness. The third lens element can have an image-side surface being convex in a paraxial region thereof. Therefore, it is favorable for enhancing the light convergence capability of the third lens element.

The fourth lens element can have negative refractive power. Therefore, it is favorable for correcting aberrations so as to improve image quality.

The fifth lens element can have positive refractive power. Therefore, it is favorable for providing sufficient positive refractive power at the image side of the imaging optical lens assembly so as to reduce the size of the imaging optical lens assembly. The fifth lens element can have an object-side surface being concave in a paraxial region thereof. Therefore, it is favorable for adjusting the incident direction of light on the fifth lens element so as to reduce surface reflection, thereby reducing stray light.

The sixth lens element can have negative refractive power. Therefore, it is favorable for obtaining a proper back focal length. The sixth lens element has an object-side surface being convex in a paraxial region thereof. Therefore, it is favorable for correcting field curvature so as to improve peripheral image quality. The sixth lens element has an image-side surface being concave in a paraxial region thereof. Therefore, it is favorable for reducing the back focal length of the imaging optical lens assembly so as to achieve compactness.

Figure 28:
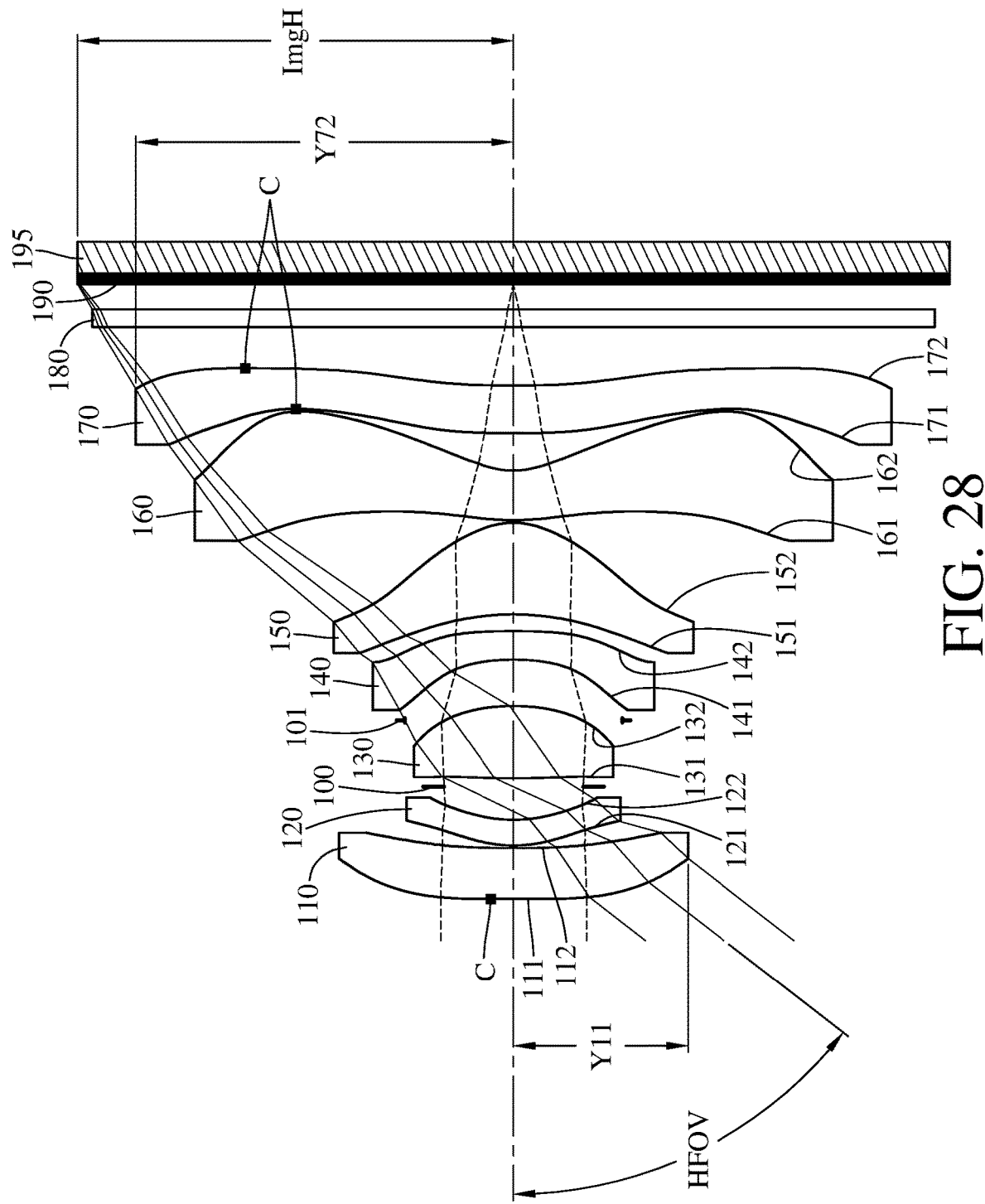
FIG. 28 shows a schematic view of HFOV, ImgH, Y11, Y72 and critical points of the first and sixth lens elements according to the 1st embodiment of the present disclosure.
Figure 29:
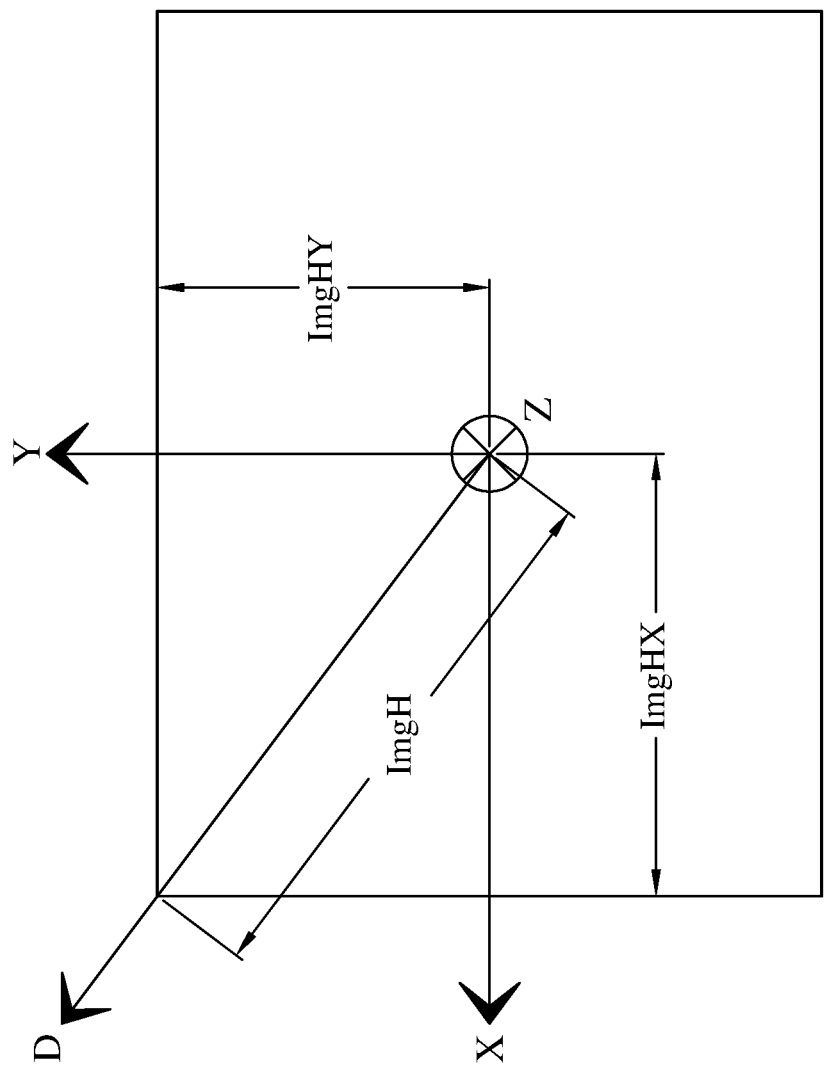
FIG. 29 shows a schematic view of an imaging area of an image sensor and ImgHX, ImgHY and ImgH according to one embodiment of the present disclosure.

According to the present disclosure, at least one of an object-side surface and an image-side surface of each of at least two of the seven lens elements can have at least one critical point in an off-axis region thereof. Therefore, it is favorable for further controlling the shape variation of the lens elements so as to improve peripheral image quality. Moreover, at least one of an object-side surface and an image-side surface of each of at least three of the seven lens elements can have at least one critical point in an off-axis region thereof. Moreover, at least one of an object-side surface and an image-side surface of each of at least four of the seven lens elements can have at least one critical point in an off-axis region thereof. Moreover, the object-side surface of the first lens element can have one convex critical point in an off-axis region thereof. Therefore, it is favorable for adjusting the incident angle of light at wide field of view so as to reduce surface reflection for increasing illuminance. Moreover, the object-side surface of the sixth lens element can have at least one critical point in an off-axis region thereof. Therefore, it is favorable for correcting off-axis aberrations so as to increase relative illuminance on an image surface. Moreover, the image-side surface of the sixth lens element has at least one critical point in an off-axis region thereof. Therefore, it is favorable for further improving peripheral image quality. Moreover, the at least one freeform surface can have at least one critical point within a maximum effective radius area in an off-axis region thereof. Therefore, it is favorable for correcting off-axis aberrations such as field curvature. Moreover, the at least one freeform surface can have at least one critical point within a maximum effective radius area in an off-axis region thereof along the Y-axis direction. Moreover, the at least one freeform surface can have at least one critical point within a maximum effective radius area in an off-axis region thereof along the X-axis direction. Please refer to FIG. 28, which shows a schematic view of critical points C of the first lens element 110 and the sixth lens element 160 in off-axis regions thereof according to the 1st embodiment of the present disclosure. The critical points on the object-side surface of the first lens element, and the object-side surface and the image-side surface of the sixth lens element in FIG. 28 are only exemplary. The other lens surfaces of the seven lens elements may also have one or more critical points. Said Y-axis direction is a direction corresponding to a width direction of a photosensitive area of an image sensor, and said X-axis direction is a direction corresponding to a length direction of the photosensitive area of the image sensor. For example, please refer to FIG. 29, which shows a schematic view of an imaging area of an image sensor and ImgHX, ImgHY and ImgH according to one embodiment of the present disclosure. In FIG. 29, the direction of light travelling into the image sensor on the optical axis is the positive Z-axis direction, the direction corresponding to the length of the photosensitive area of the image sensor is the X-axis direction, the direction corresponding to the width of the photosensitive area of the image sensor is the Y-axis direction, and the direction corresponding to the diagonal of the photosensitive area of the image sensor is a D direction. ImgHX is a maximum distance between the optical axis and an imaging position corresponding to the length direction X of the photosensitive area of the image sensor, ImgHY is a maximum distance between the optical axis and the imaging position corresponding to the width direction Y of the photosensitive area of the image sensor, and ImgH is a maximum distance between the optical axis and the imaging position corresponding to the diagonal direction D of the photosensitive area of the image sensor. In the example of FIG. 29, ImgH is a maximum image height of the imaging optical lens assembly (half of a diagonal length of the effective photosensitive area of the image sensor), but the present disclosure is not limited thereto.

When a focal length of the imaging optical lens assembly is f, and a curvature radius of the object-side surface of the first lens element is R1, the following condition can be satisfied: f/R1<0.50. Therefore, it is favorable for preventing the shape of the first lens element from being overly curved, thereby achieving compactness. Moreover, the following condition can also be satisfied: −0.60<f/R1<1.10. Moreover, the following condition can also be satisfied: −0.60<f/R1<0.50.

When a focal length of the second lens element is f2, and a focal length of the third lens element is f3, the following condition can be satisfied: f3/f2<1.60. Therefore, it is favorable for adjusting the refractive power of the second and third lens elements so as to reduce surface reflection and aberrations. Moreover, the following condition can also be satisfied: f3/f2<1.0.

When a curvature radius of the object-side surface of the sixth lens element is R11, a curvature radius of the image-side surface of the sixth lens element is R12, and the focal length of the imaging optical lens assembly is f, the following condition can be satisfied: (|R11|+|R12|)/f<2.50. Therefore, it is favorable for adjusting the shape and the refractive power of the sixth lens element so as to prevent image correction problems due to large differences in the refractive power of lens elements at the image side of the imaging optical lens assembly.

When the focal length of the third lens element is f3, and a focal length of the fifth lens element is f5, the following condition can be satisfied: f5/f3<1.20. Therefore, it is favorable for balancing the refractive power distribution of the imaging optical lens assembly so as to prevent excessive image corrections caused by an overly large refractive power variation on one side thereof.

When an Abbe number of the sixth lens element is V6, and an Abbe number of the seventh lens element is V7, the following condition can be satisfied: V7/V6<2.50. Therefore, it is favorable for the sixth lens element and the seventh lens element to correct chromatic aberration so as to improve peripheral image quality. Moreover, the following condition can also be satisfied: V7/V6<2.0. Moreover, the following condition can also be satisfied: 0.25<V7/V6<2.0.

When a maximum field of view of the imaging optical lens assembly is FOV, the following condition can be satisfied: 85 [deg.]<FOV<175 [deg.]. Therefore, it is favorable for enhancing the wide view-angle feature. Moreover, the following condition can also be satisfied: 95 [deg.]<FOV<175 [deg.]. Moreover, the following condition can also be satisfied: 100 [deg.]<FOV<175 [deg.].

When an Abbe number of the second lens element is V2, an Abbe number of the third lens element is V3, and a refractive index of the second lens element is N2, the following condition can be satisfied: 30<V2/N2. Therefore, a proper material selection of the second lens element is favorable for correcting aberrations generated by the first lens element. Moreover, the following condition can also be satisfied: 32<V2/N2<55. Moreover, the following condition can also be satisfied: 34<V2/N2<50.

When an f-number of the imaging optical lens assembly is Fno, the following condition can be satisfied: 0.80<Fno<2.40. Therefore, it is favorable for providing a large aperture so as to capture sufficient image data in low-light conditions (e.g., night-time) or in a short exposure time (e.g., dynamic photography). Furthermore, it is favorable for increasing imaging speed so as to achieve high image quality.

When an axial distance between the object-side surface of the first lens element and the image surface is TL, and the maximum image height of the imaging optical lens assembly is ImgH, the following condition can be satisfied: TL/ImgH<1.75. Therefore, it is favorable for providing a large field of view while miniaturizing the imaging optical lens assembly in the camera module. Please refer to FIG. 28, which shows a schematic view of ImgH according to the 1st embodiment of the present disclosure.

When the focal length of the imaging optical lens assembly is f, a curvature radius of an object-side surface of the seventh lens element is R13, and a curvature radius of an image-side surface of the seventh lens element is R14, the following condition can be satisfied: f/|R13|+f/|R14|<1.60. Therefore, it is favorable for adjusting the shape of the seventh lens element so as to correct off-axis aberrations and increase peripheral illuminance on the image surface, thereby obtaining a wide angle configuration with improved image quality.

When a curvature radius of an object-side surface of the third lens element is R5, and a curvature radius of the image-side surface of the third lens element is R6, the following condition can be satisfied: −0.40<(R5+R6)/(R5−R6). Therefore, it is favorable for adjusting the shape of the third lens element so as to have proper refractive power of the third lens element. Moreover, the following condition can also be satisfied: 0<(R5+R6)/(R5−R6)<2.0.

When an Abbe number of the first lens element is V1, the Abbe number of the second lens element is V2, and an Abbe number of the third lens element is V3, at least one of the following conditions can be satisfied: |V1−V2|<10; and |V3−V2|<10. Therefore, it is favorable for obtaining highly similar materials for the first, second and third lens elements so as to improve manufacturing planning and cost managements.

When the Abbe number of the first lens element is V1, the Abbe number of the second lens element is V2, the Abbe number of the third lens element is V3, an Abbe number of the fourth lens element is V4, an Abbe number of the fifth lens element is V5, the Abbe number of the sixth lens element is V6, the Abbe number of the seventh lens element is V7, an Abbe number of the i-th lens element is Vi, a refractive index of the first lens element is N1, the refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, and a refractive index of the i-th lens element is Ni, at least one lens element of the imaging optical lens assembly can satisfy the following condition: Vi/Ni<12.0, wherein i=1, 2, 3, 4, 5, 6 or 7. Therefore, a proper material selection of the lens elements is favorable for correcting chromatic aberration.

When a focal length of the first lens element is f1, and the focal length of the second lens element is f2, the following condition can be satisfied: 0.60<|f1/f2|<1.75. Therefore, it is favorable for providing the first and second lens elements with proper refractive power so as to enlarge the field of view.

When an axial distance between the second lens element and the third lens element is T23, and an axial distance between the third lens element and the fourth lens element is T34, the following condition can be satisfied: 0.75<T23/T34<3.0. Therefore, it is favorable for the third lens element to have sufficient axial distances from the second lens element and the fourth lens element so as to balance the viewing angle and the total track length of the imaging optical lens assembly.

When a curvature radius of an object-side surface of the fourth lens element is R7, and a curvature radius of an image-side surface of the fourth lens element is R8, the following condition can be satisfied: (R7+R8)/(R7−R8)<−0.50. Therefore, it is favorable for adjusting the shape of the fourth lens element so as to have proper refractive power of the fourth lens element.

When the Abbe number of the sixth lens element is V6, and the Abbe number of the seventh lens element is V7, the following condition can be satisfied: V6+V7<100. Therefore, it is favorable for the sixth lens element and the seventh lens element to correct chromatic aberration so as to improve peripheral image quality.

When the maximum image height of the imaging optical lens assembly is ImgH, the focal length of the imaging optical lens assembly is f, and half of the maximum field of view of the imaging optical lens assembly is HFOV, the following condition can be satisfied: 100×|[ImgH−f×tan(HFOV)]/[f×tan(HFOV)]|<10. Therefore, it is favorable for balancing among the size, field of view and image quality of the imaging optical lens assembly. Moreover, the following condition can also be satisfied: 100×|[ImgH−f×tan(HFOV)]/[f×tan(HFOV)]|<6. Moreover, the following condition can also be satisfied: 100×|[ImgH−f×tan(HFOV)]/[f×tan(HFOV)]|<4. Please refer to FIG. 28, which shows a schematic view of HFOV and ImgH according to the 1st embodiment of the present disclosure.

When the Abbe number of the first lens element is V1, the Abbe number of the second lens element is V2, and the Abbe number of the third lens element is V3, the following condition can be satisfied: 160<V1+V2+V3<250. Therefore, it is favorable for the materials of the lens elements to collaborate with one another for correcting aberrations. Moreover, the following condition can also be satisfied: 165<V1+V2+V3<220.

When the focal length of the imaging optical lens assembly is f, the curvature radius of the object-side surface of the first lens element is R1, and a curvature radius of an image-side surface of the first lens element is R2, the following condition can be satisfied: f/|R1|+f/|R2|<0.80. Therefore, it is favorable for having a proper shape of the first lens element with a wide field of view configuration.

When the focal length of the imaging optical lens assembly is f, the focal length of the first lens element is f1, and the focal length of the second lens element is f2, the following condition can be satisfied: |f/f1|+|f/f2|<0.85. Therefore, it is favorable for preventing overly large refraction angles due to overly strong refractive power of the first lens element and the second lens element; furthermore, it is favorable for providing a wide angle configuration. Moreover, the following condition can also be satisfied: |f/f1|+|f/f2|<0.50.

When a maximum effective radius of the image-side surface of the seventh lens element is Y72, and the focal length of the imaging optical lens assembly is f, the following condition can be satisfied: 1.05<Y72/f<1.75. Therefore, the size of the seventh lens element is favorable for compact electronic devices. Please refer to FIG. 28, which shows a schematic view of Y72 according to the 1st embodiment of the present disclosure.

When a maximum effective radius of the object-side surface of the first lens element is Y11, and the maximum effective radius of the image-side surface of the seventh lens element is Y72, the following condition can be satisfied: 0.4<Y11/Y72<1.50. Therefore, maintaining a proper configuration of effective photosensitive areas at the object side and at the image side of the imaging optical lens assembly is favorable for miniaturizing the imaging optical lens assembly with a large aperture. Please refer to FIG. 28, which shows a schematic view of Y11 and Y72 according to the 1st embodiment of the present disclosure.

Figure 30:
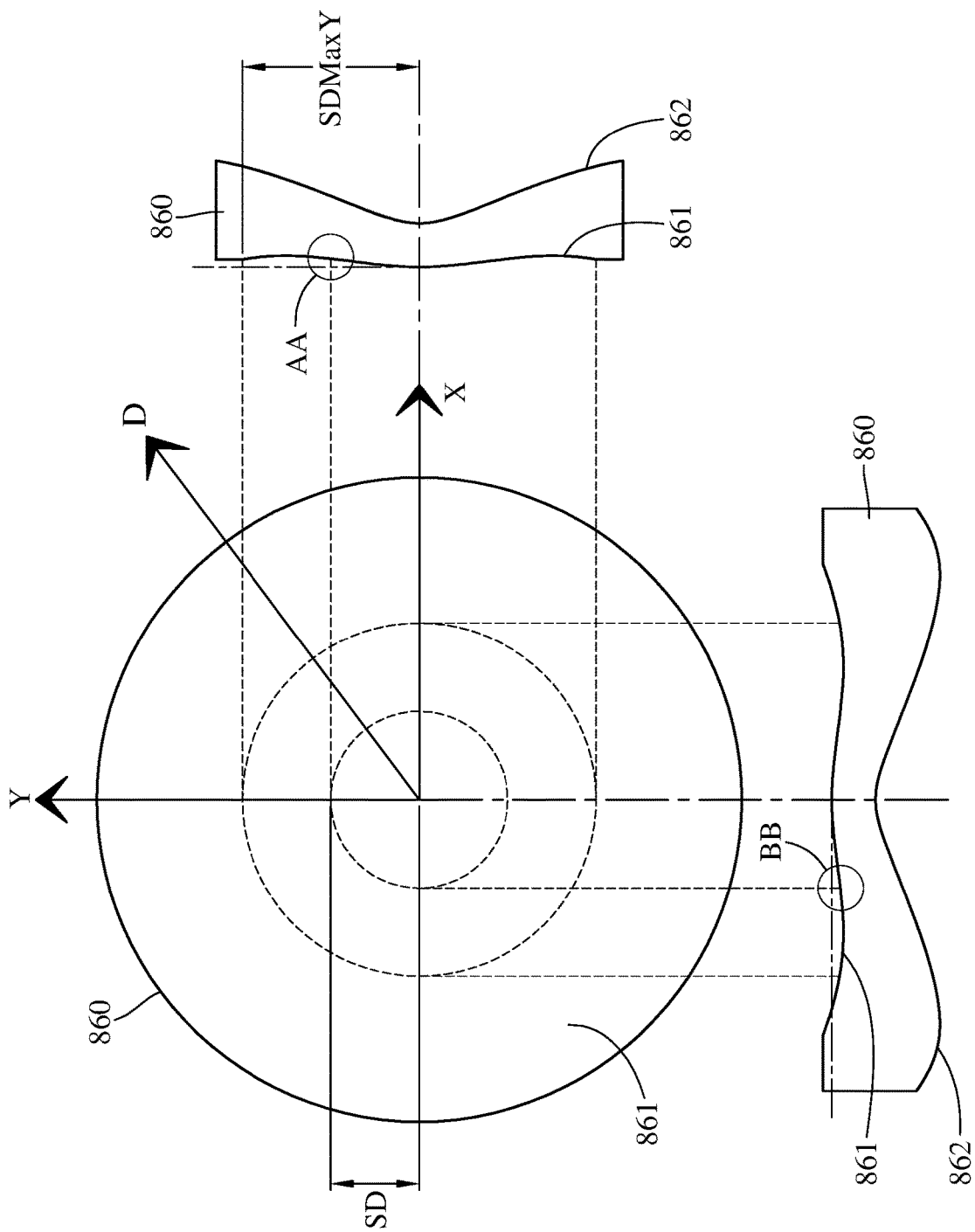
FIG. 30 shows a schematic view of SDMaxY, SD, a cross-sectional view of the sixth lens element corresponding to the width direction of the photosensitive area of the image sensor, a cross-sectional view of the sixth lens element corresponding to the length direction of the photosensitive area of the image sensor and a front view of the object-side surface of the sixth lens element according to the 8th embodiment of the present disclosure.
Figure 31:
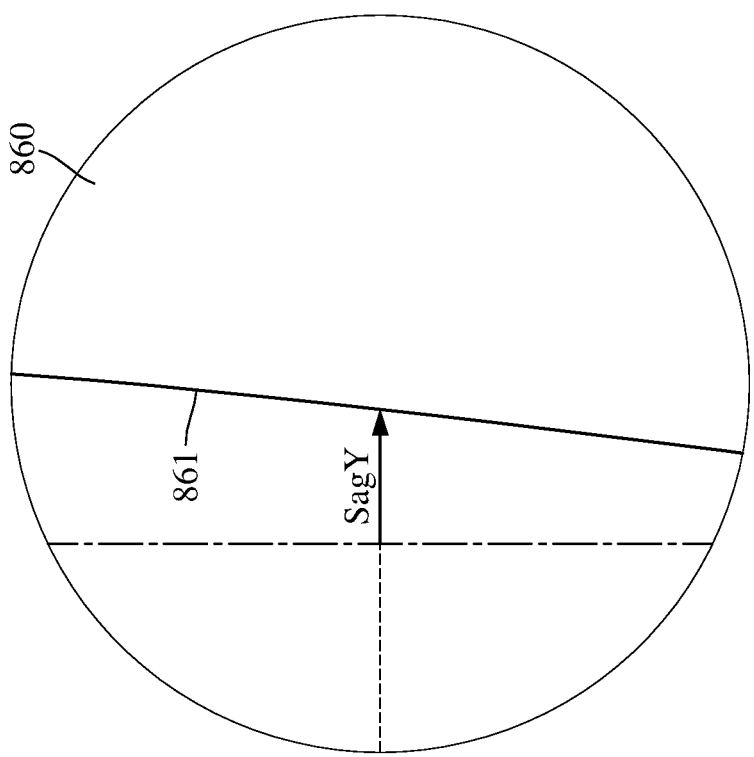
FIG. 31 shows a schematic view of SagY and an enlarged view of the region AA in FIG. 30.
Figure 32:
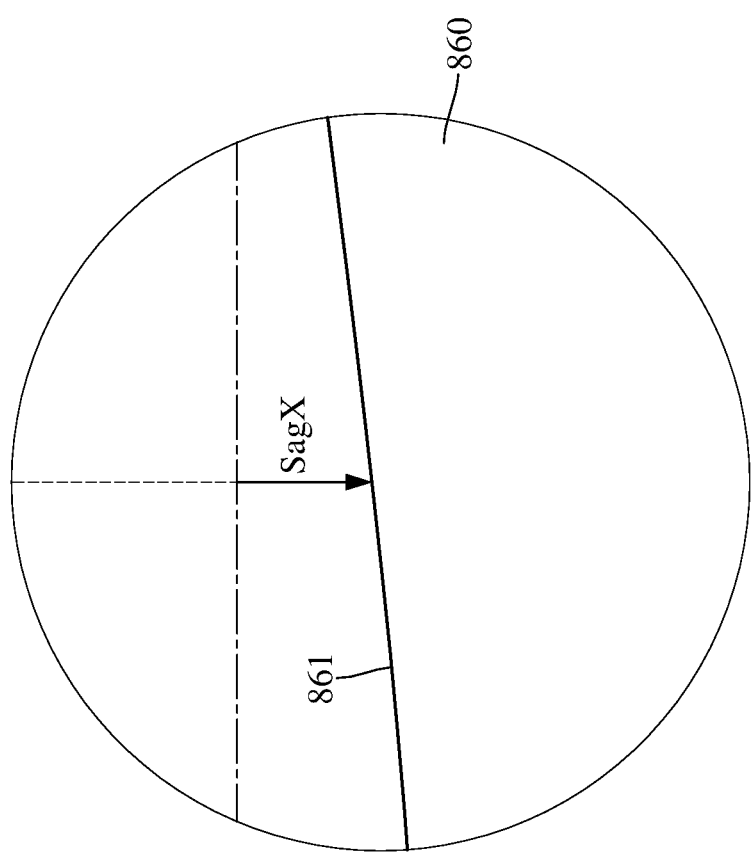
FIG. 32 shows a schematic view of SagX and an enlarged view of the region BB in FIG. 30.
Figure 33:
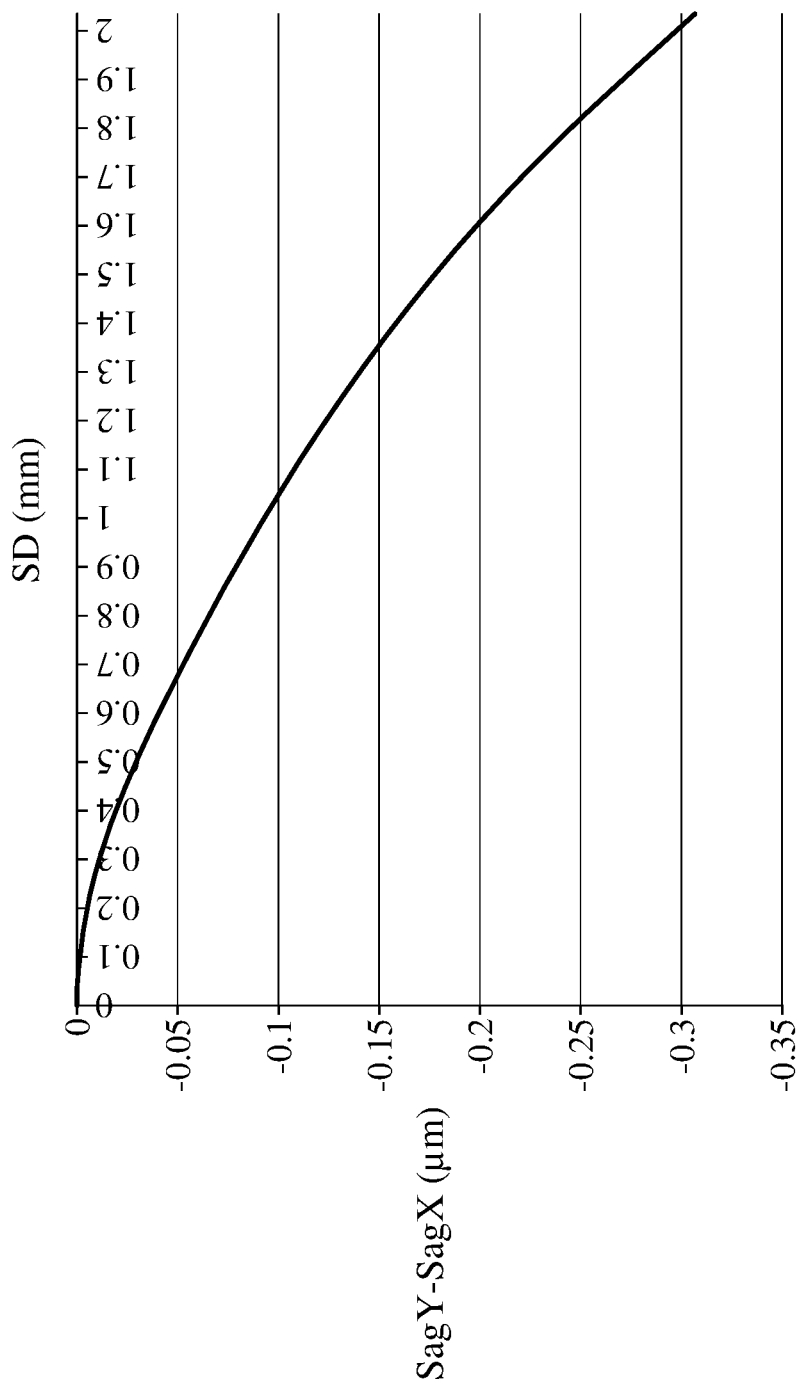
FIG. 33 is a data graph of SagY-SagX of the object-side surface of the sixth lens element according to the 8th embodiment of the present disclosure.

When an effective radius of one freeform surface in the Y-axis direction is SD, a displacement in parallel with the optical axis from an intersection point between the freeform surface and the optical axis to a point on the freeform surface at a distance of SD from the optical axis in the Y-axis direction is SagY, a displacement in parallel with the optical axis from the intersection point between the freeform surface and the optical axis to a point on the freeform surface at a distance of SD from the optical axis in an X-axis direction is SagX, and a maximum absolute difference between SagX and SagY is |DSagMax|, the at least one freeform surface of the imaging optical lens assembly can satisfy the following condition: 0.1 [um]<|DSagMax|. Therefore, it is favorable for increasing the shape variation of the freeform surface so as to further correct aberrations. In detail, a maximum effective radius of one freeform surface in the Y-axis direction is SDMaxY, the effective radius of the freeform surface in the Y-axis direction is SD (wherein 0≤SD≤SDMaxY), the displacement in parallel with the optical axis from the intersection point between the freeform surface and the optical axis to a point on the freeform surface at a distance of SD from the optical axis in the Y-axis direction is SagY, the displacement in parallel with the optical axis from the intersection point between the freeform surface and the optical axis to a point on the freeform surface at a distance of SD from the optical axis in the X-axis direction is SagX, an absolute difference between SagY and SagX is |SagY−SagX|, and a maximum value among all |SagY−SagX| within the maximum effective radius of SDMaxY on the freeform surface is |DSagMax|. Please refer to FIG. 30 to FIG. 33. FIG. 30 shows a schematic view of SDMaxY, SD, a cross-sectional view of the sixth lens element 860 corresponding to the width direction Y of the photosensitive area of the image sensor, a cross-sectional view of the sixth lens element 860 corresponding to the length direction X of the photosensitive area of the image sensor and a front view of the object-side surface 861 of the sixth lens element 860 according to the 8th embodiment of the present disclosure. FIG. 31 shows a schematic view of SagY and an enlarged view of the region AA in FIG. 30. FIG. 32 shows a schematic view of SagX and an enlarged view of the region BB in FIG. 30. FIG. 33 is a data graph of SagY-SagX of the object-side surface 861 of the sixth lens element 860 according to the 8th embodiment of the present disclosure. When the displacement from the intersection point between one freeform surface and the optical axis to a point at a distance of SD from the optical axis on the same surface is facing towards the image side of the imaging optical lens assembly, the value of displacement is positive; when the displacement from the intersection point between the freeform surface and the optical axis to a point at a distance of SD from the optical axis on the same surface is facing towards the object side of the imaging optical lens assembly, the value of displacement is negative. In FIG. 30, a maximum effective radius of the object-side surface 861 of the sixth lens element 860 in the Y-axis direction is SDMaxY. As seen in the front view of the object-side surface 861 of the sixth lens element 860, there is a value of displacement SagY at each point at a distance of 0 to SDMaxY from the optical axis on the object-side surface 861 of the sixth lens element 860 in the Y-axis direction, and there is a value of displacement SagX at each point at a distance of 0 to SDMaxY from the optical axis on the object-side surface 861 of the sixth lens element 860 in the X-axis direction. FIG. 31 and FIG. 32 respectively show SagY and SagX of points at a distance of SD from the optical axis on the object-side surface 861 of the sixth lens element 860. FIG. 33 shows the values of SagY-SagX at each point at a distance of 0 to SDMaxY from the optical axis on the object-side surface 861 of the sixth lens element 860. In FIG. 33, the horizontal axis represents the effective radius SD of the freeform surface in the Y-axis direction, and the vertical axis represents the values of SagY-SagX. |DSagMax| is the maximum value among the absolute values of all SagY-SagX of the freeform surface.

Figure 36:
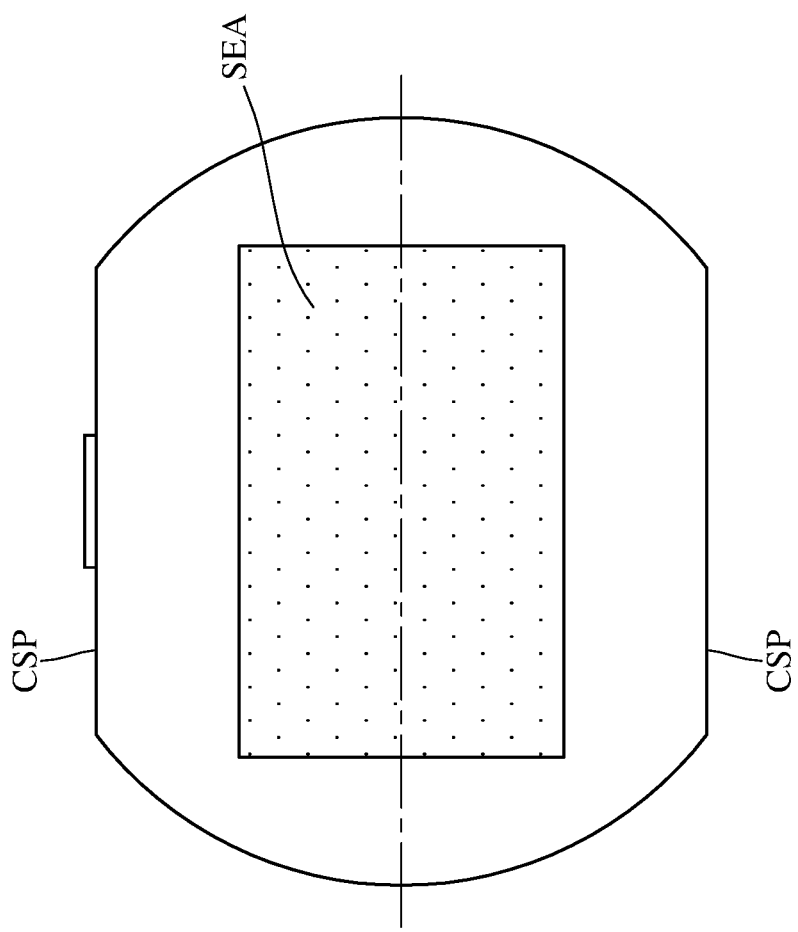
FIG. 36 is a schematic view of a configuration of one lens element according to one embodiment of the present disclosure.

According to the present disclosure, at least one lens surface of at least one of the seven lens elements of the imaging optical lens assembly can be non-circular. Therefore, it is favorable for properly reducing the size of the imaging optical lens assembly in accordance with the shape of the imaging area of the image sensor while providing high image quality. Moreover, the at least one non-circular lens surface can be substantially rectangular, and a ratio of a length to a width of the at least one substantially rectangular lens surface can range from 1.20 to 1.90. Please refer to FIG. 36, which shows one rectangular lens surface SEA of one lens element according to one embodiment of the present disclosure.

According to the present disclosure, at least one of the seven lens elements of the imaging optical lens assembly can have a positioning structure at a periphery thereof, and the positioning structure can include at least one pair of flat cut surfaces that are parallel to each other. Therefore, it is favorable for reducing one axial dimension of any single lens element so as to further miniaturize the imaging optical lens assembly. Please refer to FIG. 36, which shows one pair of flat cut surfaces CSP of one lens element according to one embodiment of the present disclosure.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the imaging optical lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof. In addition, unless otherwise stated, the aspheric surface in the embodiments refers to an axisymmetric aspheric surface, and the freeform surface in the embodiments refers to a non-axisymmetric aspheric surface.

According to the present disclosure, when the features and parameters (e.g., focal length of one single lens element, focal length of the imaging optical lens assembly, curvature radius of one lens surface and maximum effective radius of one lens surface) with axisymmetric properties or non-axisymmetric properties of the imaging optical lens assembly are not specifically defined, these features and parameters can be determined in the diagonal direction of the effective photosensitive area of the image sensor (the maximum image height direction).

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 37:
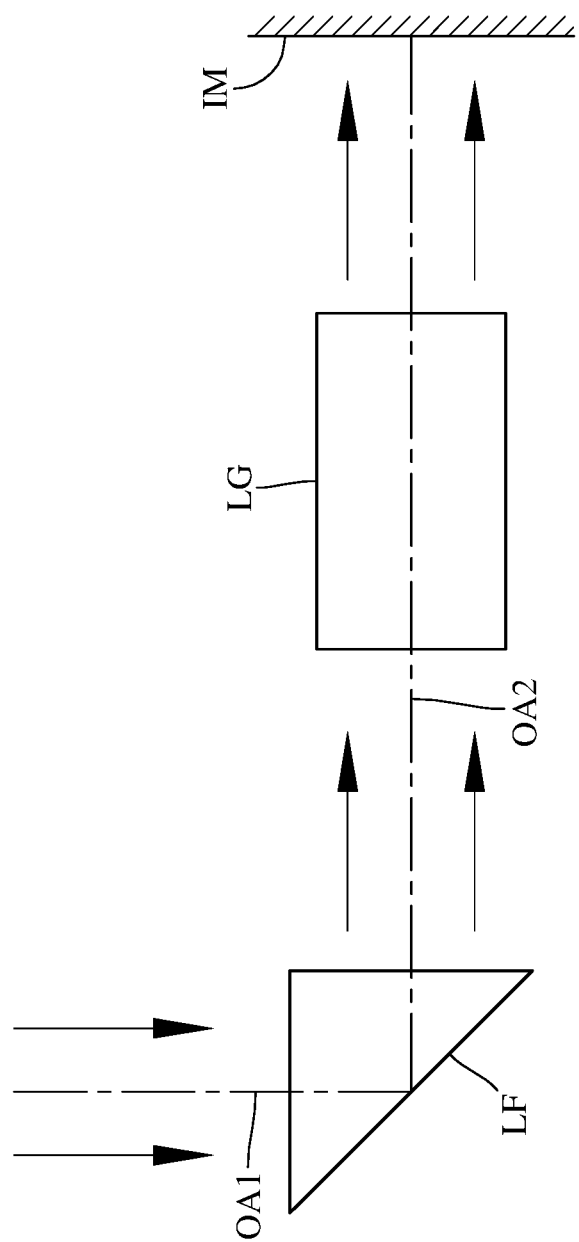
FIG. 37 shows a schematic view of a configuration of a light-folding element in an imaging optical lens assembly according to one embodiment of the present disclosure.
Figure 38:
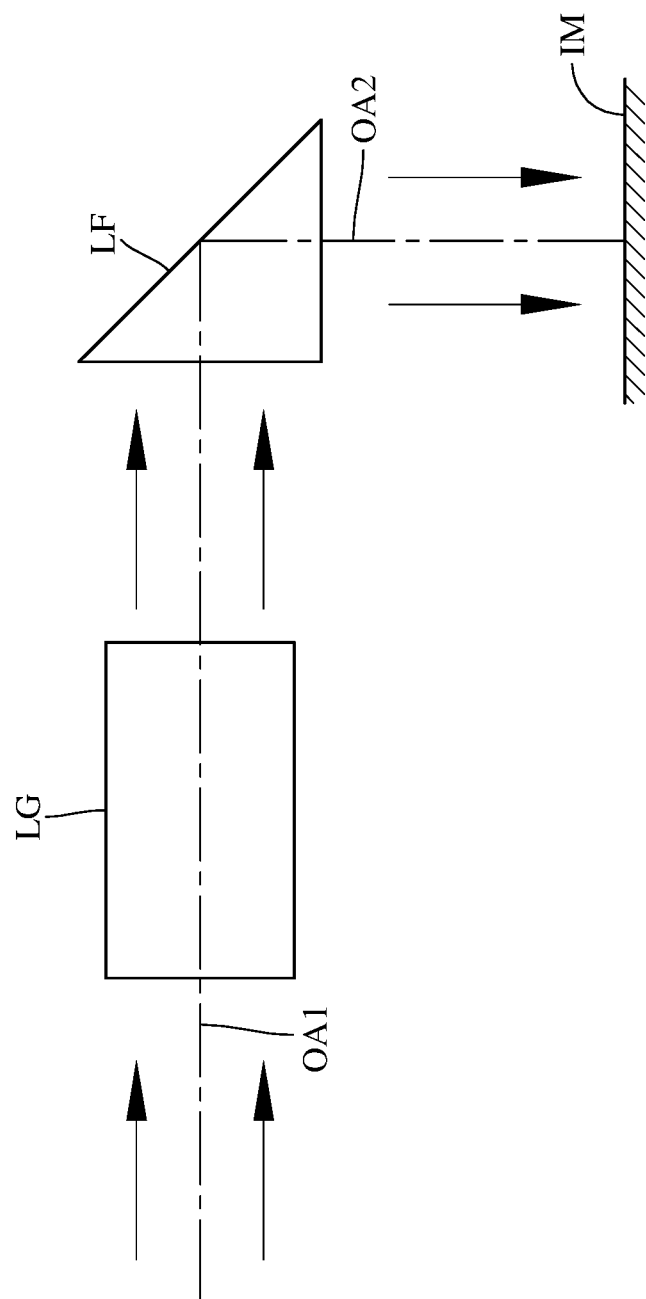
FIG. 38 shows a schematic view of another configuration of a light-folding element in an imaging optical lens assembly according to one embodiment of the present disclosure.
Figure 39:
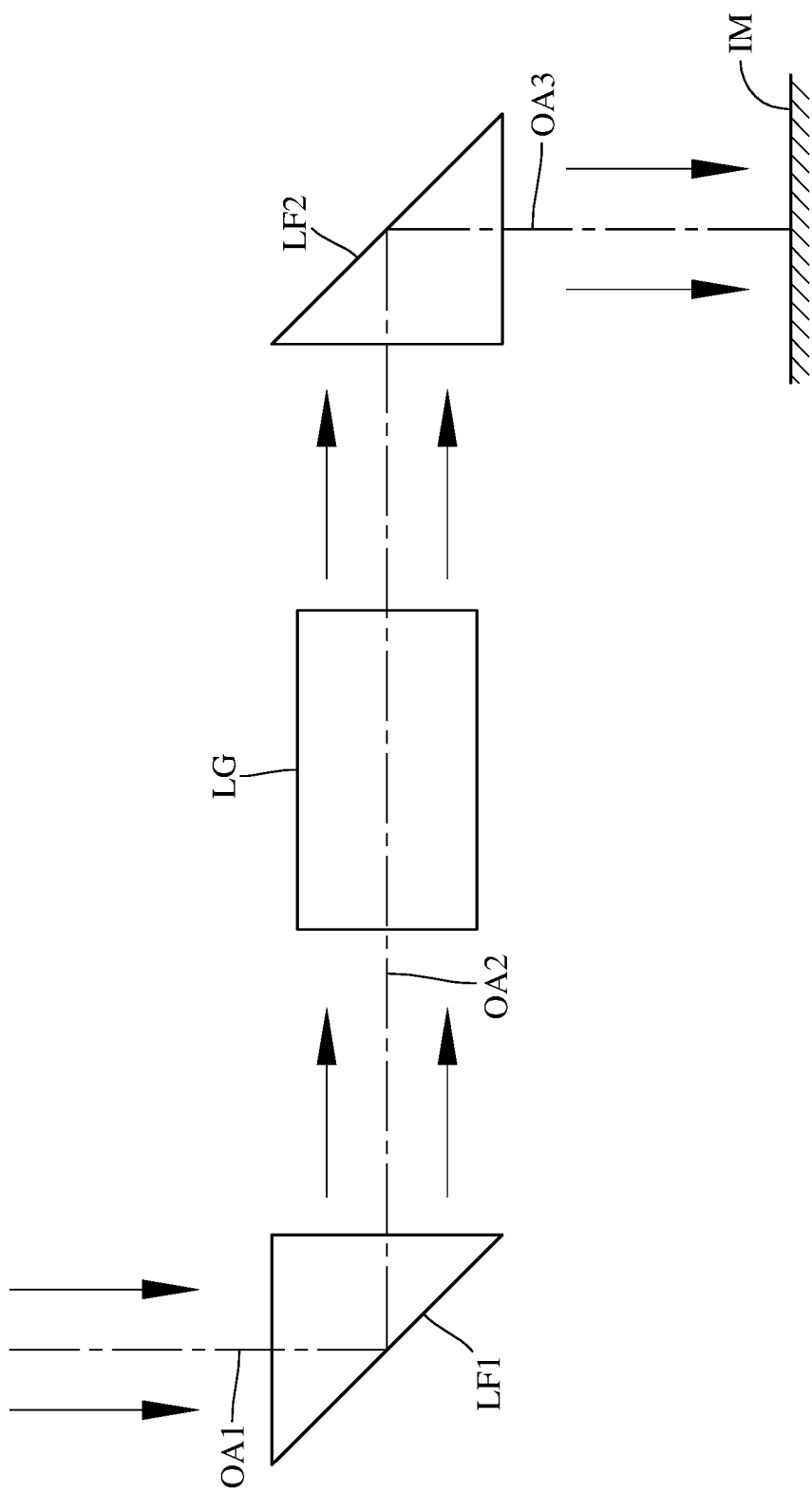
FIG. 39 shows a schematic view of a configuration of two light-folding elements in an imaging optical lens assembly according to one embodiment of the present disclosure.

According to the present disclosure, at least one light-folding element, such as a prism or a mirror, can be optionally disposed between an imaged object and the image surface on the imaging optical path, such that the imaging optical lens assembly can be more flexible in space arrangement, and therefore the dimensions of an electronic device is not restricted by the total track length of the imaging optical lens assembly. Specifically, please refer to FIG. 37 and FIG. 38. FIG. 37 shows a schematic view of a configuration of a light-folding element in an imaging optical lens assembly according to one embodiment of the present disclosure, and FIG. 38 shows a schematic view of another configuration of a light-folding element in an imaging optical lens assembly according to one embodiment of the present disclosure. In FIG. 37 and FIG. 38, the imaging optical lens assembly can have, in order from an imaged object (not shown in figures) to an image surface IM along an optical path, a first optical axis OA1, a light-folding element LF and a second optical axis OA2. The light-folding element LF can be disposed between the imaged object and a lens group LG of the imaging optical lens assembly as shown in FIG. 37 or disposed between a lens group LG of the imaging optical lens assembly and the image surface IM as shown in FIG. 38. Furthermore, please refer to FIG. 39, which shows a schematic view of a configuration of two light-folding elements in an imaging optical lens assembly according to one embodiment of the present disclosure. In FIG. 39, the imaging optical lens assembly can have, in order from an imaged object (not shown in figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens assembly, and the second light-folding element LF2 is disposed between the lens group LG of the imaging optical lens assembly and the image surface IM. The imaging optical lens assembly can be optionally provided with three or more light-folding elements, and the present disclosure is not limited to the type, amount and position of the light-folding elements of the embodiments disclosed in the aforementioned figures.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
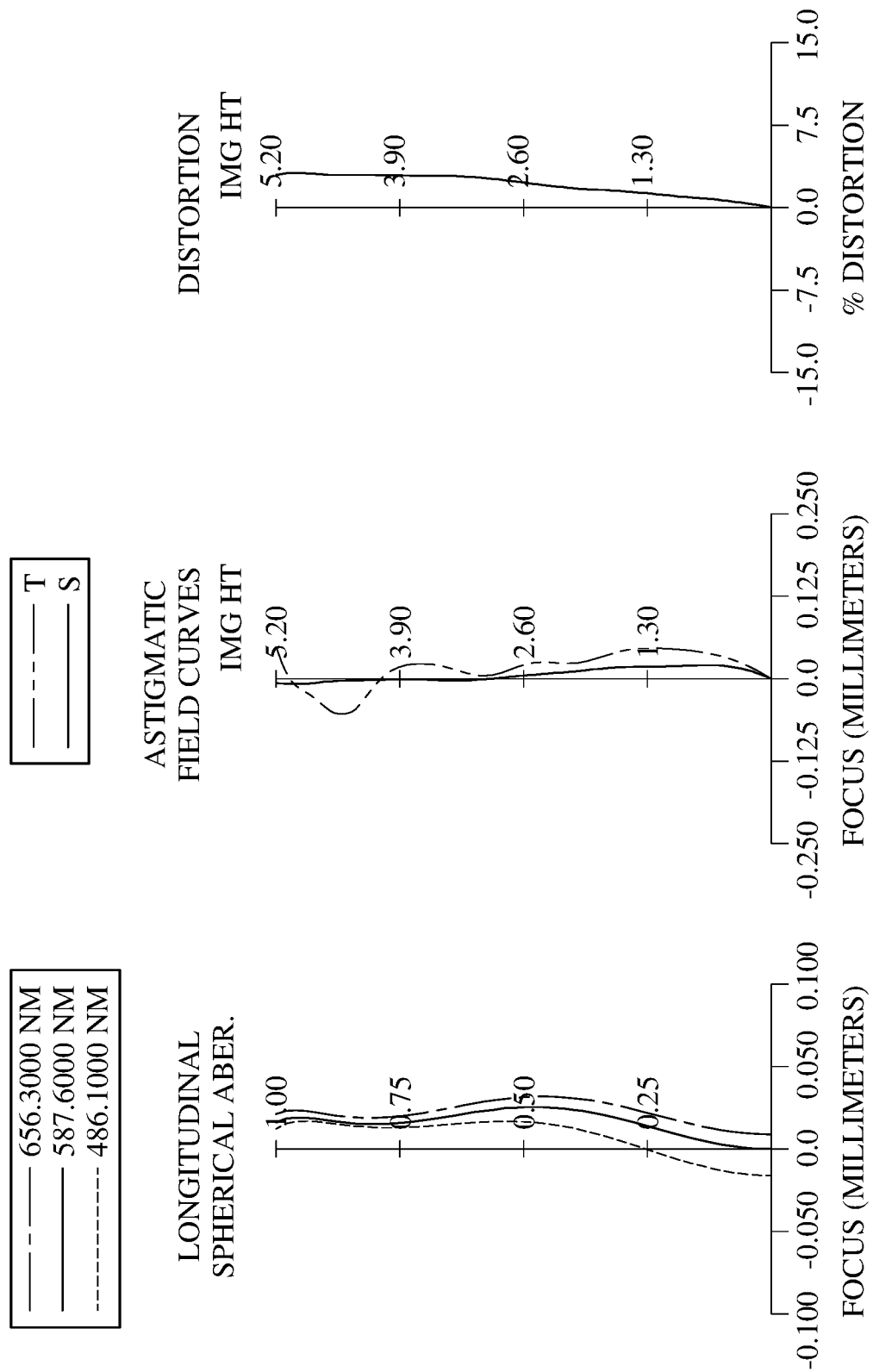
FIG. 2 shows spherical aberration curves, astigmatic field curves and a distortion curve of the image capturing unit according to the 1st embodiment.

FIG. 1 is a cross-sectional view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 195. The imaging optical lens assembly includes, in order from an object side to an image side along an optical path, a first lens element 110, a second lens element 120, an aperture stop 100, a third lens element 130, a stop 101, a fourth lens element 140, a fifth lens element 150, a sixth lens element 160, a seventh lens element 170, an IR-cut filter 180 and an image surface 190. The imaging optical lens assembly includes seven lens elements (110, 120, 130, 140, 150, 160 and 170) with no additional lens element disposed between each of the adjacent seven lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one convex critical point in an off-axis region thereof.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has at least one critical point in an off-axis region thereof.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The image-side surface 142 of the fourth lens element 140 has at least one critical point in an off-axis region thereof.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one critical point in an off-axis region thereof. The image-side surface 162 of the sixth lens element 160 has at least one critical point in an off-axis region thereof.

The seventh lens element 170 with positive refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has at least one critical point in an off-axis region thereof. The image-side surface 172 of the seventh lens element 170 has at least one critical point in an off-axis region thereof.

The IR-cut filter 180 is made of glass material and located between the seventh lens element 170 and the image surface 190, and will not affect the focal length of the imaging optical lens assembly. The image sensor 195 is disposed on or near the image surface 190 of the imaging optical lens assembly.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+(Ai)\times(Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22 and 24.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=3.90 millimeters (mm), Fno=2.23, HFOV=52.3 degrees (deg.).

When the maximum field of view of the imaging optical lens assembly is FOV, the following condition is satisfied: FOV=104.6 [deg.].

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, and a refractive index of the seventh lens element 170 is N7, the following conditions are satisfied: V1/N1=29.43;

V2/N2=19.00; V3/N3=36.26; V4/N4=12.29; V5/N5=36.26; V6/N6=25.95; and V7/N7=19.11.

When the Abbe number of the sixth lens element 160 is V6, and the Abbe number of the seventh lens element 170 is V7, the following condition is satisfied: V6+V7=70.7.

When the Abbe number of the sixth lens element 160 is V6, and the Abbe number of the seventh lens element 170 is V7, the following condition is satisfied: V7/V6=0.75.

When the focal length of the imaging optical lens assembly is f, and a curvature radius of the object-side surface 111 of the first lens element 110 is R1, the following condition is satisfied: f/R1=−0.12.

When the focal length of the imaging optical lens assembly is f, the curvature radius of the object-side surface 111 of the first lens element 110 is R1, and a curvature radius of the image-side surface 112 of the first lens element 110 is R2, the following condition is satisfied: f/|R1|+f/|R2|=0.28.

When a curvature radius of the object-side surface 131 of the third lens element 130 is R5, and a curvature radius of the image-side surface 132 of the third lens element 130 is R6, the following condition is satisfied: (R5+R6)/(R5−R6)=0.65.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=−1.92.

When a curvature radius of the object-side surface 161 of the sixth lens element 160 is R11, a curvature radius of the image-side surface 162 of the sixth lens element 160 is R12, and the focal length of the imaging optical lens assembly is f, the following condition is satisfied: (|R11|+|R12|)/f=1.00.

When the focal length of the imaging optical lens assembly is f, a curvature radius of the object-side surface 171 of the seventh lens element 170 is R13, and a curvature radius of the image-side surface 172 of the seventh lens element 170 is R14, the following condition is satisfied: f/|R13|+f/|R14|=0.38.

When an axial distance between the second lens element 120 and the third lens element 130 is T23, and an axial distance between the third lens element 130 and the fourth lens element 140 is T34, the following condition is satisfied: T23/T34=0.89. In this embodiment, an axial distance between two adjacent lens elements is a distance in a paraxial region between two adjacent lens surfaces of the two adjacent lens elements.

When an axial distance between the object-side surface 111 of the first lens element 110 and the image surface 190 is TL, and a maximum image height of the imaging optical lens assembly is ImgH, the following condition is satisfied: TL/ImgH=1.41.

When the maximum image height of the imaging optical lens assembly is ImgH, the focal length of the imaging optical lens assembly is f, and half of the maximum field of view of the imaging optical lens assembly is HFOV, the following condition is satisfied: 100×|[ImgH−f×tan(HFOV)]/[f×tan(HFOV)]|=3.15.

When a focal length of the first lens element 110 is f1, and a focal length of the second lens element 120 is f2, the following condition is satisfied: |f1/f2|=1.29.

When the focal length of the imaging optical lens assembly is f, the focal length of the first lens element 110 is f1, and the focal length of the second lens element 120 is f2, the following condition is satisfied: |f/f1|+|f/f2|=0.36. When the focal length of the second lens element 120 is f2, and a focal length of the third lens element 130 is f3, the following condition is satisfied: f3/f2=0.20.

When the focal length of the third lens element 130 is f3, and a focal length of the fifth lens element 150 is f5, the following condition is satisfied: f5/f3=0.52.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.46.

When the maximum effective radius of the image-side surface 172 of the seventh lens element 170 is Y72, and the focal length of the imaging optical lens assembly is f, the following condition is satisfied: Y72/f=1.16.

The detailed optical data of the 1st embodiment are shown in Table 1 and the aspheric surface data are shown in Table 2 below.

TABLE 1

1st Embodiment
f = 3.90 mm, Fno = 2.23, HFOV = 52.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −32.210 | (ASP) | 0.608 | Plastic | 1.556 | 45.8 | −24.61 |
| 2 | | 23.948 | (ASP) | 0.030 | | | | |
| 3 | Lens 2 | 1.600 | (ASP) | 0.308 | Plastic | 1.595 | 30.3 | 19.14 |
| 4 | | 1.728 | (ASP) | 0.394 | | | | |
| 5 | Ape. Stop | Plano | | 0.100 | | | | |
| 6 | Lens 3 | 11.592 | (ASP) | 0.871 | Plastic | 1.544 | 56.0 | 3.84 |
| 7 | | −2.484 | (ASP) | −0.171 | | | | |
| 8 | Stop | Plano | | 0.724 | | | | |
| 9 | Lens 4 | −2.965 | (ASP) | 0.343 | Plastic | 1.660 | 20.4 | −6.70 |
| 10 | | −9.404 | (ASP) | 0.199 | | | | |
| 11 | Lens 5 | −2.908 | (ASP) | 1.094 | Plastic | 1.544 | 56.0 | 2.01 |
| 12 | | −0.901 | (ASP) | 0.032 | | | | |
| 13 | Lens 6 | 3.024 | (ASP) | 0.595 | Plastic | 1.559 | 40.4 | −2.44 |
| 14 | | 0.873 | (ASP) | 0.450 | | | | |
| 15 | Lens 7 | 18.418 | (ASP) | 0.569 | Plastic | 1.583 | 30.2 | 156.63 |
| 16 | | 22.815 | (ASP) | 0.700 | | | | |
| 17 | IR-cut Filter | Plano | | 0.210 | Glass | 1.517 | 64.2 | — |

TABLE 1-continued

1st Embodiment
f = 3.90 mm, Fno = 2.23, HFOV = 52.3 deg.

| Surface # | | Curvature Radius | Thickness | Material | Index | Abbe # | Focal Length |
|---|---|---|---|---|---|---|---|
| 18 | | Plano | 0.300 | | | | |
| 19 | Image | Plano | 0.000 | | | | |

Note:
Reference wavelength is 587.6 nm (d-line).
An effective radius of the image-side surface 112 (Surface 2) is 1.760 mm.
An effective radius of the stop 101 (Surface 8) is 1.300 mm.

TABLE 2

Aspheric Coefficients

| | Surface # | | | | |
|---|---|---|---|---|---|
| | 1 | 2 | 3 | 4 | 6 |
| k = | −5.3951E+01 | −4.9692E+01 | −4.3353E+00 | −1.9773E+00 | 3.0291E+01 |
| A4 = | 6.9994E−02 | 7.0286E−02 | 4.4040E−02 | −3.0456E−02 | −1.7045E−02 |
| A6 = | −3.2349E−02 | −7.5009E−02 | −7.5594E−02 | 8.2750E−02 | 6.7735E−03 |
| A8 = | 1.4563E−02 | 5.9054E−02 | −3.3951E−02 | −2.8525E−01 | −5.9295E−02 |
| A10 = | −4.6199E−03 | −3.2838E−02 | 7.2065E−02 | 4.4265E−01 | 8.8206E−02 |
| A12 = | 9.6574E−04 | 1.2233E−02 | −3.1211E−02 | −3.2181E−01 | −9.0523E−02 |
| A14 = | −1.1701E−04 | −2.8858E−03 | 4.4650E−03 | 1.0971E−01 | 3.6675E−02 |
| A16 = | 6.0098E−06 | 3.8756E−04 | — | — | — |
| A18 = | — | −2.2446E−05 | — | — | — |

| | Surface # | | | | |
|---|---|---|---|---|---|
| | 7 | 9 | 10 | 11 | 12 |
| k = | 1.5985E+00 | 0.0000E+00 | 0.0000E+00 | −6.5663E−01 | −3.9842E+00 |
| A4 = | −3.9956E−02 | −1.3119E−01 | −3.1414E−01 | 9.8083E−02 | −1.6755E−01 |
| A6 = | −3.7368E−02 | −8.5361E−02 | −1.4031E−01 | −1.8982E−01 | 1.6079E−01 |
| A8 = | 8.9862E−02 | 1.8836E−01 | 1.8292E−01 | 1.5405E−01 | −1.4407E−01 |
| A10 = | −1.5419E−01 | −2.2163E−01 | −1.0764E−01 | −3.3586E−02 | 9.3140E−02 |
| A12 = | 1.4209E−01 | 1.9898E−01 | 2.7607E−02 | −2.9407E−02 | −3.7216E−02 |
| A14 = | −7.0113E−02 | −1.0762E−01 | 3.1943E−03 | 2.4773E−02 | 9.2101E−03 |
| A16 = | 1.3611E−02 | 3.1217E−02 | −3.9794E−03 | −8.1223E−03 | −1.3937E−03 |
| A18 = | — | −3.7791E−03 | 9.6893E−04 | 1.2922E−03 | 1.1868E−04 |
| A20 = | — | — | −8.2520E−05 | −8.2133E−05 | −4.3545E−06 |

| | Surface # | | | |
|---|---|---|---|---|
| | 13 | 14 | 15 | 16 |
| k = | −5.3024E+00 | −4.9875E+00 | −8.9976E+01 | 4.5475E+00 |
| A4 = | −9.8960E−02 | −3.4571E−02 | 5.4239E−02 | 4.3884E−02 |
| A6 = | 4.9794E−02 | 2.1625E−02 | −2.4608E−02 | −2.4312E−02 |
| A8 = | −1.6453E−02 | −1.0693E−02 | 5.4153E−03 | 6.8262E−03 |
| A10 = | 3.6715E−03 | 3.5906E−03 | −7.0721E−04 | −1.2376E−03 |
| A12 = | −5.5558E−04 | −8.2719E−04 | 6.2611E−05 | 1.5331E−04 |
| A14 = | 5.5845E−05 | 1.3250E−04 | −5.0144E−06 | −1.3113E−05 |
| A16 = | −3.5577E−06 | −1.4732E−05 | 4.2812E−07 | 7.6832E−07 |
| A18 = | 1.2986E−07 | 1.1082E−06 | −2.9749E−08 | −3.0110E−08 |
| A20 = | −2.0673E−09 | −5.3408E−08 | 1.3028E−09 | 7.5090E−10 |
| A22 = | — | 1.4798E−09 | −3.0834E−11 | −1.0725E−11 |
| A24 = | — | −1.7856E−11 | 2.9989E−13 | 6.6463E−14 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A24 represent the aspheric coefficients ranging from the 4th order to the 24th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
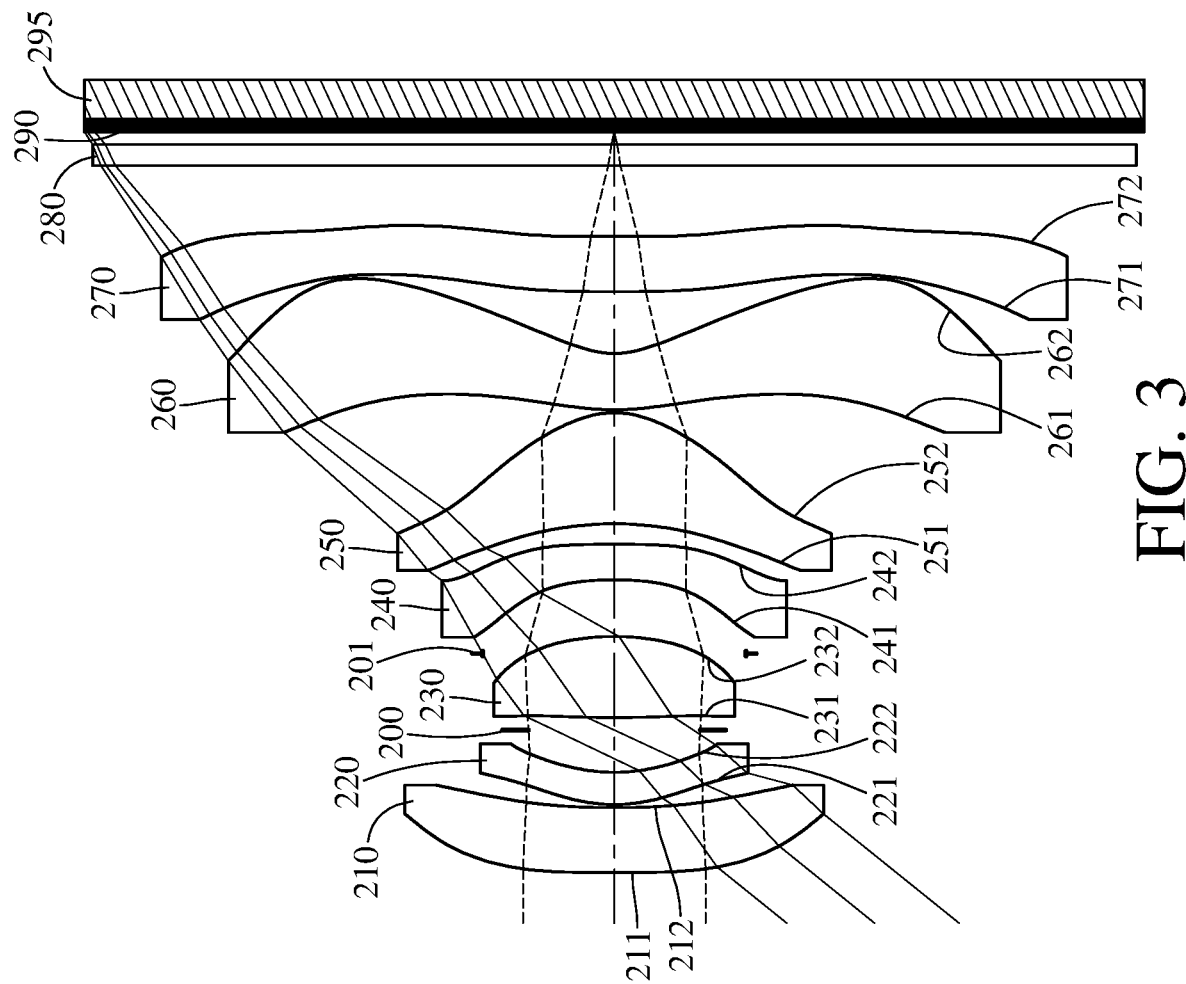
FIG. 3 is a cross-sectional view of an image capturing unit according to the 2nd embodiment of the present disclosure.
Figure 4:
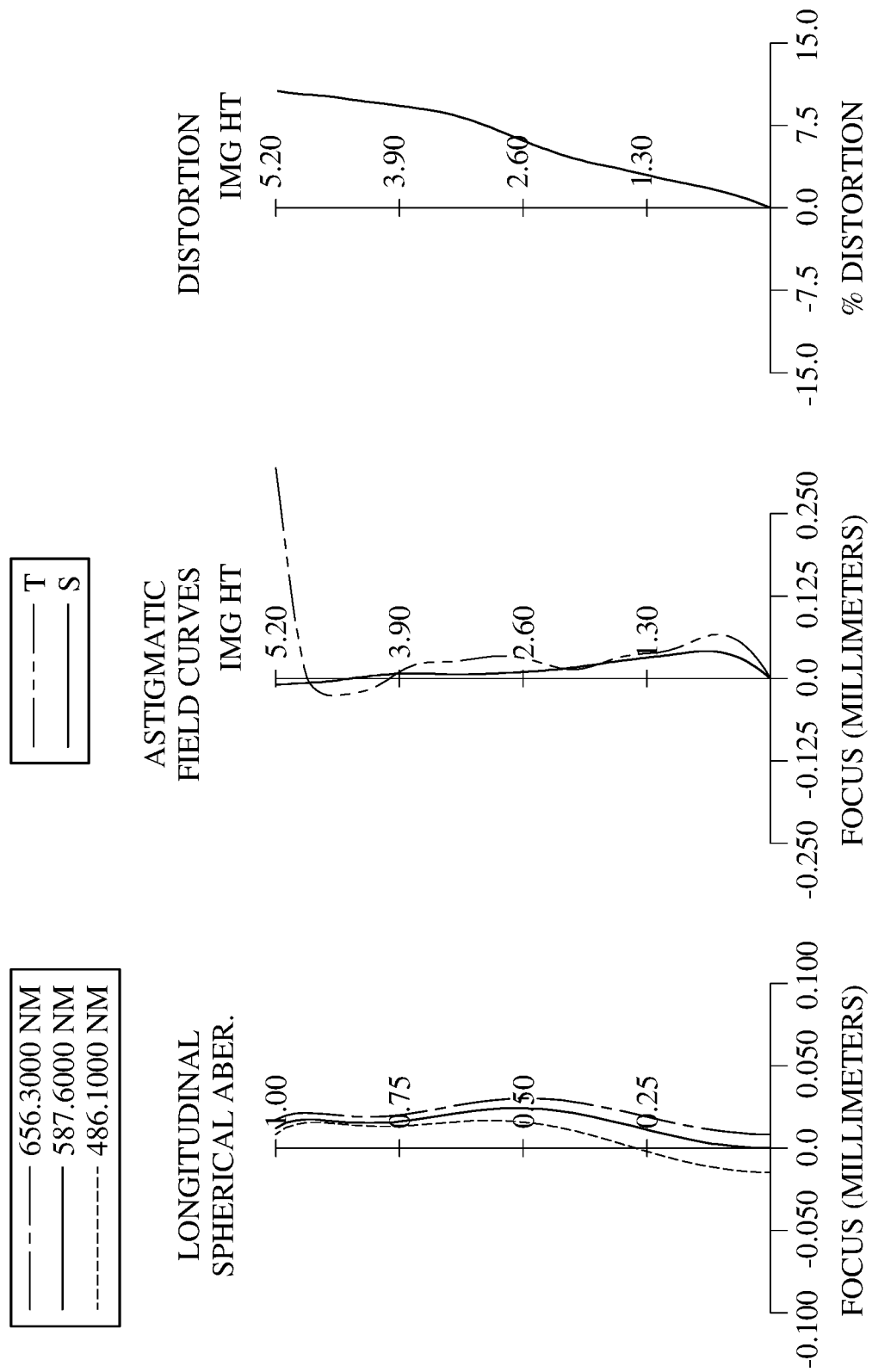
FIG. 4 shows spherical aberration curves, astigmatic field curves and a distortion curve of the image capturing unit according to the 2nd embodiment.

FIG. 3 is a cross-sectional view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 295. The imaging optical lens assembly includes, in order from an object side to an image side along an optical path, a first lens element 210, a second lens element 220, an aperture stop 200, a third lens element 230, a stop 201, a fourth lens element 240, a fifth lens element 250, a sixth lens element 260, a seventh lens element 270, an IR-cut filter 280 and an image surface 290. The imaging optical lens assembly includes seven lens elements (210, 220, 230, 240, 250, 260 and 270) with no additional lens element disposed between each of the adjacent seven lens elements.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has at least one critical point in an off-axis region thereof.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one critical point in an off-axis region thereof. The image-side surface 262 of the sixth lens element 260 has at least one critical point in an off-axis region thereof.

The seventh lens element 270 with positive refractive power has an object-side surface 271 being convex in a paraxial region thereof and an image-side surface 272 being convex in a paraxial region thereof. The seventh lens element 270 is made of plastic material and has the object-side surface 271 and the image-side surface 272 being both aspheric.

The IR-cut filter 280 is made of glass material and located between the seventh lens element 270 and the image surface 290, and will not affect the focal length of the imaging optical lens assembly. The image sensor 295 is disposed on or near the image surface 290 of the imaging optical lens assembly.

The detailed optical data of the 2nd embodiment are shown in Table 3 and the aspheric surface data are shown in Table 4 below.

TABLE 3

2nd Embodiment
f = 3.88 mm, Fno = 2.10, HFOV = 51.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 101.819 | (ASP) | 0.642 | Plastic | 1.544 | 56.0 | −21.58 |
| 2 | | 10.501 | (ASP) | 0.030 | | | | |
| 3 | Lens 2 | 1.577 | (ASP) | 0.319 | Plastic | 1.578 | 35.4 | 16.51 |
| 4 | | 1.749 | (ASP) | 0.416 | | | | |
| 5 | Ape. Stop | Plano | | 0.125 | | | | |
| 6 | Lens 3 | 11.607 | (ASP) | 0.801 | Plastic | 1.544 | 56.0 | 4.05 |
| 7 | | −2.657 | (ASP) | −0.168 | | | | |
| 8 | Stop | Plano | | 0.728 | | | | |
| 9 | Lens 4 | −3.480 | (ASP) | 0.353 | Plastic | 1.669 | 19.5 | −7.15 |
| 10 | | −13.304 | (ASP) | 0.202 | | | | |
| 11 | Lens 5 | −2.912 | (ASP) | 1.097 | Plastic | 1.544 | 56.0 | 1.91 |
| 12 | | −0.869 | (ASP) | 0.030 | | | | |
| 13 | Lens 6 | 2.621 | (ASP) | 0.556 | Plastic | 1.559 | 40.4 | −2.40 |
| 14 | | 0.820 | (ASP) | 0.611 | | | | |
| 15 | Lens 7 | 132.252 | (ASP) | 0.545 | Plastic | 1.603 | 28.5 | 92.08 |
| 16 | | −95.560 | (ASP) | 0.700 | | | | |
| 17 | IR-cut Filter | Plano | | 0.210 | Glass | 1.517 | 64.2 | — |
| 18 | | Plano | | 0.122 | | | | |
| 19 | Image | Plano | | 0.000 | | | | |

Note:
Reference wavelength is 587.6 nm (d-line).
An effective radius of the image-side surface 212 (Surface 2) is 1.760 mm.
An effective radius of the stop 201 (Surface 8) is 1.300 mm.

TABLE 4

Aspheric Coefficients

Surface #

|       | 1           | 2           | 3           | 4           | 6           |
|-------|-------------|-------------|-------------|-------------|-------------|
| k =   | 5.7768E+01  | −7.1202E+01 | −4.0322E+00 | −1.7777E+00 | 2.9478E+01  |
| A4 =  | 6.7372E−02  | 7.0328E−02  | 4.3957E−02  | −3.2268E−02 | −1.5386E−02 |
| A6 =  | −3.0032E−02 | −7.5410E−02 | −8.7033E−02 | 9.6194E−02  | −6.5825E−03 |
| A8 =  | 1.3827E−02  | 5.9549E−02  | −7.4022E−03 | −3.2500E−01 | −2.0899E−02 |
| A10 = | −4.4898E−03 | −3.3201E−02 | 4.5724E−02  | 5.1403E−01  | 3.4018E−02  |
| A12 = | 9.7376E−04  | 1.2343E−02  | −1.9780E−02 | −3.8796E−01 | −4.7819E−02 |
| A14 = | −1.2056E−04 | −2.9126E−03 | 2.6480E−03  | 1.3161E−01  | 2.2696E−02  |
| A16 = | 6.0008E−06  | 3.9476E−04  | —           | —           | —           |
| A18 = | —           | −2.3359E−05 | —           | —           | —           |

Surface #

|       | 7           | 9           | 10          | 11          | 12          |
|-------|-------------|-------------|-------------|-------------|-------------|
| k =   | 1.6669E+00  | 0.0000E+00  | 0.0000E+00  | −7.6488E−01 | −4.0601E+00 |
| A4 =  | −4.1637E−02 | −1.4175E−01 | −5.2288E−02 | 7.6981E−02  | −1.7264E−01 |
| A6 =  | −4.2036E−02 | −2.2538E−02 | −5.5104E−02 | −8.1663E−02 | 1.7092E−01  |
| A8 =  | 1.0466E−01  | 1.4128E−02  | 1.0257E−02  | −4.8825E−02 | −1.4827E−01 |
| A10 = | −1.7738E−01 | 5.8979E−02  | 8.1449E−02  | 1.7101E−01  | 8.9928E−02  |
| A12 = | 1.6078E−01  | −6.5512E−02 | −9.3739E−02 | −1.5354E−01 | −3.3411E−02 |
| A14 = | −7.8318E−02 | 3.4696E−02  | 5.0061E−02  | 7.1833E−02  | 7.6253E−03  |
| A16 = | 1.5226E−02  | −9.3894E−03 | −1.4740E−02 | −1.9143E−02 | −1.0575E−03 |
| A18 = | —           | 9.9279E−04  | 2.3335E−03  | 2.7608E−03  | 8.2262E−05  |
| A20 = | —           | —           | −1.5721E−04 | −1.6753E−04 | −2.7527E−06 |

Surface #

|       | 13          | 14          | 15          | 16          |
|-------|-------------|-------------|-------------|-------------|
| k =   | −4.2955E+00 | −4.7047E+00 | 9.0000E+01  | −9.0000E+01 |
| A4 =  | −9.6913E−02 | −3.8730E−02 | 6.5892E−02  | 6.4735E−02  |
| A6 =  | 5.0804E−02  | 2.3436E−02  | −4.0831E−02 | −3.8016E−02 |
| A8 =  | −1.8319E−02 | −1.0613E−02 | 1.4779E−02  | 1.1923E−02  |
| A10 = | 4.4280E−03  | 3.3597E−03  | −3.6958E−03 | −2.4636E−03 |
| A12 = | −7.1563E−04 | −7.5581E−04 | 6.4702E−04  | 3.4990E−04  |
| A14 = | 7.5916E−05  | 1.2039E−04  | −7.8889E−05 | −3.4291E−05 |
| A16 = | −5.0496E−06 | −1.3370E−05 | 6.6137E−06  | 2.3004E−06  |
| A18 = | 1.9032E−07  | 1.0032E−06  | −3.7182E−07 | −1.0341E−07 |
| A20 = | −3.0931E−09 | −4.8099E−08 | 1.3344E−08  | 2.9729E−09  |
| A22 = | —           | 1.3231E−09  | −2.7565E−10 | −4.9351E−11 |
| A24 = | —           | −1.5830E−11 | 2.4898E−12  | 3.5958E−13  |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.79 | f/|R1| + f/|R2| | 0.40 |
| Fno | 2.10 | (R5 + R6)/(R5 − R6) | 0.63 |
| HFOV [deg.] | 51.1 | (R7 + R8)/(R7 − R8) | −1.71 |
| FOV [deg.] | 102.2 | (|R11| + |R12|)/f | 0.91 |
| V1/N1 | 36.26 | f/|R13| + f/|R14| | 0.07 |
| V2/N2 | 22.43 | T23/T34 | 0.97 |
| V3/N3 | 36.26 | TL/ImgH | 1.41 |
| V4/N4 | 11.65 | 100 × |[ImgH − f × tan(HFOV)]/[f × tan(HFOV)]| | 10.80 |
| V5/N5 | 36.26 | |f1/f2| | 1.31 |
| V6 + V7 | 68.9 | |f/f1| + |f/f2| | 0.40 |
| V6/N6 | 25.95 | f3/f2 | 0.25 |
| V7/V6 | 0.70 | f5/f3 | 0.47 |

-continued

| 2nd Embodiment | | | |
|---|---|---|---|
| V7/N7 | 17.78 | Y11/Y72 | 0.46 |
| f/R1 | 0.04 | Y72/f | 1.18 |

3rd Embodiment

Figure 5:
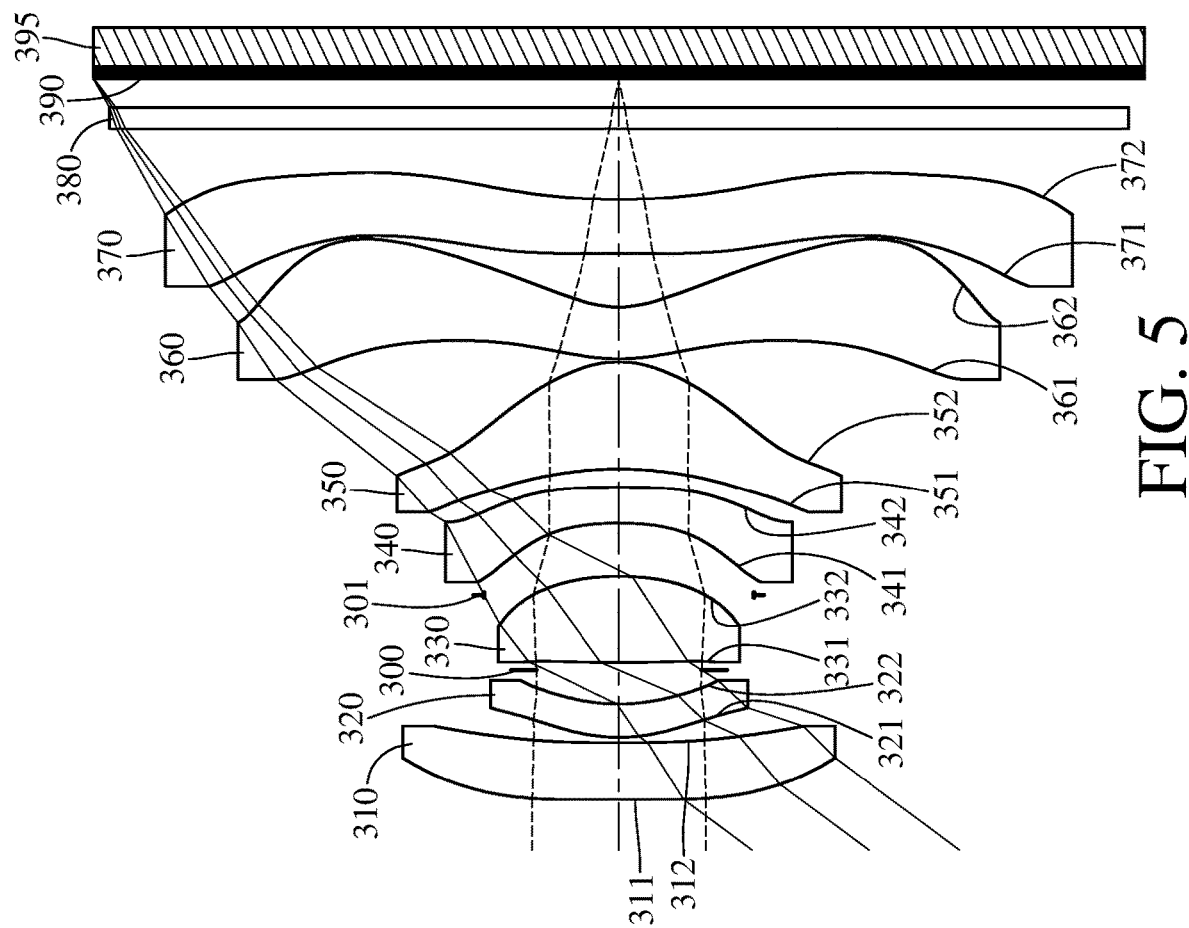
FIG. 5 is a cross-sectional view of an image capturing unit according to the 3rd embodiment of the present disclosure.
Figure 6:
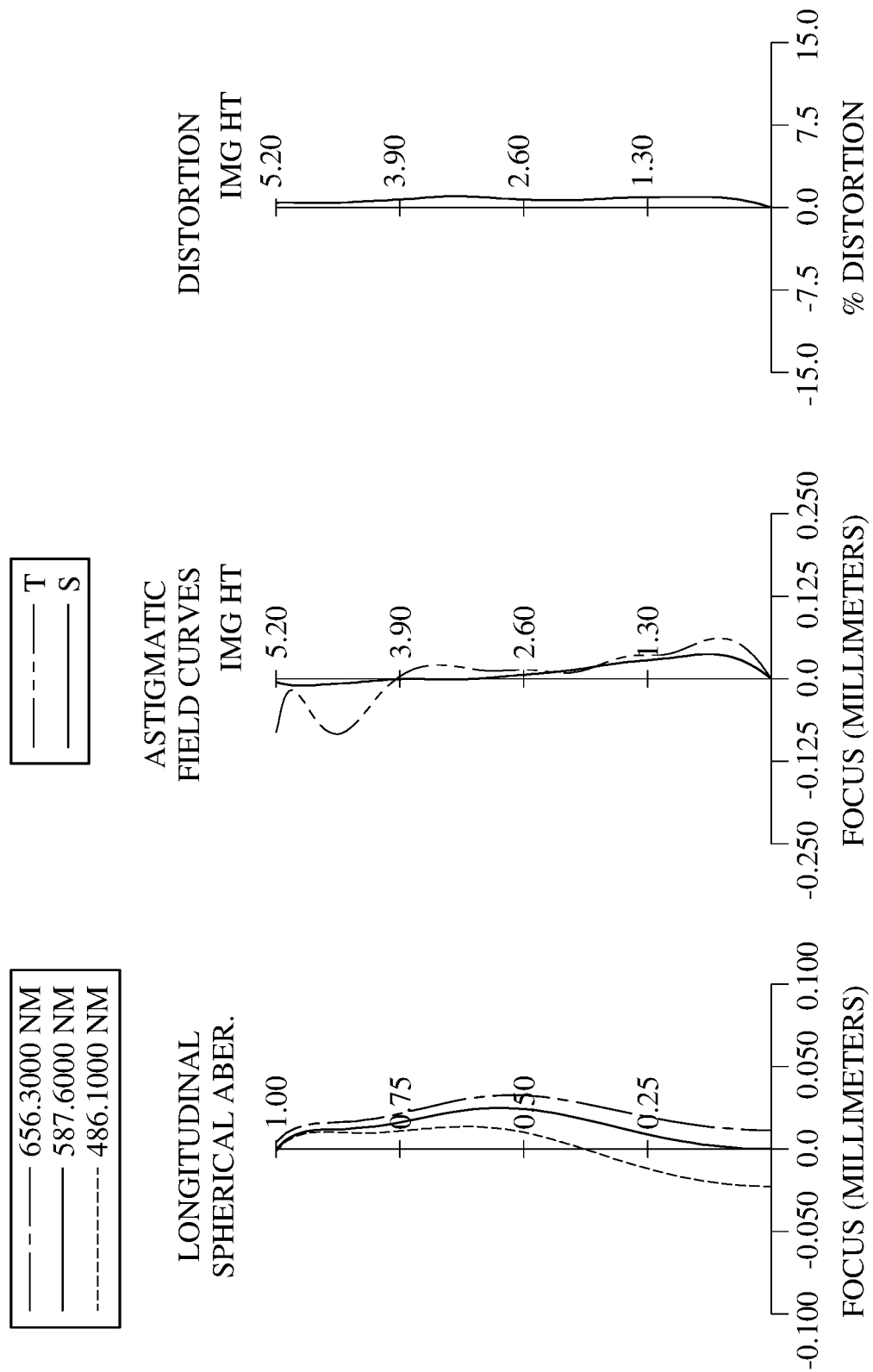
FIG. 6 shows spherical aberration curves, astigmatic field curves and a distortion curve of the image capturing unit according to the 3rd embodiment.

FIG. 5 is a cross-sectional view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 395. The imaging optical lens assembly includes, in order from an object side to an image side along an optical path, a first lens element 310, a second lens element 320, an aperture stop 300, a third lens element 330, a stop 301, a fourth lens element 340, a fifth lens element 350, a sixth lens element 360, a seventh lens element 370, an IR-cut filter 380 and an image surface 390. The imaging optical lens assembly includes seven lens elements (310, 320, 330, 340, 350, 360 and 370) with no additional lens element disposed between each of the adjacent seven lens elements.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one convex critical point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has at least one critical point in an off-axis region thereof.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one critical point in an off-axis region thereof.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one critical point in an off-axis region thereof. The image-side surface 362 of the sixth lens element 360 has at least one critical point in an off-axis region thereof.

The seventh lens element 370 with negative refractive power has an object-side surface 371 being concave in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has at least one critical point in an off-axis region thereof. The image-side surface 372 of the seventh lens element 370 has at least one critical point in an off-axis region thereof.

The IR-cut filter 380 is made of glass material and located between the seventh lens element 370 and the image surface 390, and will not affect the focal length of the imaging optical lens assembly. The image sensor 395 is disposed on or near the image surface 390 of the imaging optical lens assembly.

The detailed optical data of the 3rd embodiment are shown in Table 5 and the aspheric surface data are shown in Table 6 below.

TABLE 5

3rd Embodiment
f = 3.84 mm, Fno = 2.23, HFOV = 53.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −21.040 | (ASP) | 0.565 | Plastic | 1.545 | 56.1 | −28.61 |
| 2 | | 60.786 | (ASP) | 0.053 | | | | |
| 3 | Lens 2 | 1.758 | (ASP) | 0.330 | Plastic | 1.587 | 28.3 | 19.35 |
| 4 | | 1.935 | (ASP) | 0.336 | | | | |
| 5 | Ape. Stop | Plano | | 0.075 | | | | |
| 6 | Lens 3 | 13.865 | (ASP) | 0.854 | Plastic | 1.544 | 56.0 | 4.00 |
| 7 | | −2.524 | (ASP) | −0.185 | | | | |
| 8 | Stop | Plano | | 0.710 | | | | |
| 9 | Lens 4 | −3.165 | (ASP) | 0.360 | Plastic | 1.669 | 19.5 | −6.44 |
| 10 | | −12.495 | (ASP) | 0.180 | | | | |
| 11 | Lens 5 | −3.104 | (ASP) | 1.061 | Plastic | 1.544 | 56.0 | 2.31 |
| 12 | | −1.003 | (ASP) | 0.030 | | | | |
| 13 | Lens 6 | 2.077 | (ASP) | 0.512 | Plastic | 1.544 | 56.0 | −3.98 |
| 14 | | 0.967 | (ASP) | 0.530 | | | | |
| 15 | Lens 7 | −35.851 | (ASP) | 0.540 | Plastic | 1.566 | 37.4 | −10.70 |
| 16 | | 7.325 | (ASP) | 0.700 | | | | |
| 17 | IR-cut Filter | Plano | | 0.210 | Glass | 1.517 | 64.2 | — |
| 18 | | Plano | | 0.281 | | | | |
| 19 | Image | Plano | | 0.000 | | | | |

Note:
Reference wavelength is 587.6 nm (d-line).
An effective radius of the stop 301 (Surface 8) is 1.335 mm.

TABLE 6

Aspheric Coefficients

| Surface # | | | | | |
|---|---|---|---|---|---|
| | 1 | 2 | 3 | 4 | 6 |
| k = | 4.3905E+01 | −1.0000E+00 | −3.9509E+00 | −1.6898E+00 | 3.5684E+00 |
| A4 = | 6.6871E−02 | 7.8683E−02 | 4.6300E−02 | −2.5825E−02 | −1.3462E−02 |
| A6 = | −2.9596E−02 | −9.5338E−02 | −1.0534E−01 | 9.0859E−02 | −1.5095E−02 |
| A8 = | 1.2122E−02 | 8.0245E−02 | 4.0622E−02 | −3.2463E−01 | −4.1393E−03 |
| A10 = | −3.4378E−03 | −4.5332E−02 | 2.8035E−03 | 5.3860E−01 | 1.7631E−02 |
| A12 = | 6.2887E−04 | 1.6662E−02 | −2.6941E−03 | −4.2890E−01 | −6.1230E−02 |
| A14 = | −6.7236E−05 | −3.8120E−03 | 5.5427E−05 | 1.5303E−01 | 3.9732E−02 |
| A16 = | 3.1661E−06 | 4.9261E−04 | — | — | — |
| A18 = | — | −2.7420E−05 | — | — | — |

| Surface # | | | | | |
|---|---|---|---|---|---|
| | 7 | 9 | 10 | 11 | 12 |
| k = | 1.8493E+00 | 0.0000E+00 | 0.0000E+00 | −8.5505E−01 | −4.6473E+00 |
| A4 = | −3.8467E−02 | −1.6393E−01 | −5.5515E−02 | 1.2712E−01 | −1.8297E−01 |
| A6 = | −4.9280E−02 | 3.9842E−02 | −7.1316E−02 | −2.1539E−01 | 1.8218E−01 |
| A8 = | 1.3993E−01 | −3.9212E−02 | 7.8743E−02 | 1.5293E−01 | −1.5768E−01 |
| A10 = | −2.5630E−01 | 8.1706E−02 | −1.0290E−02 | −1.8888E−02 | 9.5961E−02 |
| A12 = | 2.5081E−01 | −6.3317E−02 | −2.5557E−02 | −3.8490E−02 | −3.5896E−02 |
| A14 = | −1.3071E−01 | 2.2712E−02 | 1.8817E−02 | 2.6894E−02 | 8.2584E−03 |
| A16 = | 2.7097E−02 | −2.3799E−03 | −6.0200E−03 | −8.1891E−03 | −1.1549E−03 |
| A18 = | — | −2.9807E−04 | 9.8064E−04 | 1.2431E−03 | 9.0656E−05 |
| A20 = | — | — | −6.7824E−05 | −7.6323E−05 | −3.0697E−06 |

| Surface # | | | | |
|---|---|---|---|---|
| | 13 | 14 | 15 | 16 |
| k = | −5.9450E+00 | −5.1973E+00 | 3.5199E+01 | −1.9462E+00 |
| A4 = | −8.2553E−02 | −4.0901E−02 | 4.3665E−02 | 2.2659E−02 |
| A6 = | 3.2313E−02 | 2.9467E−02 | −8.8930E−03 | −1.5718E−02 |
| A8 = | −8.1653E−03 | −1.5137E−02 | −1.5439E−03 | 4.6450E−03 |
| A10 = | 1.4295E−03 | 5.1622E−03 | 1.0436E−03 | −9.0225E−04 |
| A12 = | −1.8343E−04 | −1.2022E−03 | −2.2731E−04 | 1.2063E−04 |
| A14 = | 1.7226E−05 | 1.9416E−04 | 2.7886E−05 | −1.1061E−05 |
| A16 = | −1.1091E−06 | −2.1739E−05 | −2.1208E−06 | 6.8837E−07 |
| A18 = | 4.2891E−08 | 1.6500E−06 | 1.0149E−07 | −2.8460E−08 |
| A20 = | −7.3760E−10 | −8.0625E−08 | −2.9621E−09 | 7.4582E−10 |
| A22 = | — | 2.2790E−09 | 4.8018E−11 | −1.1170E−11 |
| A24 = | — | −2.8220E−11 | −3.3139E−13 | 7.2487E−14 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.84 | f/|R1| + f/|R2| | 0.25 |
| Fno | 2.23 | (R5 + R6)/(R5 − R6) | 0.69 |
| HFOV [deg.] | 53.4 | (R7 + R8)/(R7 − R8) | −1.68 |
| FOV [deg.] | 106.8 | (|R11| + |R12|)/f | 0.79 |
| V1/N1 | 36.30 | f/|R13| + f/|R14| | 0.63 |
| V2/N2 | 17.83 | T23/T34 | 0.78 |
| V3/N3 | 36.26 | TL/ImgH | 1.37 |
| V4/N4 | 11.65 | 100 × |[ImgH − f × tan(HFOV)]/[f × tan(HFOV)]| | 0.61 |
| V5/N5 | 36.26 | |f1/f2| | 1.48 |
| V6 + V7 | 93.4 | |f/f1| + |f/f2| | 0.33 |
| V6/N6 | 36.26 | f3/f2 | 0.21 |
| V7/V6 | 0.67 | f5/f3 | 0.58 |

-continued

| 3rd Embodiment | | | |
|---|---|---|---|
| V7/N7 | 23.91 | Y11/Y72 | 0.48 |
| f/R1 | −0.18 | Y72/f | 1.17 |

4th Embodiment

Figure 7:
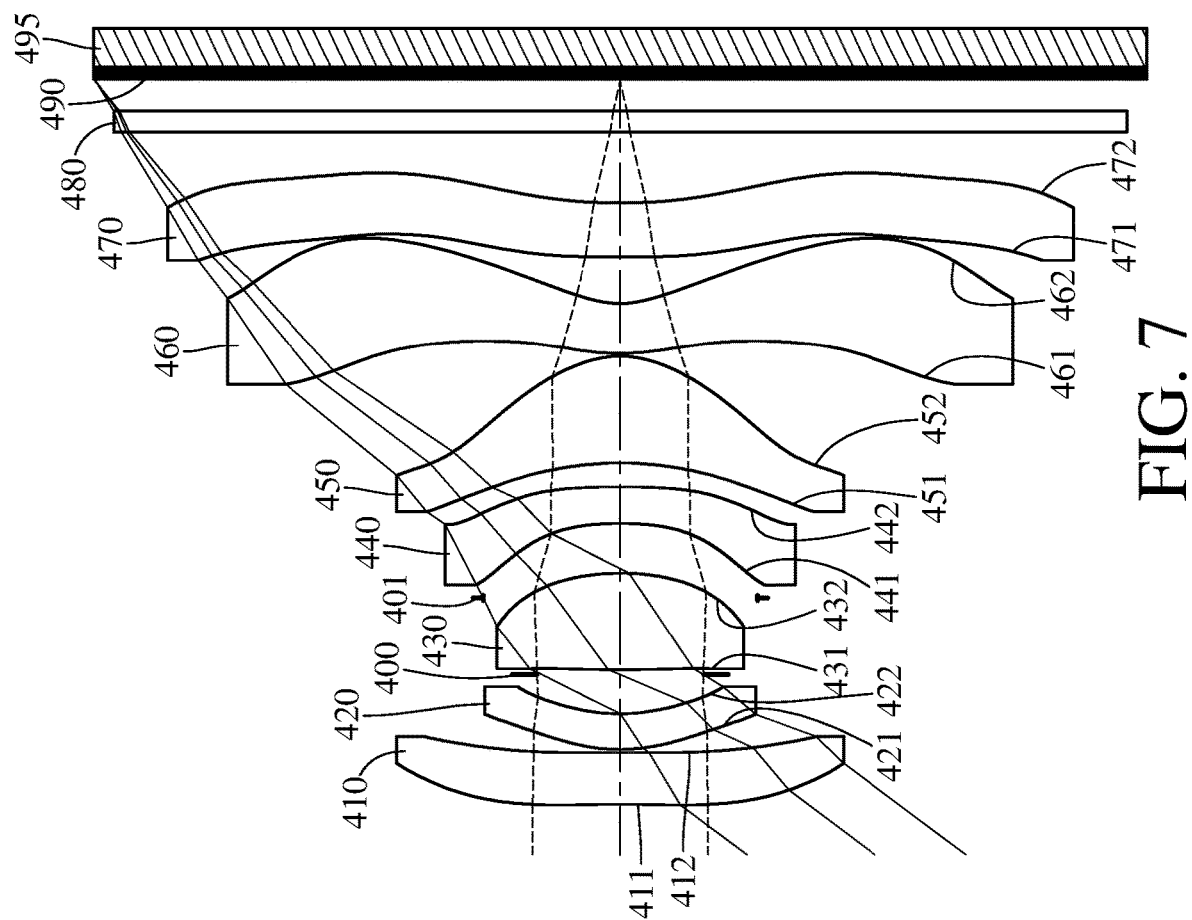
FIG. 7 is a cross-sectional view of an image capturing unit according to the 4th embodiment of the present disclosure.
Figure 8:
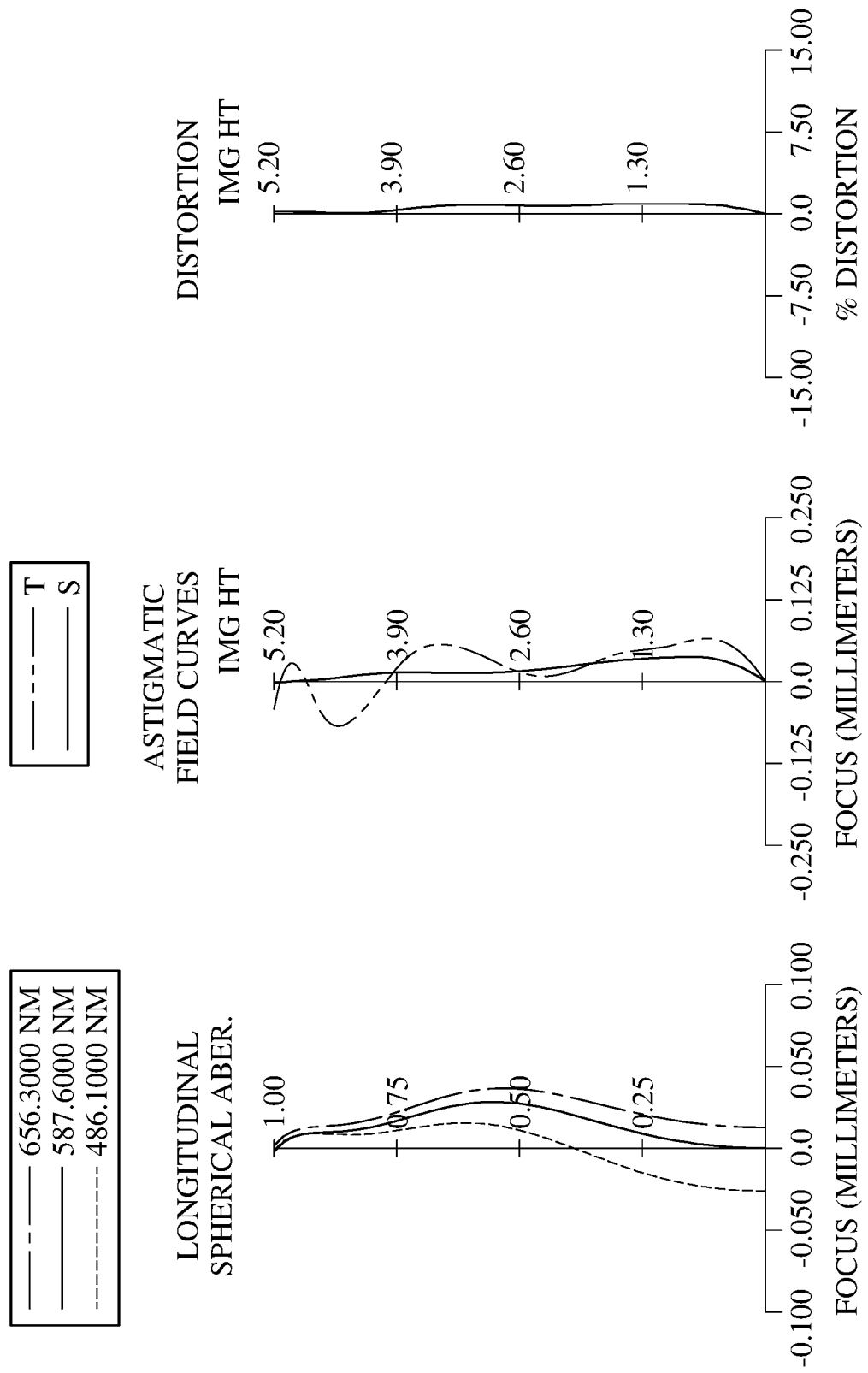
FIG. 8 shows spherical aberration curves, astigmatic field curves and a distortion curve of the image capturing unit according to the 4th embodiment.

FIG. 7 is a cross-sectional view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 495. The imaging optical lens assembly includes, in order from an object side to an image side along an optical path, a first lens element 410, a second lens element 420, an aperture stop 400, a third lens element 430, a stop 401, a fourth lens element 440, a fifth lens element 450, a sixth lens element 460, a seventh lens element 470, an IR-cut filter 480 and an image surface 490. The imaging optical lens assembly includes seven lens elements (410, 420, 430, 440, 450, 460 and 470) with no additional lens element disposed between each of the adjacent seven lens elements.

The first lens element 410 with negative refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has at least one convex critical point in an off-axis region thereof. The image-side surface 412 of the first lens element 410 has at least one critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has at least one critical point in an off-axis region thereof.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The image-side surface 442 of the fourth lens element 440 has at least one critical point in an off-axis region thereof.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one critical point in an off-axis region thereof. The image-side surface 462 of the sixth lens element 460 has at least one critical point in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has at least one critical point in an off-axis region thereof. The image-side surface 472 of the seventh lens element 470 has at least one critical point in an off-axis region thereof.

The IR-cut filter 480 is made of glass material and located between the seventh lens element 470 and the image surface 490, and will not affect the focal length of the imaging optical lens assembly. The image sensor 495 is disposed on or near the image surface 490 of the imaging optical lens assembly.

The detailed optical data of the 4th embodiment are shown in Table 7 and the aspheric surface data are shown in Table 8 below.

TABLE 7

4th Embodiment
f = 3.87 mm, Fno = 2.23, HFOV = 53.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −11.089 | (ASP) | 0.510 | Plastic | 1.568 | 39.9 | −31.57 |
| 2 | | −29.578 | (ASP) | 0.032 | | | | |
| 3 | Lens 2 | 1.778 | (ASP) | 0.355 | Plastic | 1.639 | 23.5 | 19.51 |
| 4 | | 1.912 | (ASP) | 0.386 | | | | |
| 5 | Ape. Stop | Plano | | 0.049 | | | | |
| 6 | Lens 3 | 14.670 | (ASP) | 0.961 | Plastic | 1.545 | 56.0 | 3.90 |
| 7 | | −2.428 | (ASP) | −0.247 | | | | |
| 8 | Stop | Plano | | 0.738 | | | | |
| 9 | Lens 4 | −3.314 | (ASP) | 0.360 | Plastic | 1.669 | 19.5 | −7.56 |
| 10 | | −10.032 | (ASP) | 0.240 | | | | |
| 11 | Lens 5 | −2.811 | (ASP) | 1.054 | Plastic | 1.545 | 56.0 | 2.32 |
| 12 | | −0.988 | (ASP) | 0.030 | | | | |
| 13 | Lens 6 | 2.220 | (ASP) | 0.500 | Plastic | 1.547 | 54.4 | −3.60 |
| 14 | | 0.960 | (ASP) | 0.459 | | | | |
| 15 | Lens 7 | 46.430 | (ASP) | 0.535 | Plastic | 1.643 | 22.8 | −11.16 |
| 16 | | 6.187 | (ASP) | 0.700 | | | | |
| 17 | IR-cut Filter | Plano | | 0.210 | Glass | 1.517 | 64.2 | — |
| 18 | | Plano | | 0.310 | | | | |
| 19 | Image | Plano | | 0.000 | | | | |

Note:
Reference wavelength is 587.6 nm (d-line).
An effective radius of the stop 401 (Surface 8) is 1.359 mm.

TABLE 8

Aspheric Coefficients

| Surface # | | | | | |
|---|---|---|---|---|---|
| | 1 | 2 | 3 | 4 | 6 |
| k = | −8.9596E+01 | −9.0000E+01 | −2.8792E+00 | −1.5510E+00 | 1.7473E+01 |
| A4 = | 6.9216E−02 | 6.4761E−02 | −1.0348E−02 | −4.3290E−02 | −1.0491E−02 |
| A6 = | −3.6646E−02 | −5.0665E−02 | −8.3918E−03 | 1.1710E−01 | −3.0650E−02 |
| A8 = | 1.7315E−02 | 3.0389E−02 | −2.1782E−02 | −2.8815E−01 | 3.7760E−02 |
| A10 = | −5.7147E−03 | −1.2244E−02 | 2.5326E−02 | 4.4081E−01 | −2.4022E−02 |
| A12 = | 1.2240E−03 | 3.0746E−03 | −9.3448E−03 | −3.4503E−01 | −4.5078E−02 |
| A14 = | −1.5166E−04 | −4.3949E−04 | 1.3777E−03 | 1.2085E−01 | 3.9708E−02 |
| A16 = | 8.1328E−06 | 2.7660E−05 | — | — | — |

| Surface # | | | | | |
|---|---|---|---|---|---|
| | 7 | 9 | 10 | 11 | 12 |
| k = | 1.7443E+00 | 0.0000E+00 | 0.0000E+00 | −8.5190E−01 | −4.4007E+00 |
| A4 = | −3.5881E−02 | −1.3862E−01 | −4.2199E−02 | 8.8525E−02 | −1.8834E−01 |
| A6 = | −5.0918E−02 | 1.4543E−03 | −3.9267E−02 | −8.1292E−02 | 1.9018E−01 |
| A8 = | 1.3677E−01 | −5.5716E−02 | −1.1346E−02 | −3.3399E−02 | −1.5855E−01 |
| A10 = | −2.1742E−01 | 1.7277E−01 | 8.4156E−02 | 1.1230E−01 | 8.9840E−02 |
| A12 = | 1.9343E−01 | −1.6159E−01 | −8.0031E−02 | −8.8080E−02 | −3.1726E−02 |
| A14 = | −9.3411E−02 | 7.1248E−02 | 3.7625E−02 | 3.5730E−02 | 7.0861E−03 |
| A16 = | 1.8231E−02 | −1.3858E−02 | −1.0005E−02 | −8.2258E−03 | −9.9065E−04 |
| A18 = | — | 7.6334E−04 | 1.4797E−03 | 1.0229E−03 | 7.9664E−05 |
| A20 = | — | — | −9.7108E−05 | −5.3534E−05 | −2.8115E−06 |

| Surface # | | | | |
|---|---|---|---|---|
| | 13 | 14 | 15 | 16 |
| k = | −6.5038E+00 | −5.0202E+00 | 6.6486E+01 | −4.7068E+00 |
| A4 = | −1.1256E−01 | −4.5310E−02 | 7.2079E−02 | 3.5868E−02 |
| A6 = | 5.5741E−02 | 2.7017E−02 | −4.0288E−02 | −2.7289E−02 |
| A8 = | −1.8497E−02 | −1.1511E−02 | 1.2987E−02 | 9.5581E−03 |
| A10 = | 4.4733E−03 | 3.3112E−03 | −2.9280E−03 | −2.1670E−03 |
| A12 = | −8.0304E−04 | −6.5156E−04 | 4.6140E−04 | 3.3276E−04 |
| A14 = | 1.0285E−04 | 8.7813E−05 | −5.0063E−05 | −3.5140E−05 |
| A16 = | −8.8885E−06 | −8.0704E−06 | 3.6994E−06 | 2.5764E−06 |
| A18 = | 4.8559E−07 | 4.9660E−07 | −1.8270E−07 | −1.3112E−07 |
| A20 = | −1.5038E−08 | −1.9560E−08 | 5.7833E−09 | 4.5568E−09 |
| A22 = | 2.0034E−10 | 4.4568E−10 | −1.0721E−10 | −1.0356E−10 |
| A24 = | — | −4.4684E−12 | 9.3260E−13 | 1.3939E−12 |
| A26 = | — | — | −1.3876E−15 | −8.4717E−15 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.87 | f/|R1| + f/|R2| | 0.48 |
| Fno | 2.23 | (R5 + R6)/(R5 − R6) | 0.72 |
| HFOV [deg.] | 53.2 | (R7 + R8)/(R7 − R8) | −1.99 |
| FOV [deg.] | 106.4 | (|R11| + |R12|)/f | 0.82 |
| V1/N1 | 25.46 | f/|R13| + f/|R14| | 0.71 |
| V2/N2 | 14.34 | T23/T34 | 0.89 |
| V3/N3 | 36.25 | TL/ImgH | 1.38 |
| V4/N4 | 11.65 | 100 × |[ImgH − f × tan(HFOV)]/[f × tan(HFOV)]| | 0.46 |
| V5/N5 | 36.25 | |f1/f2| | 1.62 |
| V6 + V7 | 77.2 | |f/f1| + |f/f2| | 0.32 |
| V6/N6 | 35.15 | f3/f2 | 0.20 |
| V7/V6 | 0.42 | f5/f3 | 0.60 |

| -continued | | | |
|---|---|---|---|
| 4th Embodiment | | | |
| V7/N7 | 13.89 | Y11/Y72 | 0.49 |
| f/R1 | −0.35 | Y72/f | 1.16 |

5th Embodiment

Figure 9:
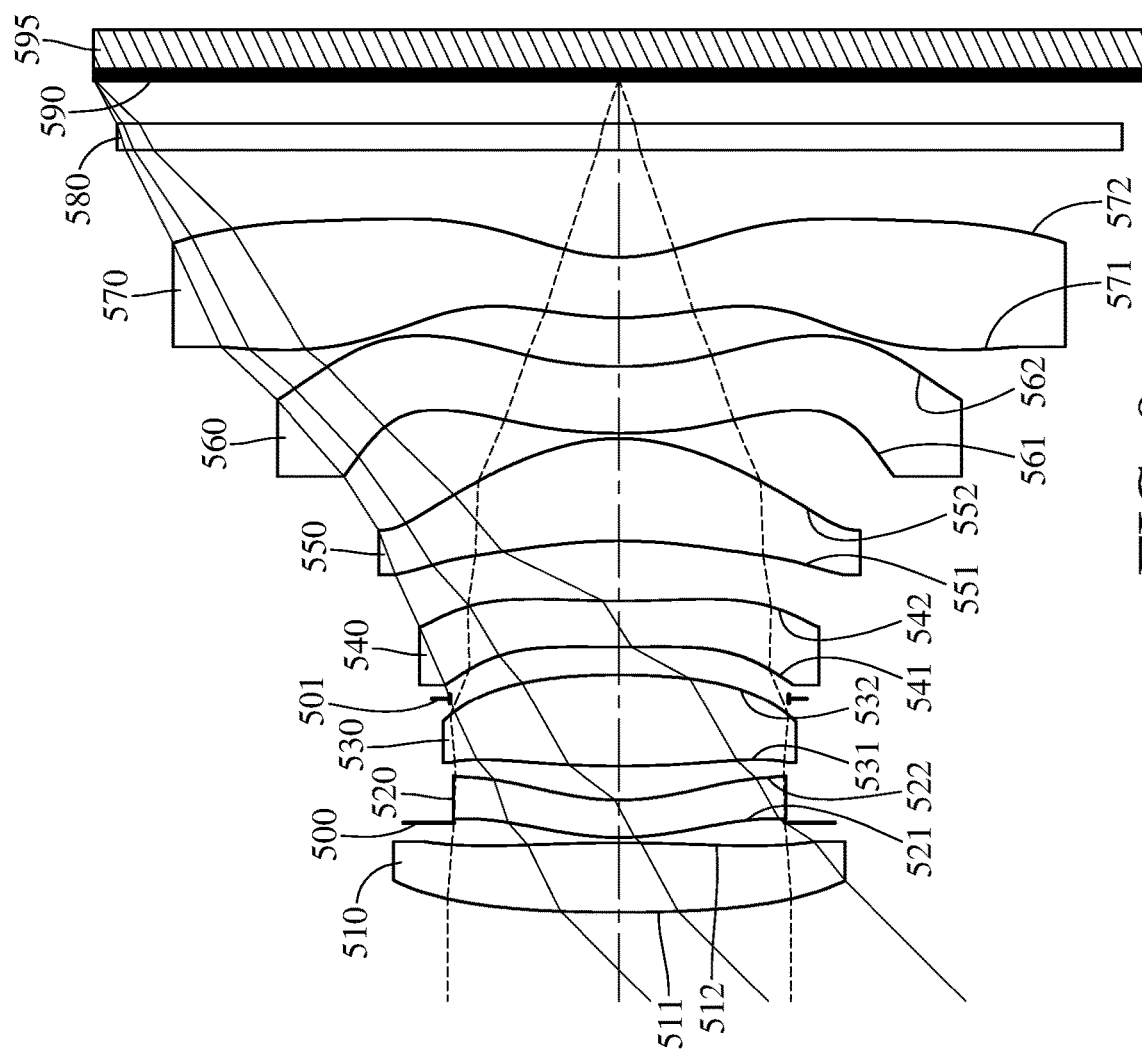
FIG. 9 is a cross-sectional view of an image capturing unit according to the 5th embodiment of the present disclosure.
Figure 10:
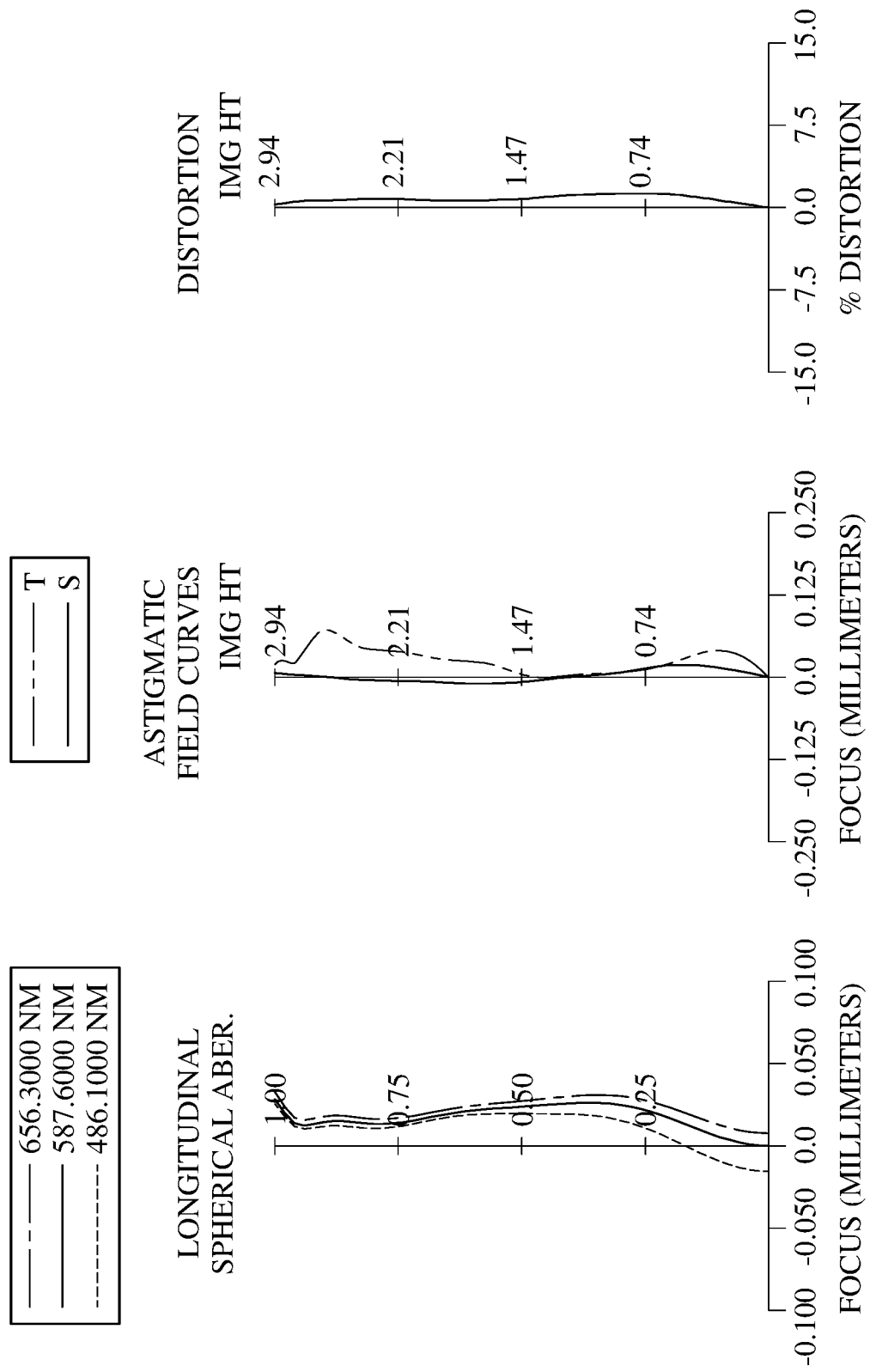
FIG. 10 shows spherical aberration curves, astigmatic field curves and a distortion curve of the image capturing unit according to the 5th embodiment.

FIG. 9 is a cross-sectional view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 595. The imaging optical lens assembly includes, in order from an object side to an image side along an optical path, a first lens element 510, an aperture stop 500, a second lens element 520, a third lens element 530, a stop 501, a fourth lens element 540, a fifth lens element 550, a sixth lens element 560, a seventh lens element 570, an IR-cut filter 580 and an image surface 590. The imaging optical lens assembly includes seven lens elements (510, 520, 530, 540, 550, 560 and 570) with no additional lens element disposed between each of the adjacent seven lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The image-side surface 512 of the first lens element 510 has at least one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has at least one critical point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one critical point in an off-axis region thereof. The image-side surface 542 of the fourth lens element 540 has at least one critical point in an off-axis region thereof.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one critical point in an off-axis region thereof. The image-side surface 562 of the sixth lens element 560 has at least one critical point in an off-axis region thereof.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric.

The IR-cut filter 580 is made of glass material and located between the seventh lens element 570 and the image surface 590, and will not affect the focal length of the imaging optical lens assembly. The image sensor 595 is disposed on or near the image surface 590 of the imaging optical lens assembly.

The detailed optical data of the 5th embodiment are shown in Table 9 and the aspheric surface data are shown in Table 10 below.

TABLE 9

5th Embodiment
f = 2.93 mm, Fno = 1.52, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.304 | (ASP) | 0.389 | Plastic | 1.545 | 56.1 | 9.94 |
| 2 | | −10.283 | (ASP) | 0.112 | | | | |
| 3 | Ape. Stop | Plano | | −0.082 | | | | |
| 4 | Lens 2 | 1.570 | (ASP) | 0.210 | Plastic | 1.669 | 19.5 | −26.13 |
| 5 | | 1.364 | (ASP) | 0.192 | | | | |
| 6 | Lens 3 | 6.182 | (ASP) | 0.513 | Plastic | 1.544 | 56.0 | 4.85 |
| 7 | | −4.467 | (ASP) | −0.136 | | | | |
| 8 | Stop | Plano | | 0.293 | | | | |
| 9 | Lens 4 | 11.889 | (ASP) | 0.257 | Plastic | 1.639 | 23.5 | −16.25 |
| 10 | | 5.495 | (ASP) | 0.338 | | | | |
| 11 | Lens 5 | −3.004 | (ASP) | 0.574 | Plastic | 1.544 | 56.0 | 2.84 |
| 12 | | −1.089 | (ASP) | 0.030 | | | | |
| 13 | Lens 6 | 3.354 | (ASP) | 0.377 | Plastic | 1.669 | 19.5 | −12.23 |
| 14 | | 2.272 | (ASP) | 0.273 | | | | |
| 15 | Lens 7 | 1.821 | (ASP) | 0.340 | Plastic | 1.566 | 37.4 | −4.42 |
| 16 | | 0.983 | (ASP) | 0.600 | | | | |
| 17 | IR-cut Filter | Plano | | 0.150 | Glass | 1.517 | 64.2 | — |
| 18 | | Plano | | 0.239 | | | | |
| 19 | Image | Plano | | 0.000 | | | | |

Note:
Reference wavelength is 587.6 nm (d-line).
An effective radius of the stop 501 (Surface 8) is 0.950 mm.

TABLE 10

Aspheric Coefficients

| Surface # | | | | | |
|---|---|---|---|---|---|
| | 1 | 2 | 4 | 5 | 6 |
| k = | 4.7191E+01 | 0.0000E+00 | −3.7166E+00 | −2.2717E+00 | 2.4883E+01 |
| A4 = | 5.9780E−02 | −2.5167E−02 | −2.3389E−01 | −1.9189E−01 | 1.2316E−02 |
| A6 = | −9.0988E−02 | 2.2766E−01 | 1.1199E−01 | −3.5603E−01 | −5.3628E−02 |
| A8 = | 1.4230E−01 | −3.2852E−01 | 1.4941E−01 | 1.5987E+00 | −3.4593E−01 |
| A10 = | −1.1811E−01 | 2.6969E−01 | −6.6392E−01 | −3.6575E+00 | 1.1238E+00 |
| A12 = | 5.1087E−02 | −1.3252E−01 | 7.3680E−01 | 4.4375E+00 | −2.2522E+00 |
| A14 = | −9.7691E−03 | 3.5420E−02 | −2.6854E−01 | −2.5711E+00 | 2.4008E+00 |
| A16 = | 5.2145E−04 | −2.6578E−03 | 3.2243E−03 | 5.6837E−01 | −1.0017E+00 |

| Surface # | | | | | |
|---|---|---|---|---|---|
| | 7 | 9 | 10 | 11 | 12 |
| k = | −5.0288E+00 | 9.0671E+01 | −2.3132E+01 | −2.1381E+01 | −1.9106E+00 |
| A4 = | −1.9318E−01 | −3.8528E−01 | −2.0547E−01 | −1.2105E−01 | 2.4512E−01 |
| A6 = | 3.0115E−01 | 3.0422E−01 | 2.0630E−01 | 7.2203E−01 | −9.9375E−01 |
| A8 = | −1.0260E+00 | −1.1673E+00 | −6.4572E−01 | −1.7655E+00 | 2.6693E+00 |
| A10 = | 2.1103E+00 | 2.7005E+00 | 1.1365E+00 | 2.4368E+00 | −4.8859E+00 |
| A12 = | −2.6104E+00 | −3.2782E+00 | −1.1142E+00 | −1.9644E+00 | 5.9692E+00 |
| A14 = | 1.7391E+00 | 2.0371E+00 | 5.6532E−01 | 7.7300E−01 | −4.6915E+00 |
| A16 = | −4.9259E−01 | −4.9181E−01 | −1.1086E−01 | −2.6757E−02 | 2.2483E+00 |
| A18 = | — | — | — | −7.0685E−02 | −5.9200E−01 |
| A20 = | — | — | — | 1.4207E−02 | 6.5245E−02 |

| Surface # | | | | |
|---|---|---|---|---|
| | 13 | 14 | 15 | 16 |
| k = | 0.0000E+00 | 0.0000E+00 | −8.2841E+00 | −2.8344E+00 |
| A4 = | 2.7018E−01 | 1.6487E−01 | −1.3295E−01 | −2.9037E−01 |
| A6 = | −7.7087E−01 | −5.7344E−01 | −2.3715E−01 | 1.7105E−01 |
| A8 = | 1.0101E+00 | 6.2609E−01 | 3.2000E−01 | −6.7397E−02 |
| A10 = | −9.4239E−01 | −4.2265E−01 | −1.6958E−01 | 2.2502E−02 |
| A12 = | 6.3287E−01 | 1.8393E−01 | 5.0231E−02 | −6.1676E−03 |
| A14 = | −2.9844E−01 | −5.1672E−02 | −8.9263E−03 | 1.1891E−03 |
| A16 = | 8.9550E−02 | 9.0985E−03 | 9.3675E−04 | −1.4317E−04 |
| A18 = | −1.4713E−02 | −9.1529E−03 | −5.2632E−05 | 9.5484E−06 |
| A20 = | 9.8284E−04 | 4.0066E−05 | 1.1802E−06 | −2.6891E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.93 | f/|R1| + f/|R2| | 0.54 |
| Fno | 1.52 | (R5 + R6)/(R5 − R6) | 0.16 |
| HFOV [deg.] | 45.0 | (R7 + R8)/(R7 − R8) | 2.72 |
| FOV [deg.] | 90.0 | (|R11| + |R12|)/f | 1.92 |
| V1/N1 | 36.30 | f/|R13| + f/|R14| | 4.59 |
| V2/N2 | 11.65 | T23/T34 | 1.22 |
| V3/N3 | 36.26 | TL/ImgH | 1.59 |
| V4/N4 | 14.34 | 100 × |[ImgH − f × tan(HFOV)]/[f × tan(HFOV)]| | 0.50 |
| V5/N5 | 36.26 | |f1/f2| | 0.38 |
| V6 + V7 | 56.9 | |f/f1| + |f/f2| | 0.41 |
| V6/N6 | 11.65 | f3/f2 | −0.19 |
| V7/V6 | 1.92 | f5/f3 | 0.59 |
| V7/N7 | 23.91 | Y11/Y72 | 0.51 |
| f/R1 | 0.26 | Y72/f | 0.85 |

6th Embodiment

Figure 11:
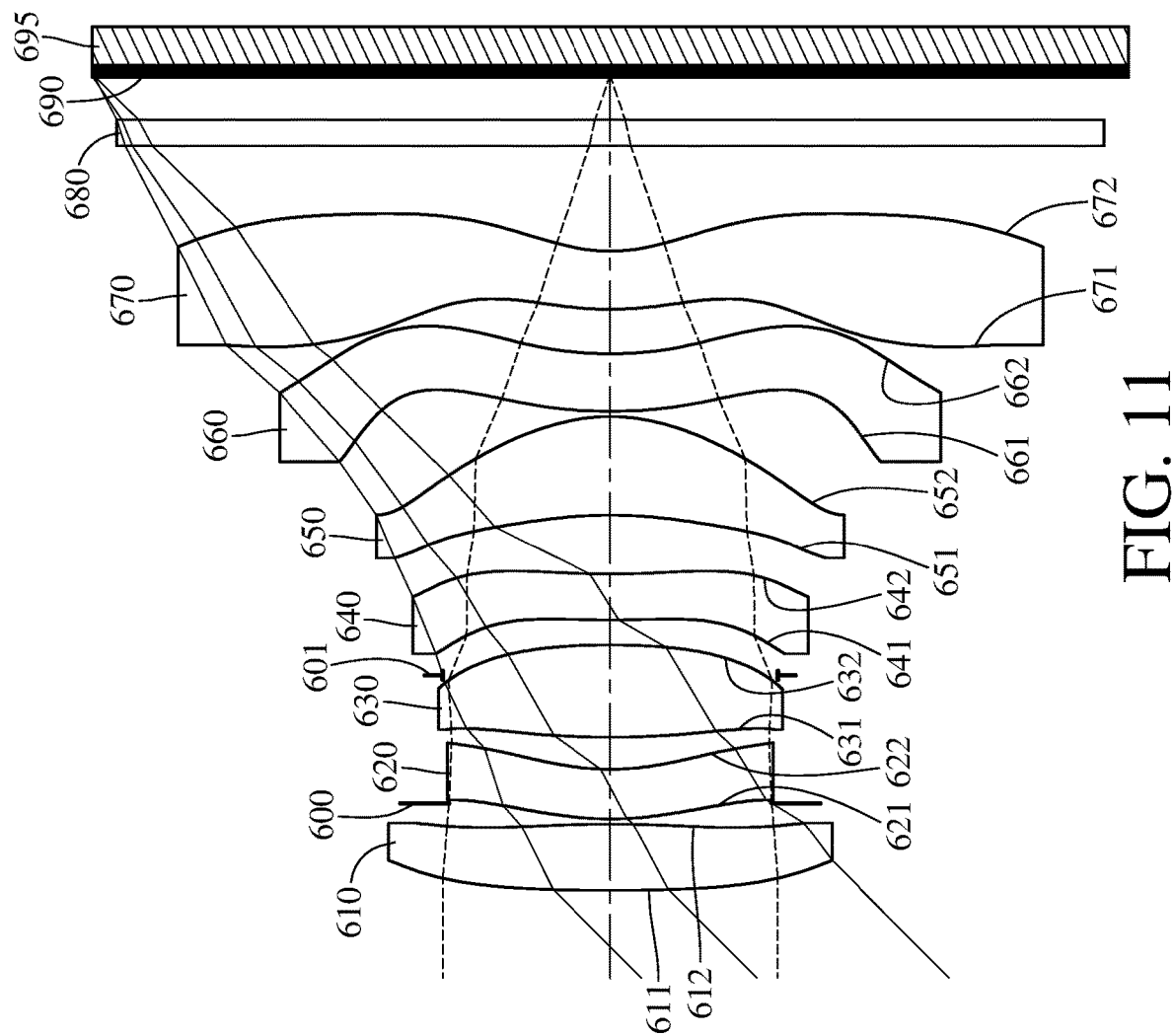
FIG. 11 is a cross-sectional view of an image capturing unit according to the 6th embodiment of the present disclosure.
Figure 12:
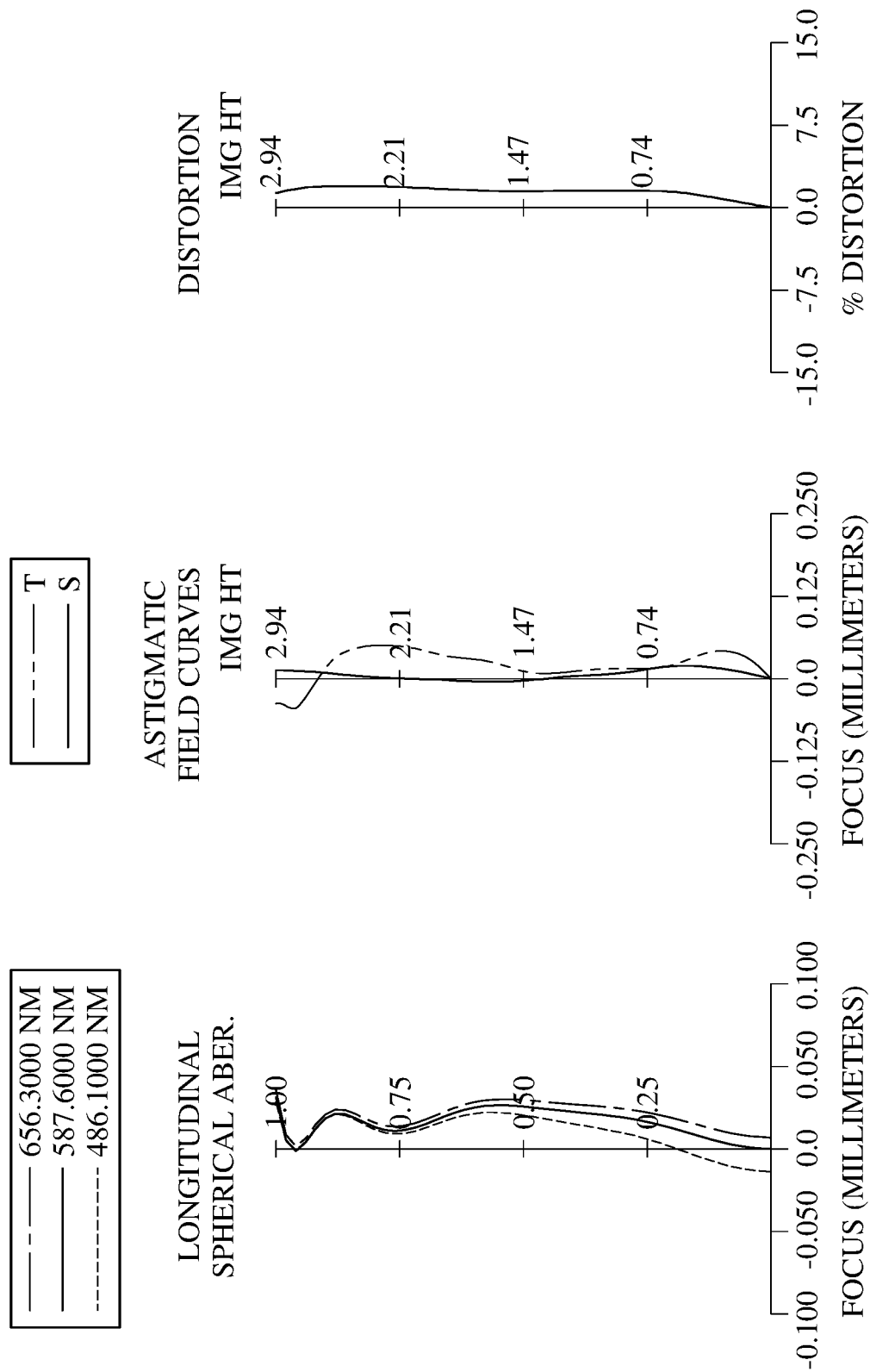
FIG. 12 shows spherical aberration curves, astigmatic field curves and a distortion curve of the image capturing unit according to the 6th embodiment.

FIG. 11 is a cross-sectional view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 695. The imaging optical lens assembly includes, in order from an object side to an image side along an optical path, a first lens element 610, an aperture stop 600, a second lens element 620, a third lens element 630, a stop 601, a fourth lens element 640, a fifth lens element 650, a sixth lens element 660, a seventh lens element 670, an IR-cut filter 680 and an image surface 690. The imaging optical lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric. The image-side surface 612 of the first lens element 610 has at least one critical point in an off-axis region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has at least one critical point in an off-axis region thereof.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has at least one critical point in an off-axis region thereof. The image-side surface 642 of the fourth lens element 640 has at least one critical point in an off-axis region thereof.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one critical point in an off-axis region thereof. The image-side surface 662 of the sixth lens element 660 has at least one critical point in an off-axis region thereof.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric.

The IR-cut filter 680 is made of glass material and located between the seventh lens element 670 and the image surface 690, and will not affect the focal length of the imaging optical lens assembly. The image sensor 695 is disposed on or near the image surface 690 of the imaging optical lens assembly.

The detailed optical data of the 6th embodiment are shown in Table 11 and the aspheric surface data are shown in Table 12 below.

TABLE 11

6th Embodiment
f = 2.90 mm, Fno = 1.52, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.953 | (ASP) | 0.379 | Plastic | 1.545 | 56.1 | 8.98 |
| 2 | | −7.004 | (ASP) | 0.119 | | | | |
| 3 | Ape. Stop | Plano | | −0.089 | | | | |
| 4 | Lens 2 | 1.819 | (ASP) | 0.282 | Plastic | 1.669 | 19.5 | −15.20 |
| 5 | | 1.447 | (ASP) | 0.183 | | | | |
| 6 | Lens 3 | 5.122 | (ASP) | 0.525 | Plastic | 1.544 | 56.0 | 4.67 |
| 7 | | −4.855 | (ASP) | −0.173 | | | | |
| 8 | Stop | Plano | | 0.316 | | | | |
| 9 | Lens 4 | 5.812 | (ASP) | 0.261 | Plastic | 1.639 | 23.5 | −26.97 |
| 10 | | 4.270 | (ASP) | 0.338 | | | | |
| 11 | Lens 5 | −2.700 | (ASP) | 0.561 | Plastic | 1.544 | 56.0 | 2.81 |
| 12 | | −1.046 | (ASP) | 0.030 | | | | |
| 13 | Lens 6 | 3.251 | (ASP) | 0.328 | Plastic | 1.669 | 19.5 | −12.26 |
| 14 | | 2.234 | (ASP) | 0.252 | | | | |
| 15 | Lens 7 | 1.748 | (ASP) | 0.335 | Plastic | 1.566 | 37.4 | −4.27 |
| 16 | | 0.944 | (ASP) | 0.600 | | | | |
| 17 | IR-cut Filter | Plano | | 0.150 | Glass | 1.517 | 64.2 | — |
| 18 | | Plano | | 0.238 | | | | |
| 19 | Image | Plano | | 0.000 | | | | |

Note:
Reference wavelength is 587.6 nm (d-line).
An effective radius of the stop 601 (Surface 8) is 0.955 mm.

TABLE 12

Aspheric Coefficients

| Surface # | 1 | 2 | 4 | 5 | 6 |
|---|---|---|---|---|---|
| k= | 8.4041E+01 | 0.0000E+00 | −2.2301E+00 | −1.6361E+00 | 1.8511E+01 |
| A4= | 6.6025E−02 | 3.4848E−02 | −2.0801E−01 | −2.0577E−01 | −1.9108E−02 |
| A6= | −9.5134E−02 | 1.1572E−01 | 1.2427E−01 | −1.8553E−01 | 1.7850E−01 |
| A8= | 1.8838E−01 | −1.0020E−01 | 1.5231E−01 | 1.2035E+00 | −1.5925E+00 |
| A10= | −2.1037E−01 | −9.9820E−02 | −8.0757E−01 | −2.9760E+00 | 5.0722E+00 |
| A12= | 1.3632E−01 | 2.6292E−01 | 1.0917E+00 | 3.6302E+00 | −8.8950E+00 |

TABLE 12-continued

| | | | | | |
|---|---|---|---|---|---|
| A14= | −4.6568E−02 | −1.9618E−01 | −6.3396E−01 | −1.9766E+00 | 8.0679E+00 |
| A16= | 6.1926E−03 | 5.0068E−02 | 1.3057E−01 | 3.4187E−01 | −2.9506E+00 |

| Surface # | 7 | 9 | 10 | 11 | 12 |
|---|---|---|---|---|---|
| k= | −1.8010E+00 | −1.0004E+01 | −3.7876E+00 | −1.6248E+01 | −1.7483E+00 |
| A4= | −2.3939E−01 | −4.0948E−01 | −2.3472E−01 | −1.3018E−01 | 2.7350E−01 |
| A6= | 5.6395E−01 | 5.0480E−01 | 4.4786E−01 | 7.4031E−01 | −1.1145E+00 |
| A8= | −2.0608E+00 | −1.9396E+00 | −1.9903E+00 | −1.7604E+00 | 2.9855E+00 |
| A10= | 4.6055E+00 | 4.2891E+00 | 5.0302E+00 | 2.0396E+00 | −5.5640E+00 |
| A12= | −5.9694E+00 | −4.9905E+00 | −7.8189E+00 | −8.8182E−01 | 6.9376E+00 |
| A14= | 4.0937E+00 | 2.9434E+00 | 7.6990E+00 | −5.8602E−01 | −5.5711E+00 |
| A16= | −1.1663E+00 | −6.7521E−01 | −4.7120E+00 | 8.7618E−01 | 2.7348E+00 |
| A18= | — | — | 1.6403E+00 | −3.7385E−01 | −7.3907E−01 |
| A20= | — | — | −2.4552E−01 | 5.4274E−02 | 8.3675E−02 |

| Surface # | 13 | 14 | 15 | 16 |
|---|---|---|---|---|
| k= | 0.0000E+00 | 0.0000E+00 | −1.0190E+01 | −3.2095E+00 |
| A4= | 2.9595E−01 | 1.7969E−01 | −1.3941E−01 | −2.9120E−01 |
| A6= | −8.6085E−01 | −6.4694E−01 | −2.8348E−01 | 1.6874E−01 |
| A8= | 1.1097E+00 | 6.9119E−01 | 4.0635E−01 | −5.0359E−02 |
| A10= | −1.0286E+00 | −4.5015E−01 | −2.3372E−01 | 7.5078E−03 |
| A12= | 7.0337E−01 | 1.8865E−01 | 7.6265E−02 | −1.8637E−04 |
| A14= | −3.4579E−01 | −5.1157E−02 | −1.5199E−02 | −1.2773E−04 |
| A16= | 1.0973E−01 | 8.7804E−03 | 1.8335E−03 | 2.2756E−05 |
| A18= | −1.9180E−02 | −8.7670E−04 | −1.2297E−04 | −1.6981E−06 |
| A20= | 1.3668E−03 | 3.8942E−05 | 3.5115E−06 | 4.9902E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.90 | f/|R1| + f/|R2| | 0.60 |
| Fno | 1.52 | (R5 + R6)/(R5 − R6) | 0.03 |
| HFOV [deg.] | 45.0 | (R7 + R8)/(R7 − R8) | 6.54 |
| FOV [deg.] | 90.0 | (|R11| + |R12|)/f | 1.89 |
| V1/N1 | 36.30 | f/|R13| + f/|R14| | 4.73 |
| V2/N2 | 11.65 | T23/T34 | 1.28 |
| V3/N3 | 36.26 | TL/ImgH | 1.57 |
| V4/N4 | 14.34 | 100 × |[ImgH − f × tan(HFOV)]/[f × tan(HFOV)]| | 1.59 |
| V5/N5 | 36.26 | |f1/f2| | 0.59 |
| V6 + V7 | 56.9 | |f/f1| + |f/f2| | 0.51 |
| V6/N6 | 11.65 | f3/f2 | −0.31 |
| V7/V6 | 1.92 | f5/f3 | 0.60 |
| V7/N7 | 23.91 | Y11/Y72 | 0.51 |
| f/R1 | 0.18 | Y72/f | 0.85 |

7th Embodiment

Figure 13:
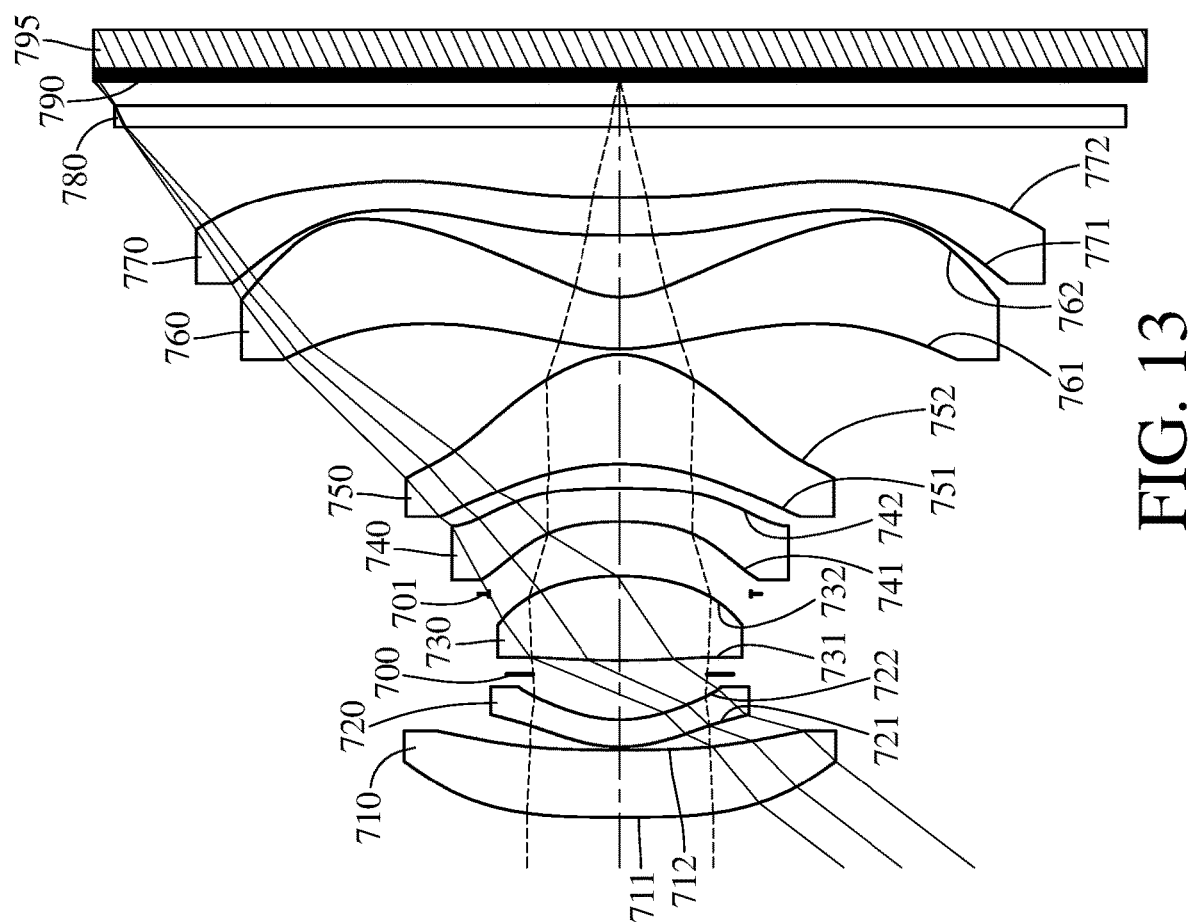
FIG. 13 is a cross-sectional view of an image capturing unit according to the 7th embodiment of the present disclosure.
Figure 14:
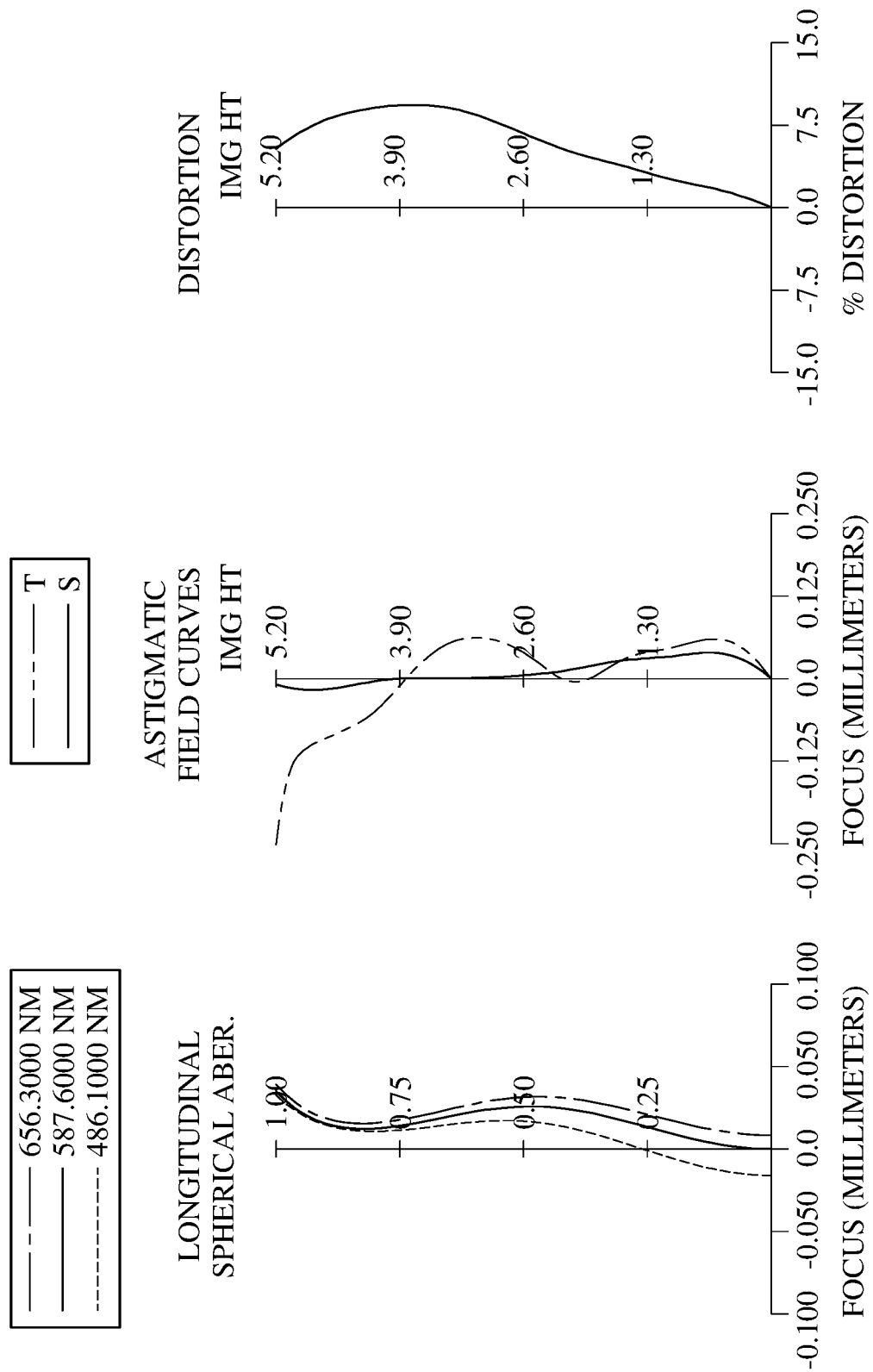
FIG. 14 shows spherical aberration curves, astigmatic field curves and a distortion curve of the image capturing unit according to the 7th embodiment.

FIG. 13 is a cross-sectional view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 795. The imaging optical lens assembly includes, in order from an object side to an image side along an optical path, a first lens element 710, a second lens element 720, an aperture stop 700, a third lens element 730, a stop 701, a fourth lens element 740, a fifth lens element 750, a sixth lens element 760, a seventh lens element 770, an IR-cut filter 780 and an image surface 790. The imaging optical lens assembly includes seven lens elements (710, 720, 730, 740, 750, 760 and 770) with no additional lens element disposed between each of the adjacent seven lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has at least one critical point in an off-axis region thereof. The image-side surface 762 of the sixth lens element 760 has at least one critical point in an off-axis region thereof.

The seventh lens element 770 with positive refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has at least one critical point in an off-axis region thereof. The image-side surface 772 of the seventh lens element 770 has at least one critical point in an off-axis region thereof.

The IR-cut filter 780 is made of glass material and located between the seventh lens element 770 and the image surface 790, and will not affect the focal length of the imaging optical lens assembly. The image sensor 795 is disposed on or near the image surface 790 of the imaging optical lens assembly.

The detailed optical data of the 7th embodiment are shown in Table 13 and the aspheric surface data are shown in Table 14 below.

TABLE 13

7th Embodiment
f = 3.79 mm, Fno = 2.05, HFOV = 52.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 57.383 | (ASP) | 0.674 | Plastic | 1.559 | 40.4 | 240.90 |
| 2 | | 99.613 | (ASP) | 0.030 | | | | |
| 3 | Lens 2 | 1.466 | (ASP) | 0.270 | Plastic | 1.614 | 26.0 | −185.65 |
| 4 | | 1.346 | (ASP) | 0.449 | | | | |
| 5 | Ape. Stop | Plano | | 0.136 | | | | |
| 6 | Lens 3 | 9.035 | (ASP) | 0.838 | Plastic | 1.544 | 56.0 | 3.68 |
| 7 | | −2.484 | (ASP) | −0.178 | | | | |
| 8 | Stop | Plano | | 0.718 | | | | |
| 9 | Lens 4 | −3.169 | (ASP) | 0.336 | Plastic | 1.656 | 21.3 | −7.36 |
| 10 | | −9.605 | (ASP) | 0.240 | | | | |
| 11 | Lens 5 | −2.343 | (ASP) | 1.086 | Plastic | 1.544 | 56.0 | 2.11 |
| 12 | | −0.897 | (ASP) | 0.056 | | | | |
| 13 | Lens 6 | 2.116 | (ASP) | 0.513 | Plastic | 1.578 | 35.2 | −2.69 |
| 14 | | 0.816 | (ASP) | 0.614 | | | | |
| 15 | Lens 7 | 14.497 | (ASP) | 0.379 | Plastic | 1.603 | 28.5 | 37.40 |
| 16 | | 40.184 | (ASP) | 0.700 | | | | |
| 17 | IR-cut Filter | Plano | | 0.210 | Glass | 1.517 | 64.2 | — |
| 18 | | Plano | | 0.240 | | | | |
| 19 | Image | Plano | | 0.000 | | | | |

Note:
Reference wavelength is 587.6 nm (d-line).
An effective radius of the stop 701 (Surface 8) is 0.810 mm.
An effective radius of the object-side surface 761 (Surface 13) is 1.280 mm.

TABLE 14

Aspheric Coefficients

| Surface # | 1 | 2 | 3 | 4 | 6 |
|---|---|---|---|---|---|
| k= | 4.3577E+00 | −1.0000E+00 | −3.9941E+00 | −2.3145E+00 | 3.2024E+01 |
| A4= | 6.1437E−02 | 7.7260E−02 | 4.0427E−02 | −3.8045E−02 | −1.4142E−02 |
| A6= | −2.9206E−02 | −7.5666E−02 | −8.4811E−02 | 1.0620E−01 | −8.3689E−03 |
| A8= | 1.3768E−02 | 5.9442E−02 | −5.8015E−03 | −3.2961E−01 | −1.8908E−02 |
| A10= | −4.5187E−03 | −3.3206E−02 | 4.5172E−02 | 5.1023E−01 | 3.7460E−02 |
| A12= | 9.7020E−04 | 1.2345E−02 | −2.0306E−02 | −3.8687E−01 | −4.7986E−02 |
| A14= | −1.2011E−04 | −2.9132E−03 | 2.8124E−03 | 1.3508E−01 | 2.0353E−02 |
| A16= | 6.2388E−06 | 3.9448E−04 | — | — | — |
| A18= | — | −2.3272E−05 | — | — | — |

| Surface # | 7 | 9 | 10 | 11 | 12 |
|---|---|---|---|---|---|
| k= | 1.3977E+00 | 0.0000E+00 | 0.0000E+00 | −1.0224E+00 | −4.0885E+00 |
| A4= | −3.6988E−02 | −1.4196E−01 | −5.2663E−02 | 7.8731E−02 | −1.7383E−01 |
| A6= | −3.8375E−02 | −2.2065E−02 | −5.4885E−02 | −8.1028E−02 | 1.7039E−01 |
| A8= | 1.0463E−01 | 1.4294E−02 | 1.0446E−02 | −4.8801E−02 | −1.4829E−01 |
| A10= | −1.7707E−01 | 5.9069E−02 | 8.1493E−02 | 1.7100E−01 | 8.9937E−02 |
| A12= | 1.6100E−01 | −6.5441E−02 | −9.3734E−02 | −1.5355E−01 | −3.3408E−02 |
| A14= | −7.8062E−02 | 3.4746E−02 | 5.0060E−02 | 7.1832E−02 | 7.6258E−03 |
| A16= | 1.5198E−02 | −9.3630E−03 | −1.4739E−02 | −1.9144E−02 | −1.0574E−03 |

TABLE 14-continued

| | | | | |
|---|---|---|---|---|
| A18= | — | 9.7656E−04 | 2.3333E−03 | 2.7609E−03 | 8.2249E−05 |
| A20= | — | — | −1.5716E−04 | −1.6744E−04 | −2.7612E−06 |

| Surface # | 13 | 14 | 15 | 16 |
|---|---|---|---|---|
| k= | −3.4013E+00 | −4.2578E+00 | −3.7032E+01 | −4.4911E+01 |
| A4= | −9.7460E−02 | −3.9395E−02 | 6.4621E−02 | 6.3596E−02 |
| A6= | 5.0808E−02 | 2.3426E−02 | −4.0940E−02 | −3.8011E−02 |
| A8= | −1.8318E−02 | −1.0613E−02 | 1.4774E−02 | 1.1919E−02 |
| A10= | 4.4282E−03 | 3.3598E−03 | −3.6957E−03 | −2.4637E−03 |
| A12= | −7.1565E−04 | −7.5579E−04 | 6.4703E−04 | 3.4991E−04 |
| A14= | 7.5914E−05 | 1.2039E−04 | −7.8888E−05 | −3.4291E−05 |
| A16= | −5.0496E−06 | −1.3370E−05 | 6.6137E−06 | 2.3004E−06 |
| A18= | 1.9031E−07 | 1.0032E−06 | −3.7182E−07 | −1.0341E−07 |
| A20= | −3.0915E−09 | −4.8099E−08 | 1.3344E−08 | 2.9729E−09 |
| A22= | — | 1.3231E−09 | −2.7565E−10 | −4.9351E−11 |
| A24= | — | −1.5827E−11 | 2.4899E−12 | 3.5959E−13 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.79 | f/|R1| + f/|R2| | 0.10 |
| Fno | 2.05 | (R5 + R6)/(R5 − R6) | 0.57 |
| HFOV [deg.] | 52.4 | (R7 + R8)/(R7 − R8) | −1.98 |
| FOV [deg.] | 104.8 | (|R11| + |R12|)/f | 0.77 |
| V1/N1 | 25.95 | f/|R13| + f/|R14| | 0.36 |
| V2/N2 | 16.09 | T23/T34 | 1.08 |
| V3/N3 | 36.26 | TL/ImgH | 1.41 |
| V4/N4 | 12.84 | 100 × |[ImgH − f × tan(HFOV)]/ [f × tan(HFOV)]| | 5.78 |
| V5/N5 | 36.26 | |f1/f2| | 1.30 |
| V6 + V7 | 63.7 | |f/f1| + |f/f2| | 0.04 |
| V6/N6 | 22.31 | f3/f2 | −0.02 |
| V7/V6 | 0.81 | f5/f3 | 0.57 |
| V7/N7 | 17.78 | Y11/Y72 | 0.51 |
| f/R1 | 0.07 | Y72/f | 1.11 |

8th Embodiment

Figure 15:
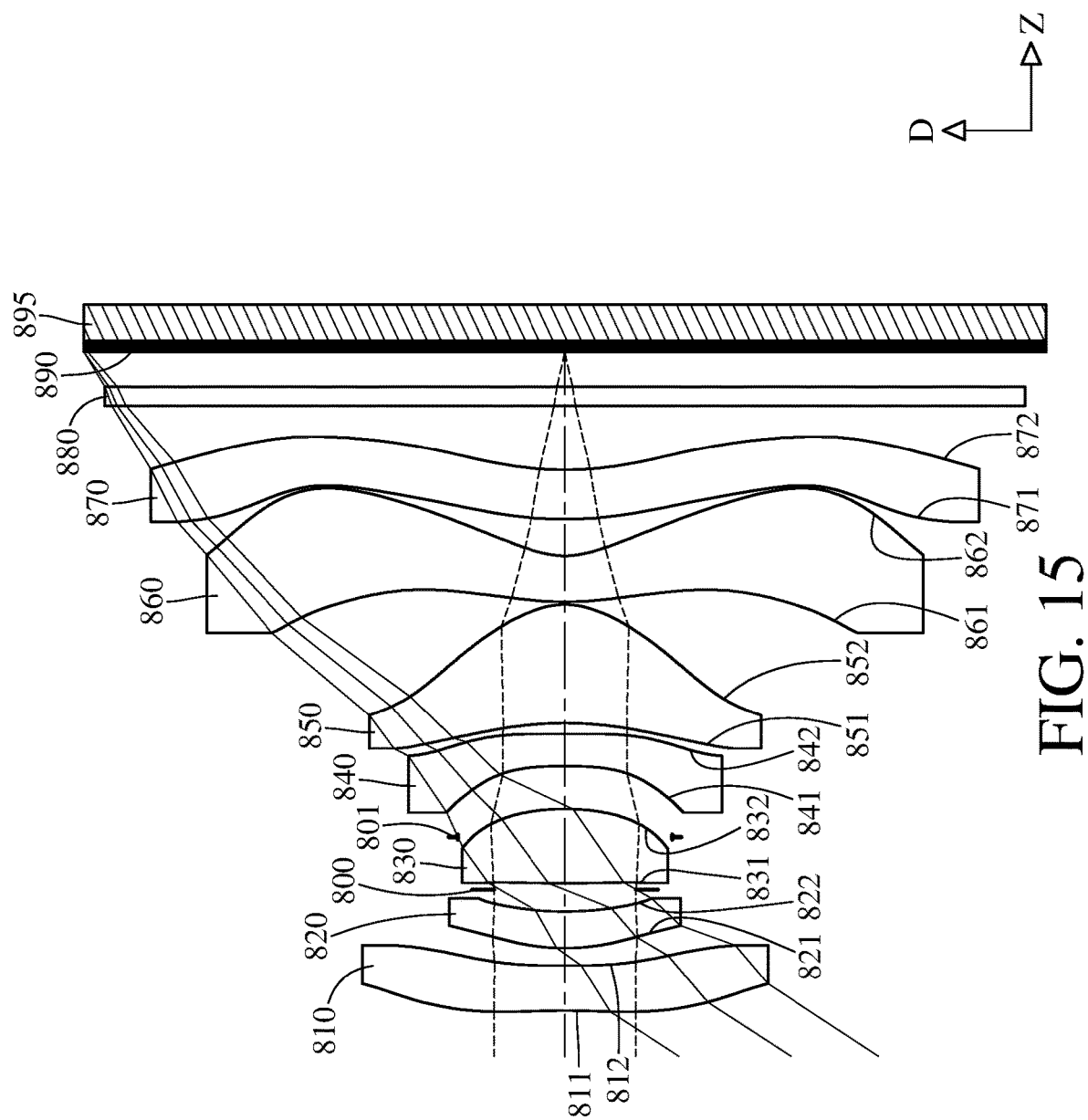
FIG. 15 is a cross-sectional view of an image capturing unit corresponding to a diagonal direction of a photosensitive area of an image sensor according to the 8th embodiment of the present disclosure.
Figure 16:
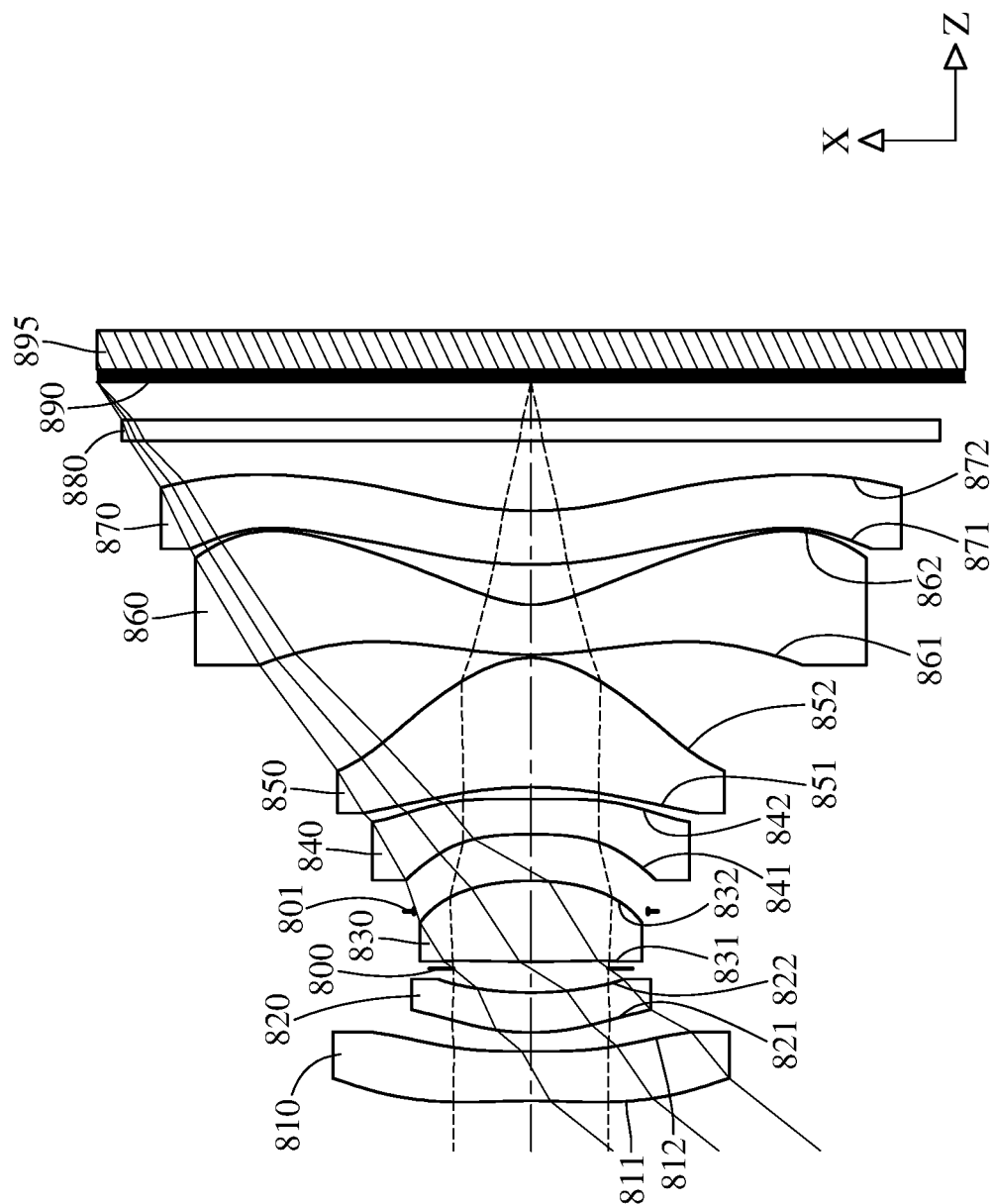
FIG. 16 is a cross-sectional view of the image capturing unit corresponding to a length direction of the photosensitive area of the image sensor according to the 8th embodiment of the present disclosure.
Figure 17:
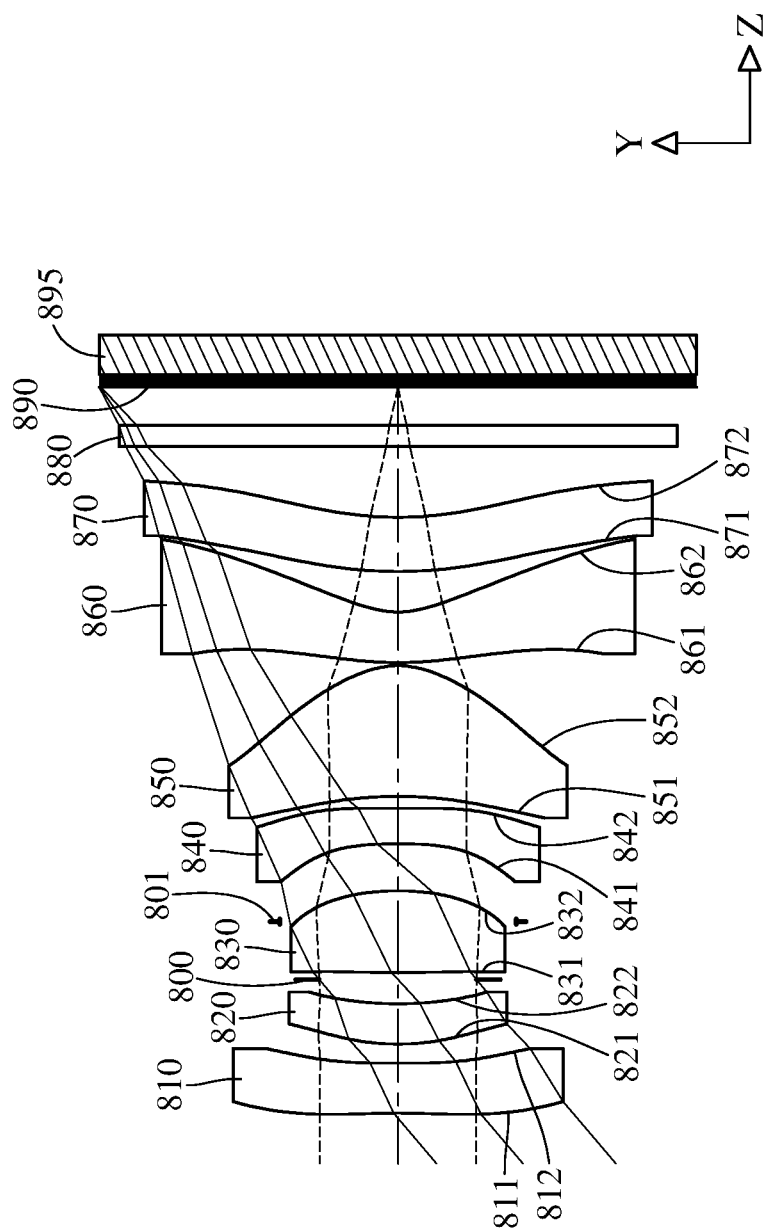
FIG. 17 is a cross-sectional view of the image capturing unit corresponding to a width direction of the photosensitive area of the image sensor according to the 8th embodiment of the present disclosure.
Figure 18:
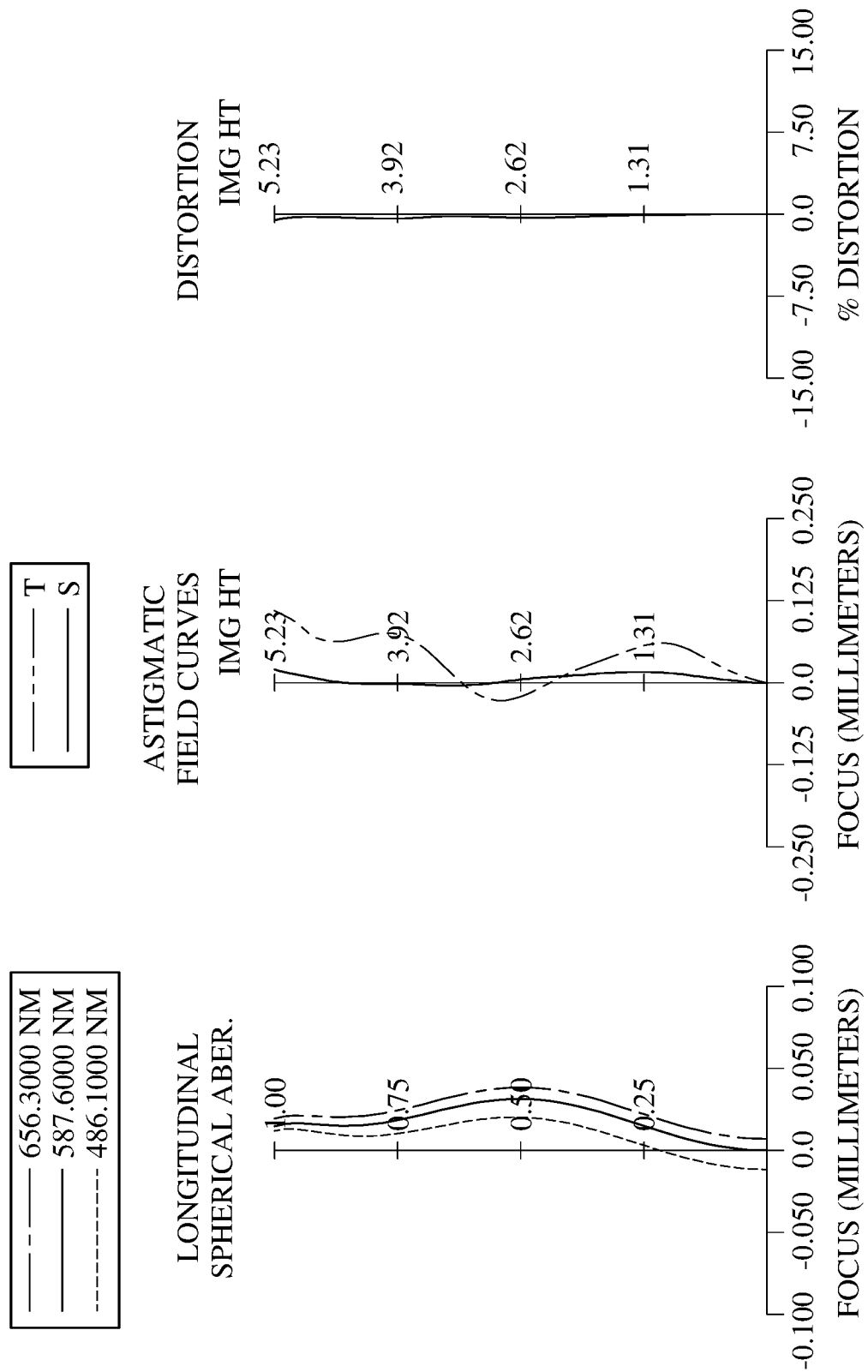
FIG. 18 shows spherical aberration curves, astigmatic field curves and a distortion curve of the image capturing unit according to the 8th embodiment.

FIG. 15 is a cross-sectional view of an image capturing unit corresponding to a diagonal direction of a photosensitive area of an image sensor according to the 8th embodiment of the present disclosure. FIG. 16 is a cross-sectional view of the image capturing unit corresponding to a length direction of the photosensitive area of the image sensor according to the 8th embodiment of the present disclosure. FIG. 17 is a cross-sectional view of the image capturing unit corresponding to a width direction of the photosensitive area of the image sensor according to the 8th embodiment of the present disclosure. FIG. 18 shows, in order from left to right, spherical aberration curves, astigmatic field curves and a distortion curve of the image capturing unit according to the 8th embodiment. In FIG. 15 to FIG. 17, the image capturing unit includes the imaging optical lens assembly (its reference numeral is omitted) of the present disclosure and an image sensor 895. The imaging optical lens assembly includes, in order from an object side to an image side along an optical path, a first lens element 810, a second lens element 820, an aperture stop 800, a third lens element 830, a stop 801, a fourth lens element 840, a fifth lens element 850, a sixth lens element 860, a seventh lens element 870, an IR-cut filter 880 and an image surface 890. The imaging optical lens assembly includes seven lens elements (810, 820, 830, 840, 850, 860 and 870) with no additional lens element disposed between each of the adjacent seven lens elements.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has at least one convex critical point in an off-axis region thereof.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The object-side surface 831 of the third lens element 830 has at least one critical point in an off-axis region thereof.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one critical point in an off-axis region thereof.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 being a freeform surface and the image-side surface 862 being aspheric. The object-side surface 861 of the sixth lens element 860 has at least one critical point in an off-axis region thereof. The image-side surface 862 of the sixth lens element 860 has at least one critical point in an off-axis region thereof.

The seventh lens element 870 with negative refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has at least one critical point in an off-axis region thereof. The image-side surface 872 of the seventh lens element 870 has at least one critical point in an off-axis region thereof.

The IR-cut filter 880 is made of glass material and located between the seventh lens element 870 and the image surface 890, and will not affect the focal length of the imaging optical lens assembly. The image sensor 895 is disposed on or near the image surface 890 of the imaging optical lens assembly.

In this embodiment, the sixth lens element 860 is a freeform lens element, the object-side surface 861 of the sixth lens element 860 is a freeform surface, and the object-side surface 861 of the sixth lens element 860 has at least one critical point within a maximum effective radius area in an off-axis region thereof. Moreover, the object-side surface 861 of the sixth lens element 860 also has at least one critical point within a maximum effective radius area in an off-axis region thereof along the Y-axis direction. Moreover, the object-side surface 861 of the sixth lens element 860 also has at least one critical point within a maximum effective radius area in an off-axis region thereof along the X-axis direction.

The equation of the freeform surface profile of the aforementioned freeform lens element of the 8th embodiment is expressed as follows:

$$z(x, y) = \frac{\frac{x^2}{Rx} + \frac{y^2}{Ry}}{1 + \sqrt{1 - (1+kx)\left(\frac{x}{Rx}\right)^2 - (1+ky)\left(\frac{y}{Ry}\right)^2}} + \sum_i \left(\frac{Axi - Ayi}{2}\left(2\frac{x^2}{x^2+y^2} - 1\right) + \frac{Axi + Ayi}{2}\right)(r(x,y))^i$$

where, z is a displacement in parallel with the optical axis from an intersection point between the freeform surface and the optical axis to a point at (x, y) on the freeform surface;

r(x, y) is a vertical distance from the point on the freeform surface to the optical axis, and r(x, y)=sqrt($x^2+y^2$);

x is the x-coordinate of the point on the freeform surface;
y is the y-coordinate of the point on the freeform surface;
Rx is the curvature radius in the X-axis direction in a paraxial region of the freeform surface;
Ry is the curvature radius in the Y-axis direction in the paraxial region of the freeform surface;
kx is the conic coefficient in the X-axis direction;
ky is the conic coefficient in the Y-axis direction;

Axi is the i-th freeform coefficient in the X-axis direction, and in the embodiments, i may be, but is not limited to, 4, 6, 8, 10, 12, 14, 16, 18, 20 and 22; and Ayi is the i-th freeform coefficient in the Y-axis direction, and in the embodiments, i may be, but is not limited to, 4, 6, 8, 10, 12, 14, 16, 18, 20 and 22.

In this and the following embodiment, the equation of the freeform surface profiles applied to the design of the freeform lens elements are not intended to limit the present disclosure. In other configurations, other equations of the freeform surface profiles, such as anamorphic aspheric equation, Zernike or x-y polynomials, can also be applied to the design of freeform lens elements according to actual requirements.

In this embodiment, a direction of light travelling into the image surface 890 on the optical axis is the positive Z-axis direction, a direction corresponding to a length direction of a photosensitive area of the image sensor 895 is the X-axis direction, a direction corresponding to a width direction of the photosensitive area of the image sensor 895 is the Y-axis direction, and a direction corresponding to a diagonal direction of the photosensitive area of the image sensor 895 is the D direction, but the present disclosure is not limited thereto.

In this embodiment, a focal length f and half of a maximum field of view HFOV of the imaging optical lens assembly refer to a focal length and half of a maximum field of view of the imaging optical lens assembly corresponding to the diagonal direction D of the photosensitive area of the image sensor 895, and these parameters have the following values: f=3.45 mm, HFOV=56.7 deg.

When a maximum distance between the optical axis and the imaging position of the imaging optical lens assembly corresponding to the length direction of the photosensitive area of the image sensor 895 is ImgHX, half of a maximum field of view of the imaging optical lens assembly corresponding to the length direction of the photosensitive area of the image sensor 895 is HFOVX, a maximum distance between the optical axis and the imaging position of the imaging optical lens assembly corresponding to the width direction of the photosensitive area of the image sensor 895 is ImgHY, and half of a maximum field of view of the imaging optical lens assembly corresponding to the width direction of the photosensitive area of the image sensor 895 is HFOVY, these parameters have the following values: ImgHX=4.327 mm, HFOVX=51.5 deg., ImgHY=2.944 mm, HFOVY=40.4 deg.

When an effective radius of one freeform surface in the Y-axis direction is SD, a displacement in parallel with the optical axis from an intersection point between the freeform surface and the optical axis to a point on the freeform surface at a distance of SD from the optical axis in the Y-axis direction is SagY, a displacement in parallel with the optical axis from the intersection point between the freeform surface and the optical axis to a point on the freeform surface at a distance of SD from the optical axis in an X-axis direction is SagX, and a maximum absolute difference between SagX and SagY is |DSagMax|, the object-side surface 861 of the sixth lens element 860 satisfies the following condition: |DSagMax|=0.32 [um].

The detailed optical data of the 8th embodiment are shown in Table 15, the aspheric surface data are shown in Table 16, and the freeform surface data are shown in Table 17 below.

TABLE 15

8th Embodiment
f = 3.45 mm, Fno = 2.23, HFOV = 56.7 deg.
ImgHX = 4.327 mm, HFOVX = 51.5 deg., ImgHY = 2.944 mm, HFOVY = 40.4 deg.

| Surface # | | Curvature Radius | | | Thickness | Material | Index | Abbe # | Focal Length | |
|---|---|---|---|---|---|---|---|---|---|---|
| | | (Y-dir.) | (X-dir.) | | | | | | (Y-dir.) | (X-dir.) |
| 0 | Object | Plano | | | Infinity | | | | | |
| 1 | Lens 1 | −7.813 | | (ASP) | 0.494 | Plastic | 1.545 | 56.1 | −12.58 | |
| 2 | | 57.292 | | (ASP) | 0.189 | | | | | |
| 3 | Lens 2 | 2.442 | | (ASP) | 0.398 | Plastic | 1.587 | 28.3 | 11.67 | |
| 4 | | 3.565 | | (ASP) | 0.239 | | | | | |
| 5 | Ape. Stop | Plano | | | 0.070 | | | | | |
| 6 | Lens 3 | 16.905 | | (ASP) | 0.808 | Plastic | 1.544 | 56.0 | 4.16 | |
| 7 | | −2.566 | | (ASP) | −0.305 | | | | | |
| 8 | Stop | Plano | | | 0.770 | | | | | |
| 9 | Lens 4 | −5.516 | | (ASP) | 0.350 | Plastic | 1.669 | 19.5 | −6.61 | |
| 10 | | 22.876 | | (ASP) | 0.119 | | | | | |
| 11 | Lens 5 | −4.046 | | (ASP) | 1.292 | Plastic | 1.544 | 56.0 | 1.67 | |
| 12 | | −0.826 | | (ASP) | 0.030 | | | | | |
| 13 | Lens 6 | 3.297 | 3.294 | (FFS) | 0.500 | Plastic | 1.566 | 37.4 | −2.17 | −2.17 |
| 14 | | 0.845 | | (ASP) | 0.402 | | | | | |
| 15 | Lens 7 | 4.594 | | (ASP) | 0.535 | Plastic | 1.614 | 26.0 | −29.60 | |
| 16 | | 3.504 | | (ASP) | 0.700 | | | | | |
| 17 | IR-cut Filter | Plano | | | 0.210 | Glass | 1.517 | 64.2 | — | |
| 18 | | Plano | | | 0.372 | | | | | |
| 19 | Image | Plano | | | 0.000 | | | | | |

Note:
Reference wavelength is 587.6 nm (d-line).
An effective radius of the stop 801 (Surface 8) is 1.160 mm.

TABLE 16

Aspheric Coefficients

| Surface # | 1 | 2 | 3 | 4 | 6 |
|---|---|---|---|---|---|
| k= | 8.2992E+00 | 8.9964E+01 | −3.3455E+00 | 7.6337E+00 | 7.2805E+01 |
| A4= | 1.0235E−01 | 1.6918E−01 | 7.7606E−02 | −1.1573E−02 | −1.4663E−02 |
| A6= | −5.2978E−02 | −1.6255E−01 | −1.4343E−01 | 2.8290E−02 | −3.3571E−02 |
| A8= | 2.2824E−02 | 9.5906E−02 | 6.8346E−02 | −2.8150E−01 | 4.6085E−02 |
| A10= | −6.8081E−03 | −3.8895E−02 | −1.2207E−02 | 6.1777E−01 | −3.8606E−02 |
| A12= | 1.3189E−03 | 1.0147E−02 | 3.2184E−03 | −5.8487E−01 | −4.8481E−02 |
| A14= | −1.5084E−04 | −1.5087E−03 | −9.5210E−04 | 2.3137E−01 | 4.7185E−02 |
| A16= | 7.6386E−06 | 9.6674E−05 | — | — | — |

| Surface # | 7 | 9 | 10 | 11 | 12 |
|---|---|---|---|---|---|
| k= | 2.1716E+00 | 0.0000E+00 | 0.0000E+00 | −1.3463E+00 | −3.8652E+00 |
| A4= | −3.4057E−02 | −2.0730E−01 | −1.4085E−01 | −7.2738E−04 | −1.5499E−01 |
| A6= | −1.5584E−01 | 6.6248E−02 | 4.6669E−02 | −4.0255E−02 | 1.3781E−01 |
| A8= | 4.7477E−01 | −7.4676E−02 | 2.4858E−02 | 1.2195E−01 | −1.1076E−01 |
| A10= | −8.5049E−01 | 6.9295E−02 | −4.3518E−02 | −1.3156E−01 | 7.0399E−02 |
| A12= | 8.4225E−01 | 3.3138E−03 | 2.8325E−02 | 7.6675E−02 | −3.0692E−02 |
| A14= | −4.3692E−01 | −2.4129E−02 | −9.5424E−03 | −2.6504E−02 | 8.9669E−03 |
| A16= | 8.8818E−02 | 6.9734E−03 | 1.6253E−03 | 5.4311E−03 | −1.6708E−03 |
| A18= | — | −2.2105E−04 | −1.1087E−04 | −6.0801E−04 | 1.7704E−04 |
| A20= | — | — | — | 2.8541E−05 | −8.0269E−06 |

| Surface # | 14 | 15 | 16 |
|---|---|---|---|
| k= | −5.4934E+00 | −4.0030E+00 | −6.8294E+00 |
| A4= | −1.9641E−02 | 1.9080E−02 | 7.4357E−03 |
| A6= | 1.0031E−02 | −2.1661E−02 | −1.1164E−02 |
| A8= | −4.4886E−03 | 7.8550E−03 | 3.5241E−03 |
| A10= | 1.2935E−03 | −1.5267E−03 | −5.9441E−04 |
| A12= | −2.3490E−04 | 1.7632E−04 | 6.1464E−05 |
| A14= | 2.6777E−05 | −1.2719E−05 | −4.0887E−06 |
| A16= | −1.9117E−06 | 5.8048E−07 | 1.7609E−07 |
| A18= | 8.3005E−08 | −1.6315E−08 | −4.7504E−09 |
| A20= | −2.0033E−09 | 2.5772E−10 | 7.2968E−11 |
| A22= | 2.0598E−11 | −1.7489E−12 | −4.8666E−13 |

TABLE 17

Freeform Coefficients

| Surface # | 13 |
|---|---|
| kx= | −7.8410E+00 |
| Ax4= | −6.9929E−02 |
| Ax6= | 4.8841E−02 |
| Ax8= | −2.5016E−02 |
| Ax10= | 8.1094E−03 |
| Ax12= | −1.7164E−03 |
| Ax14= | 2.4241E−04 |
| Ax16= | −2.2611E−05 |
| Ax18= | 1.3281E−06 |
| Ax20= | −4.4082E−08 |
| Ax22= | 6.2349E−10 |
| ky= | −7.8388E+00 |
| Ay4= | −6.9938E−02 |
| Ay6= | 4.8840E−02 |
| Ay8= | −2.5016E−02 |
| Ay10= | 8.1094E−03 |
| Ay12= | −1.7164E−03 |
| Ay14= | 2.4241E−04 |
| Ay16= | −2.2611E−05 |
| Ay18= | 1.3281E−06 |
| Ay20= | −4.4082E−08 |
| Ay22= | 6.2348E−10 |

In Table 15, the curvature radius and the focal length in the X-axis direction (X-dir.) are given only when the curvature radius and the focal length of the surface in the X-axis direction may be different from that in the Y-axis direction. In Table 16, the equation of the axisymmetric aspheric surface profiles of the aforementioned lens elements is the same as the equation of the 1st embodiment. In Table 17, kx represents the conic coefficient of the equation of the freeform surface profiles in the X-axis direction, and ky represents the conic coefficient of the equation of the freeform surface profiles in the Y-axis direction. Ax4-Ax22 represent the freeform coefficients ranging from the 4th order to the 22nd order in the X-axis direction, and Ay4-Ay22 represent the freeform coefficients ranging from the 4th order to the 22nd order in the Y-axis direction.

Also, except for the parameters of f, HFOV, HFOVX, HFOVY, ImgHX, ImgHY, |DSagMax| mentioned in this embodiment, the definitions of the parameters shown in the following table are the same as those stated in the 1st embodiment with corresponding values for the 8th embodiment, so an explanation in this regard will not be provided again.

Moreover, these parameters can be calculated from Table 15, Table 16 and Table 17 as the following values and satisfy the following conditions:

8th Embodiment

| f [mm] | 3.45 | f/R1 | −0.44 |
|---|---|---|---|
| Fno | 2.23 | f/|R1| + f/|R2| | 0.50 |
| HFOV [deg.] | 56.7 | (R5 + R6)/(R5 − R6) | 0.74 |
| HFOVX [deg.] | 51.5 | (R7 + R8)/(R7 − R8) | −0.61 |
| HFOVY [deg.] | 40.4 | (|R11| + |R12|)/f | 1.20 |
| ImgHX [mm] | 4.327 | f/|R13| + f/|R14| | 1.73 |
| ImgHY [mm] | 2.944 | T23/T34 | 0.66 |
| FOV [deg.] | 113.4 | TL/ImgH | 1.37 |
| V1/N1 | 36.30 | 100 × |[ImgH − f × tan(HFOV)]/[f × tan(HFOV)]| | 0.28 |
| V2/N2 | 17.83 | |f1/f2| | 1.08 |
| V3/N3 | 36.26 | |f/f1| + |f/f2| | 0.57 |
| V4/N4 | 11.65 | f3/f2 | 0.36 |
| V5/N5 | 36.26 | f5/f3 | 0.40 |
| V6 + V7 | 63.4 | Y11/Y72 | 0.47 |
| V6/N6 | 23.91 | Y72/f | 1.30 |
| V7/V6 | 0.69 | |DSagMax| [um] | 0.32 |
| V7/N7 | 16.09 | | |

9th Embodiment

Figure 19:
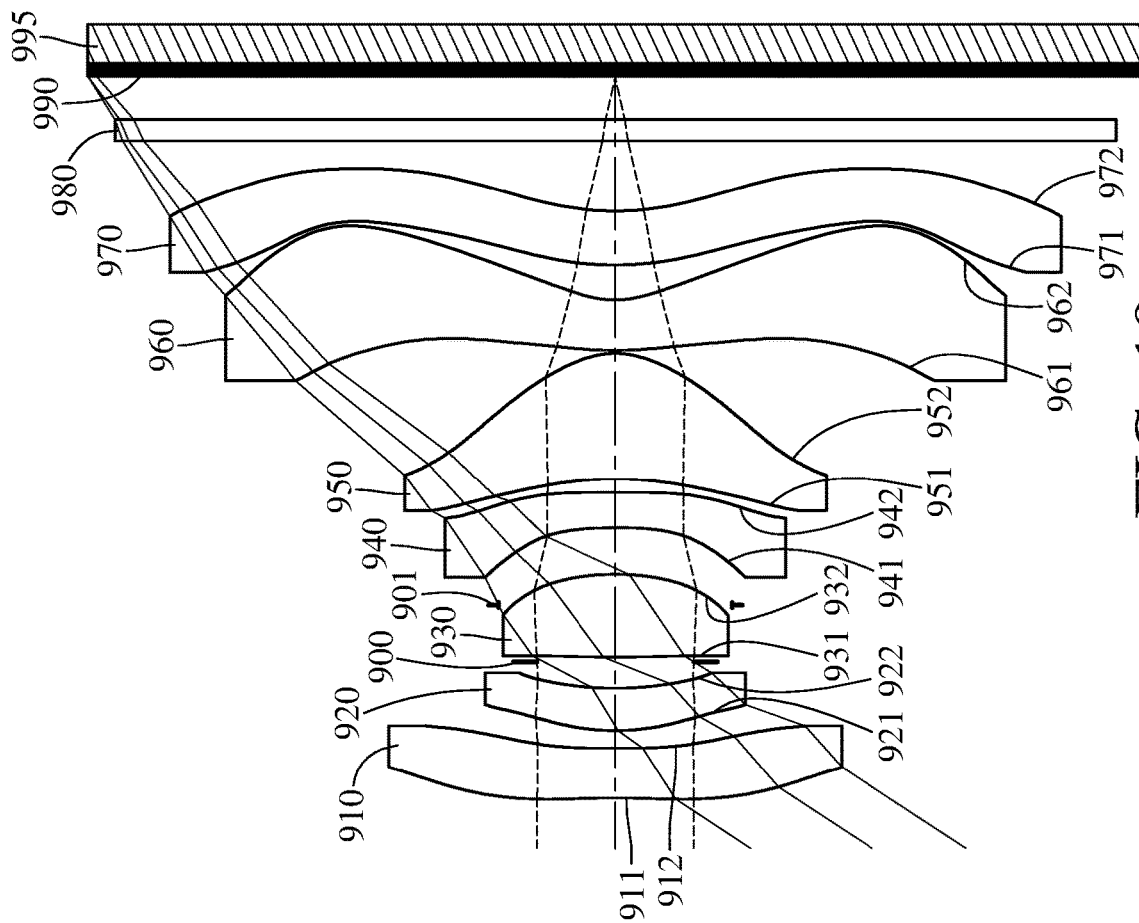
FIG. 19 is a cross-sectional view of an image capturing unit corresponding to a diagonal direction of a photosensitive area of an image sensor according to the 9th embodiment of the present disclosure.
Figure 20:
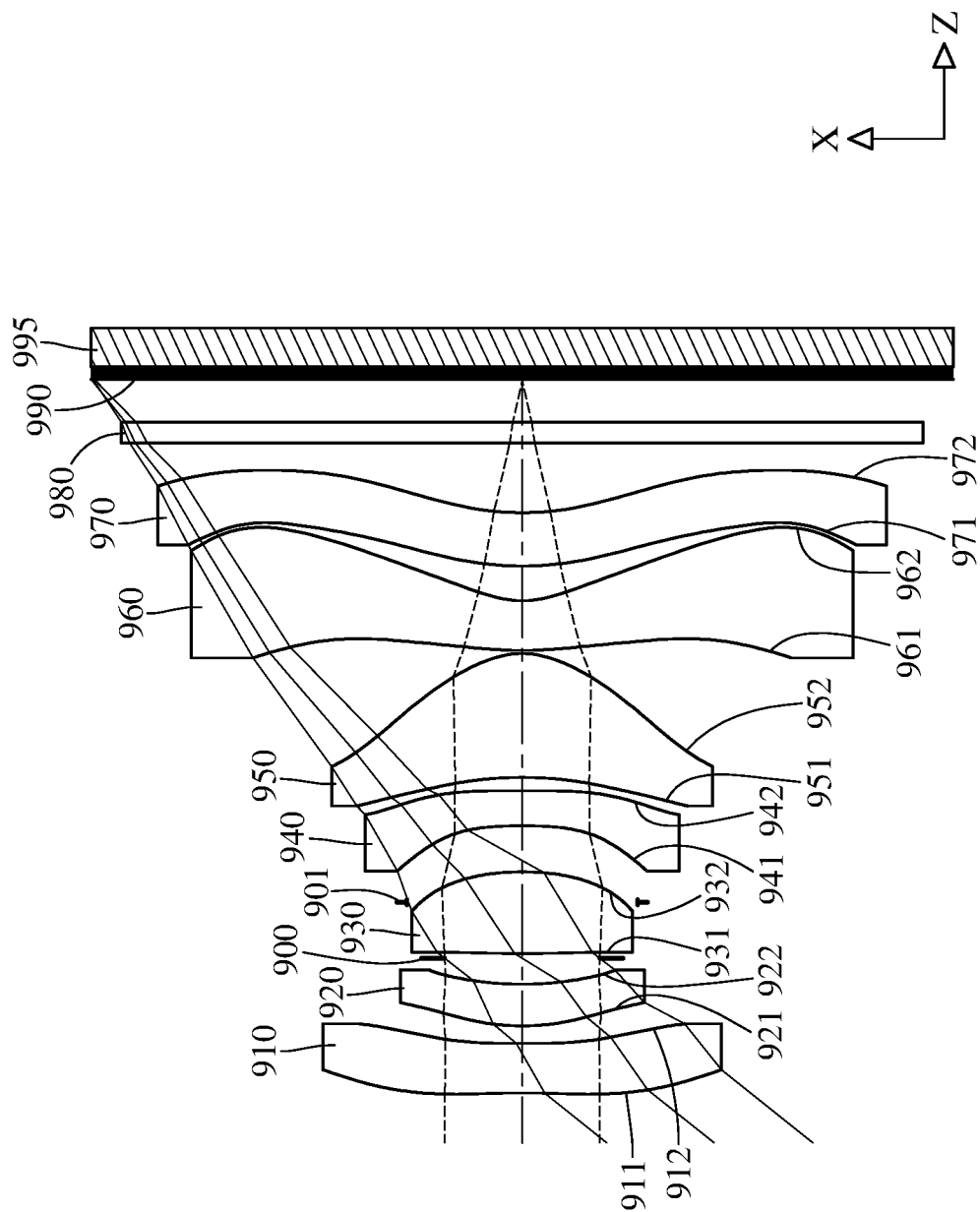
FIG. 20 is a cross-sectional view of the image capturing unit corresponding to a length direction of the photosensitive area of the image sensor according to the 9th embodiment of the present disclosure.
Figure 21:
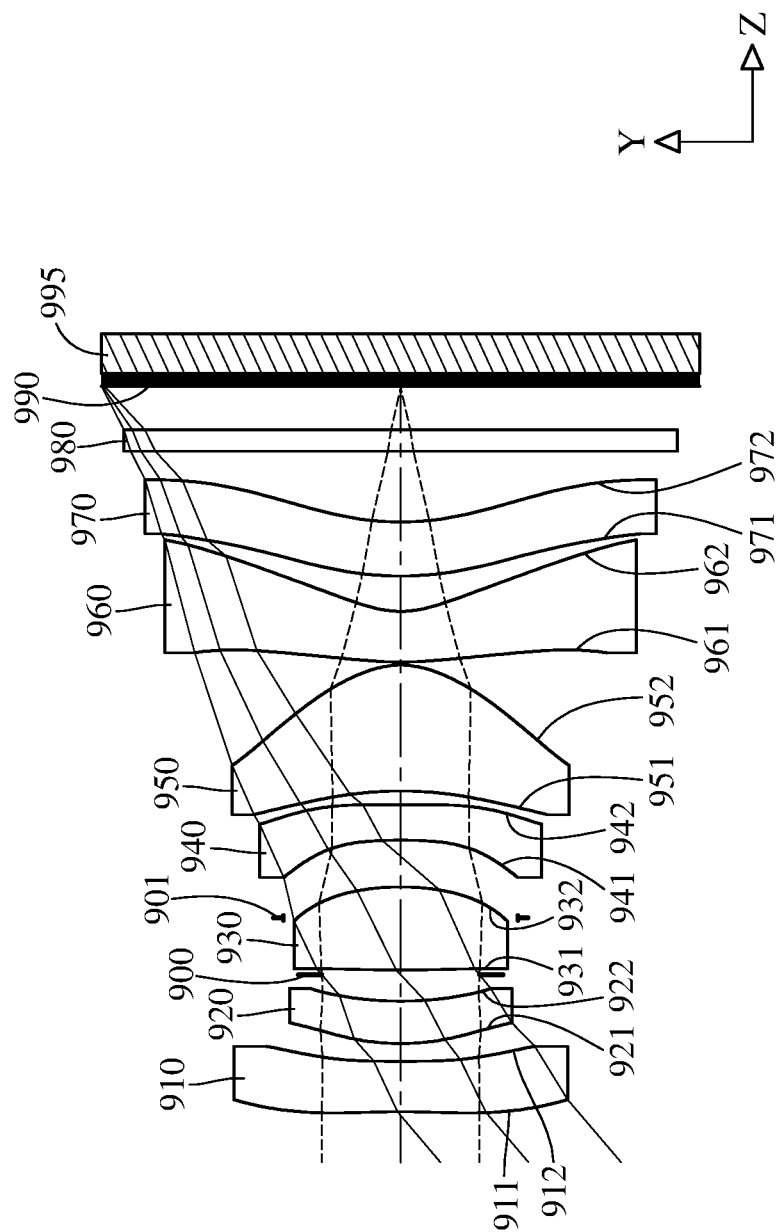
FIG. 21 is a cross-sectional view of the image capturing unit corresponding to a width direction of the photosensitive area of the image sensor according to the 9th embodiment of the present disclosure.
Figure 22:
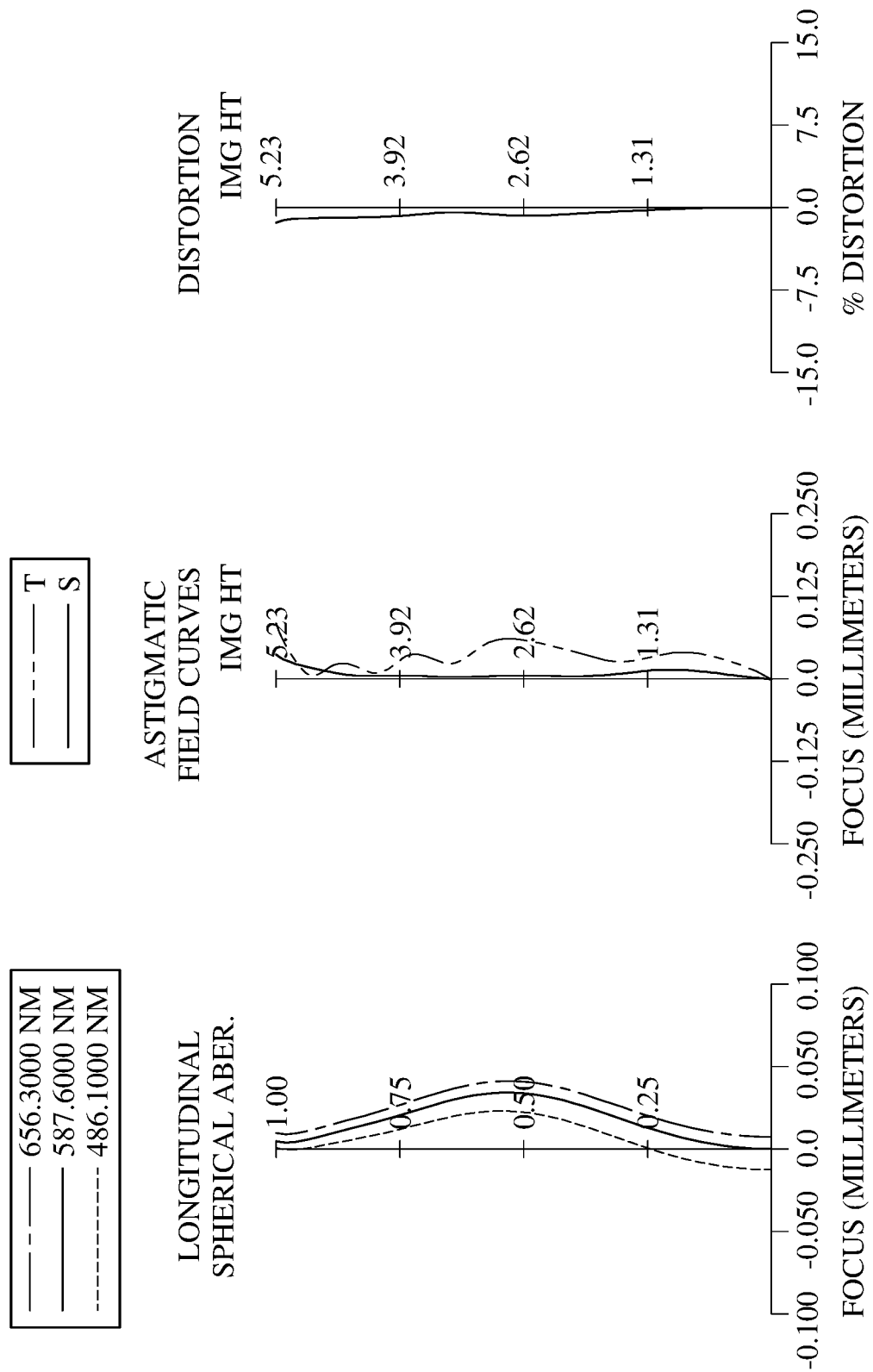
FIG. 22 shows spherical aberration curves, astigmatic field curves and a distortion curve of the image capturing unit according to the 9th embodiment.

FIG. 19 is a cross-sectional view of an image capturing unit corresponding to a diagonal direction of a photosensitive area of an image sensor according to the 9th embodiment of the present disclosure. FIG. 20 is a cross-sectional view of the image capturing unit corresponding to a length direction of the photosensitive area of the image sensor according to the 9th embodiment of the present disclosure. FIG. 21 is a cross-sectional view of the image capturing unit corresponding to a width direction of the photosensitive area of the image sensor according to the 9th embodiment of the present disclosure. FIG. 22 shows, in order from left to right, spherical aberration curves, astigmatic field curves and a distortion curve of the image capturing unit according to the 9th embodiment. In FIG. 19 to FIG. 21, the image capturing unit includes the imaging optical lens assembly (its reference numeral is omitted) of the present disclosure and an image sensor 995. The imaging optical lens assembly includes, in order from an object side to an image side along an optical path, a first lens element 910, a second lens element 920, an aperture stop 900, a third lens element 930, a stop 901, a fourth lens element 940, a fifth lens element 950, a sixth lens element 960, a seventh lens element 970, an IR-cut filter 980 and an image surface 990. The imaging optical lens assembly includes seven lens elements (910, 920, 930, 940, 950, 960 and 970) with no additional lens element disposed between each of the adjacent seven lens elements.

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one convex critical point in an off-axis region thereof.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has at least one critical point in an off-axis region thereof. The image-side surface 962 of the sixth lens element 960 has at least one critical point in an off-axis region thereof.

The seventh lens element 970 with negative refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both freeform surfaces. The object-side surface 971 of the seventh lens element 970 has at least one critical point in an off-axis region thereof. The image-side surface 972 of the seventh lens element 970 has at least one critical point in an off-axis region thereof.

The IR-cut filter 980 is made of glass material and located between the seventh lens element 970 and the image surface 990, and will not affect the focal length of the imaging optical lens assembly. The image sensor 995 is disposed on or near the image surface 990 of the imaging optical lens assembly.

In this embodiment, the seventh lens element 970 is a freeform lens element, the object-side surface 971 and the image-side surface 972 of the seventh lens element 970 are both freeform surfaces, the object-side surface 971 of the seventh lens element 970 has at least one critical point within a maximum effective radius area in an off-axis region thereof, and the image-side surface 972 of the seventh lens element 970 has at least one critical point within a maximum effective radius area in an off-axis region thereof. Moreover, the object-side surface 971 of the seventh lens element 970 also has at least one critical point within a maximum effective radius area in an off-axis region thereof along the X-axis direction. Moreover, the image-side surface 972 of the seventh lens element 970 also has at least one critical point within a maximum effective radius area in an off-axis region thereof along the X-axis direction.

Figure 34:
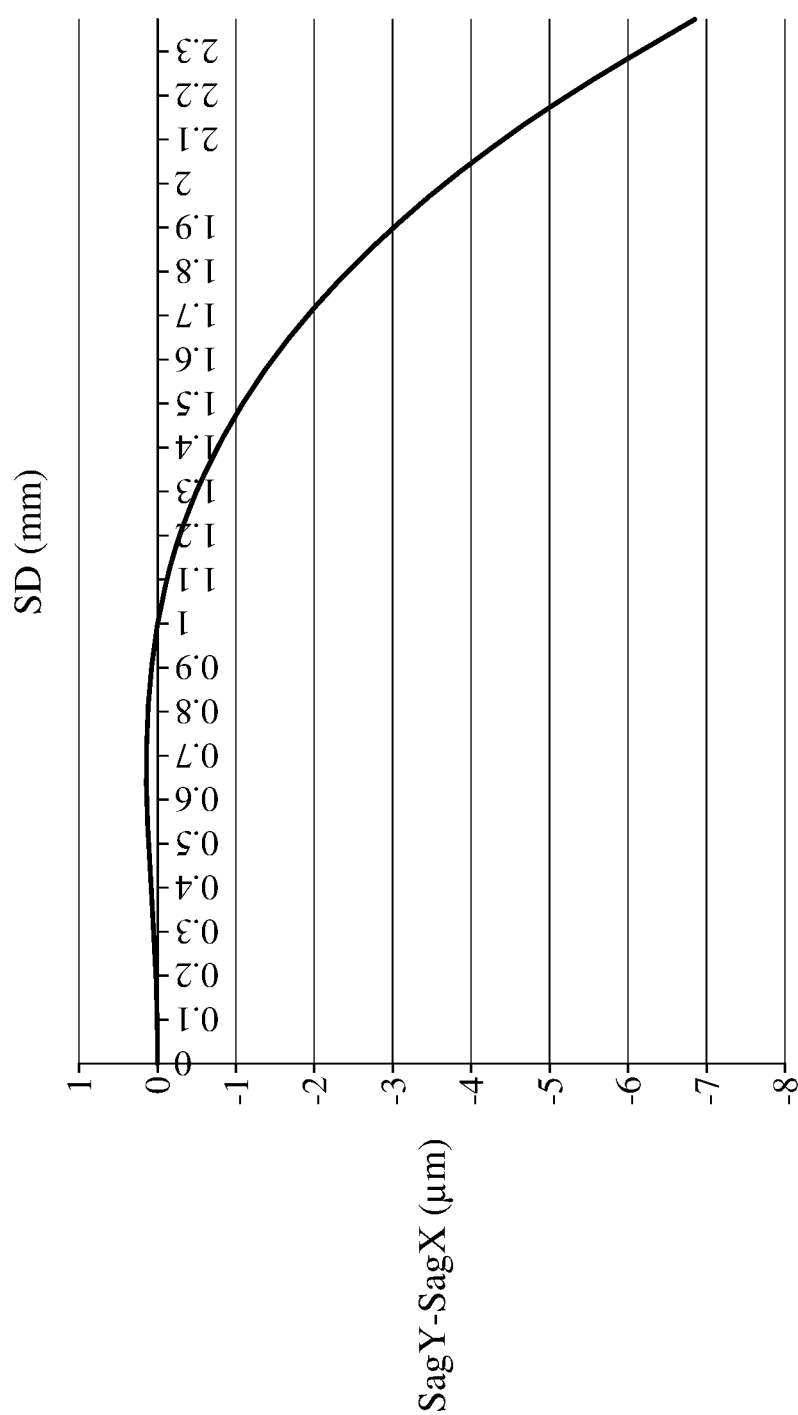
FIG. 34 is a data graph of SagY-SagX of the object-side surface of the seventh lens element according to the 9th embodiment of the present disclosure.
Figure 35:
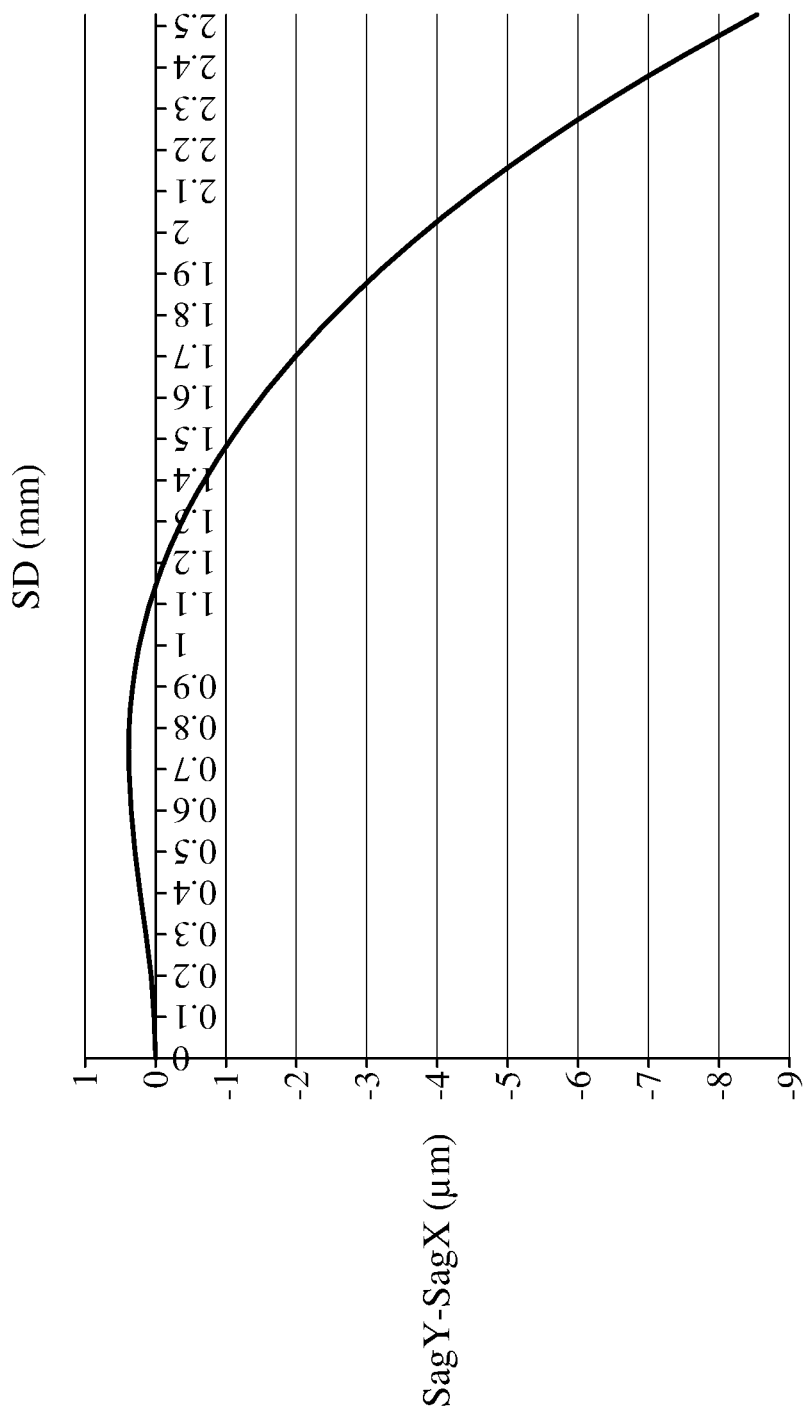
FIG. 35 is a data graph of SagY-SagX of the image-side surface of the seventh lens element according to the 9th embodiment of the present disclosure.

In this embodiment, the object-side surface 971 of the seventh lens element 970 satisfies the following condition: |DSagMax|=6.83 [um], and the image-side surface 972 of the seventh lens element 970 satisfies the following condition: |DSagMax|=8.53 [um]. Please refer to FIG. 34 and FIG. 35. FIG. 34 is a data graph of SagY-SagX of the object-side surface of the seventh lens element according to the 9th embodiment of the present disclosure. FIG. 35 is a data graph of SagY-SagX of the image-side surface of the seventh lens element according to the 9th embodiment of the present disclosure. FIG. 34 shows the values of SagY-SagX at each point at a distance of 0 to SDMaxY from the optical axis on the object-side surface 971 of the seventh lens element 970, and FIG. 35 shows the values of SagY-SagX at each point at a distance of 0 to SDMaxY from the optical axis on the image-side surface 972 of the seventh lens element 970. In FIG. 34 and FIG. 35, the horizontal axis represents the effective radius SD of the freeform surface in the Y-axis direction, and the vertical axis represents the values of SagY-SagX.

The detailed optical data of the 9th embodiment are shown in Table 18, the aspheric surface data are shown in Table 19, and the freeform surface data are shown in Table 20 below. The tables presented below for the 9th embodiment are the corresponding schematic parameter and aberration curves, and the definitions of the tables are the same as Table 15, Table 16 and Table 17 of the 8th embodiment. Therefore, an explanation in this regard will not be provided again.

TABLE 18

9th Embodiment
f = 3.47 mm, Fno = 2.23, HFOV = 56.7 deg.
ImgHX = 4.327 mm, HFOVX = 51.4 deg., ImgHY = 2.944 mm, HFOVY = 40.4 deg.

| Surface # | | Curvature Radius | | Thickness | Material | Index | Abbe # | Focal Length | |
|---|---|---|---|---|---|---|---|---|---|
| | | (Y-dir.) | (X-dir.) | | | | | (Y-dir.) | (X-dir.) |
| 0 | Object | | Plano | Infinity | | | | | |
| 1 | Lens 1 | −8.015 | | (ASP) | 0.494 | Plastic | 1.544 | 56.0 | −12.10 |
| 2 | | 37.621 | | (ASP) | 0.189 | | | | |
| 3 | Lens 2 | 2.381 | | (ASP) | 0.398 | Plastic | 1.591 | 30.6 | 11.46 |
| 4 | | 3.434 | | (ASP) | 0.239 | | | | |
| 5 | Ape. Stop | | Plano | 0.070 | | | | | |
| 6 | Lens 3 | 14.618 | | (ASP) | 0.808 | Plastic | 1.544 | 56.0 | 4.14 |
| 7 | | −2.610 | | (ASP) | −0.305 | | | | |
| 8 | Stop | | Plano | 0.770 | | | | | |
| 9 | Lens 4 | −5.490 | | (ASP) | 0.350 | Plastic | 1.669 | 19.5 | −6.95 |
| 10 | | 31.119 | | (ASP) | 0.119 | | | | |
| 11 | Lens 5 | −3.736 | | (ASP) | 1.292 | Plastic | 1.544 | 56.0 | 1.70 |
| 12 | | −0.828 | | (ASP) | 0.030 | | | | |
| 13 | Lens 6 | 3.506 | | (ASP) | 0.500 | Plastic | 1.570 | 38.2 | −2.15 |
| 14 | | 0.860 | | (ASP) | 0.402 | | | | |
| 15 | Lens 7 | 3.124 | 3.138 | (FFS) | 0.535 | Plastic | 1.607 | 27.5 | −51.05 | −53.50 |
| 16 | | 2.654 | 2.677 | (FFS) | 0.700 | | | | | |
| 17 | IR-cut Filter | | Plano | 0.210 | Glass | 1.517 | 64.2 | — | |
| 18 | | | Plano | 0.372 | | | | | |
| 19 | Image | | Plano | 0.000 | | | | | |

Note:
Reference wavelength is 587.6 nm (d-line).
An effective radius of the stop 901 (Surface 8) is 1.158 mm.

TABLE 19

Aspheric Coefficients

| Surface # | 1 | 2 | 3 | 4 | 6 |
|---|---|---|---|---|---|
| k= | 8.7143E+00 | 5.6281E+01 | −3.3611E+00 | 7.0586E+00 | 8.6554E+01 |
| A4= | 1.0145E−01 | 1.6280E−01 | 7.2758E−02 | −5.7585E−03 | −1.2268E−02 |
| A6= | −5.6039E−02 | −1.5191E−01 | −1.2578E−01 | −2.1438E−02 | −5.2446E−02 |
| A8= | 2.8321E−02 | 8.2827E−02 | 5.3729E−02 | −1.0672E−01 | 1.6960E−01 |
| A10= | −1.1091E−02 | −3.0150E−02 | −1.9521E−02 | 3.1011E−01 | −3.8866E−01 |
| A12= | 3.1334E−03 | 6.9135E−03 | 1.4593E−02 | −3.5114E−01 | 4.2406E−01 |
| A14= | −5.8134E−04 | −8.8454E−04 | −4.0656E−03 | 1.7586E−01 | −1.8680E−01 |
| A16= | 6.1144E−05 | 4.7973E−05 | — | — | — |
| A18= | −2.7019E−06 | — | — | — | — |

| Surface # | 7 | 9 | 10 | 11 | 12 |
|---|---|---|---|---|---|
| k= | 1.7799E+00 | 0.0000E+00 | 0.0000E+00 | −1.2740E+00 | −3.8439E+00 |
| A4= | −5.4671E−02 | −2.1321E−01 | −1.3781E−01 | 9.7636E−03 | −1.6000E−01 |
| A6= | −2.7288E−02 | 9.8530E−02 | 3.8036E−02 | −8.0517E−02 | 1.3980E−01 |
| A8= | 4.2085E−02 | −1.3979E−01 | 4.5388E−02 | 1.9717E−01 | −1.1091E−01 |
| A10= | −4.0469E−02 | 1.5505E−01 | −6.6847E−02 | −2.0950E−01 | 7.4657E−02 |
| A12= | −6.3170E−03 | −7.3208E−02 | 4.2078E−02 | 1.2505E−01 | −3.6124E−02 |
| A14= | 2.8321E−02 | 1.7976E−02 | −1.4030E−02 | −4.5033E−02 | 1.1787E−02 |
| A16= | −1.3825E−02 | −5.1175E−03 | 2.4062E−03 | 9.7080E−03 | −2.4159E−03 |
| A18= | — | 1.1420E−03 | −1.6773E−04 | −1.1496E−03 | 2.7666E−04 |
| A20= | — | — | — | 5.7234E−05 | −1.3385E−05 |

| Surface # | 13 | 14 |
|---|---|---|
| k= | −7.0849E+00 | −5.7351E+00 |
| A4= | −1.0603E−01 | −4.1762E−02 |
| A6= | 8.8431E−02 | 2.9578E−02 |
| A8= | −4.4595E−02 | −1.2030E−02 |
| A10= | 1.3995E−02 | 2.9588E−03 |
| A12= | −2.9005E−03 | −4.6068E−04 |
| A14= | 4.0544E−04 | 4.5710E−05 |
| A16= | −3.7685E−05 | −2.8512E−06 |
| A18= | 2.2152E−06 | 1.0687E−07 |
| A20= | −7.3833E−08 | −2.1588E−09 |
| A22= | 1.0529E−09 | 1.7487E−11 |

TABLE 20

Freeform Coefficients

| Surface # | 15 | 16 |
|---|---|---|
| kx= | −5.5028E+00 | −6.5125E+00 |
| Ax4= | 1.7472E−02 | 1.5899E−02 |
| Ax6= | −1.8957E−02 | −1.4694E−02 |
| Ax8= | 5.8544E−03 | 3.9921E−03 |
| Ax10= | −8.8882E−04 | −6.1052E−04 |
| Ax12= | 6.6950E−05 | 5.9849E−05 |
| Ax14= | −1.5931E−06 | −3.9417E−06 |
| Ax16= | −1.1355E−07 | 1.7482E−07 |
| Ax18= | 9.7946E−09 | −5.0129E−09 |
| Ax20= | −2.8646E−10 | 8.3660E−11 |
| Ax22= | 3.0768E−12 | −6.1398E−13 |
| ky= | −5.6596E+00 | −6.7076E+00 |
| Ay4= | 1.7384E−02 | 1.5786E−02 |
| Ay6= | −1.8960E−02 | −1.4688E−02 |
| Ay8= | 5.8544E−03 | 3.9916E−03 |
| Ay10= | −8.8881E−04 | −6.1054E−04 |
| Ay12= | 6.6951E−05 | 5.9849E−05 |
| Ay14= | −1.5930E−06 | −3.9417E−06 |
| Ay16= | −1.1355E−07 | 1.7482E−07 |
| Ay18= | 9.7946E−09 | −5.0129E−09 |
| Ay20= | −2.8646E−10 | 8.3658E−11 |
| Ay22= | 3.0768E−12 | −6.1398E−13 |

In the 9th embodiment, the equations of the freeform surface profiles of the aforementioned lens elements are the same as the equations of the 8th embodiment, and the equation of the axisymmetric aspheric surface profiles of the aforementioned lens elements is the same as the equation of the 1st embodiment. Also, except for the parameters of f, HFOV, HFOVX, HFOVY, ImgHX, ImgHY, |DSagMax| shown in the following table are the same as those stated in the 8th embodiment, the definitions of the parameters shown in the following table are the same as those stated in the 1st embodiment with corresponding values for the 9th embodiment, so an explanation in this regard will not be provided again.

Moreover, these parameters can be calculated from Table 18, Table 19 and Table 20 as the following values and satisfy the following conditions:

| 9th Embodiment | | | |
|---|---|---|---|
| f [mm] | 3.47 | f/R1 | −0.43 |
| Fno | 2.23 | f/|R1| + f/|R2| | 0.52 |
| HFOV [deg.] | 56.7 | (R5 + R6)/(R5 − R6) | 0.70 |
| HFOVX [deg.] | 51.4 | (R7 + R8)/(R7 − R8) | −0.70 |
| HFOVY [deg.] | 40.4 | (|R11| + |R12|)/f | 1.26 |
| ImgHX [mm] | 4.327 | f/|R13| + f/|R14| | 2.40 |
| ImgHY [mm] | 2.944 | T23/T34 | 0.67 |
| FOV [deg.] | 113.4 | TL/ImgH | 1.37 |
| V1/N1 | 36.26 | 100 × |[ImgH − f × tan(HFOV)]/ [f × tan(HFOV)]| | 0.82 |
| V2/N2 | 19.23 | |f1/f2| | 1.06 |
| V3/N3 | 36.25 | |f/f1| + |f/f2| | 0.59 |
| V4/N4 | 11.65 | f3/f2 | 0.36 |
| V5/N5 | 36.26 | f5/f3 | 0.41 |
| V6 + V7 | 65.7 | Y11/Y72 | 0.49 |
| V6/N6 | 24.34 | Y72/f | 1.27 |
| V7/V6 | 0.72 | |DSagMax| [um] | 6.83; 8.53 |
| V7/N7 | 17.10 | — | — |

10th Embodiment

Figure 23:
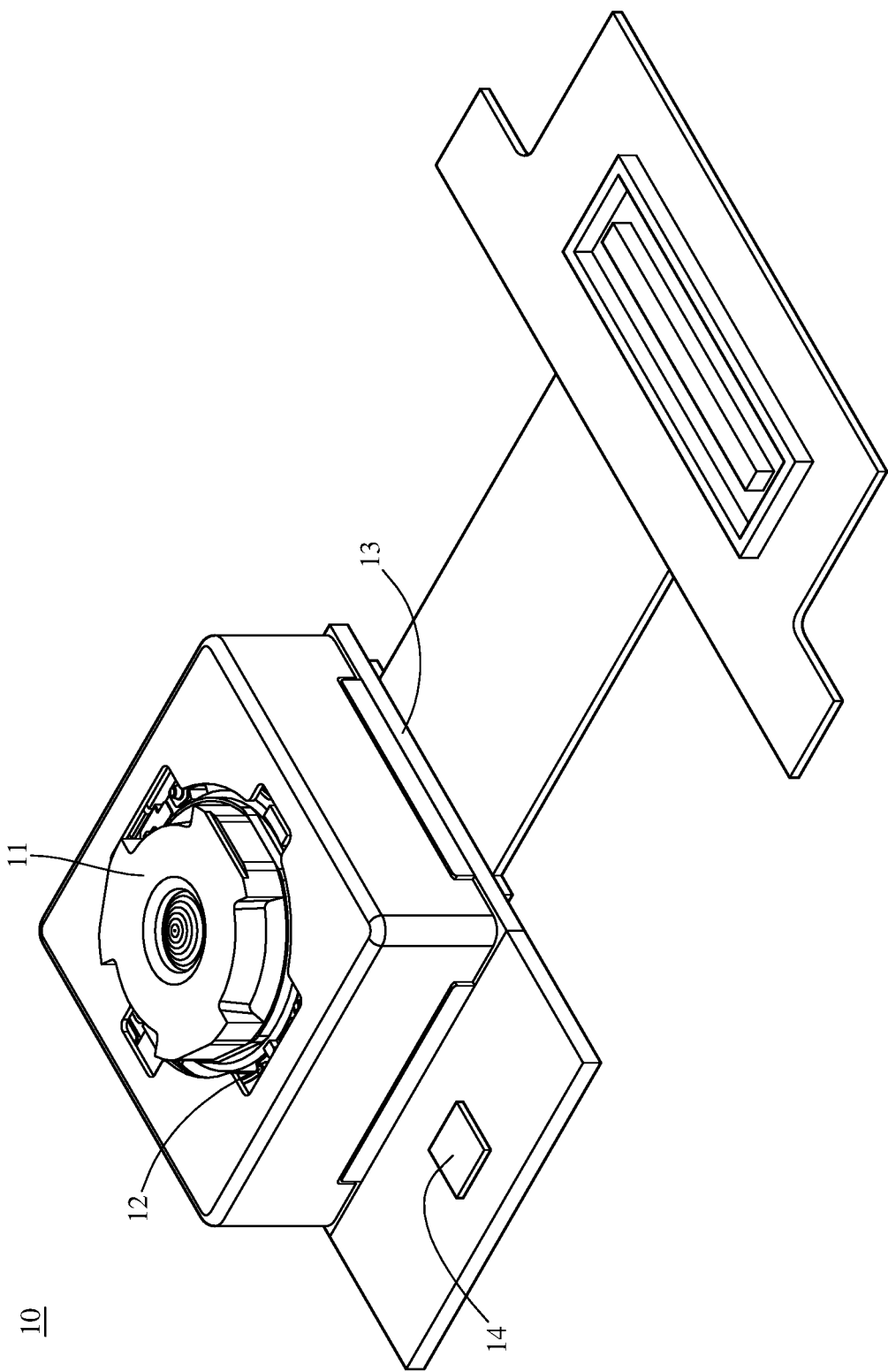
FIG. 23 is a perspective view of an image capturing unit according to the 10th embodiment of the present disclosure.

FIG. 23 is a perspective view of an image capturing unit according to the 10th embodiment of the present disclosure. In this embodiment, an image capturing unit 10 is a camera module including a lens unit 11, a driving device 12, an image sensor 13 and an image stabilizer 14. The lens unit 11 includes the imaging optical lens assembly disclosed in the 1st embodiment, a barrel and a holder member (their reference numerals are omitted) for holding the imaging optical lens assembly. However, the lens unit 11 may alternatively be provided with the imaging optical lens assembly disclosed in other embodiments, the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

11th Embodiment

Figure 24:
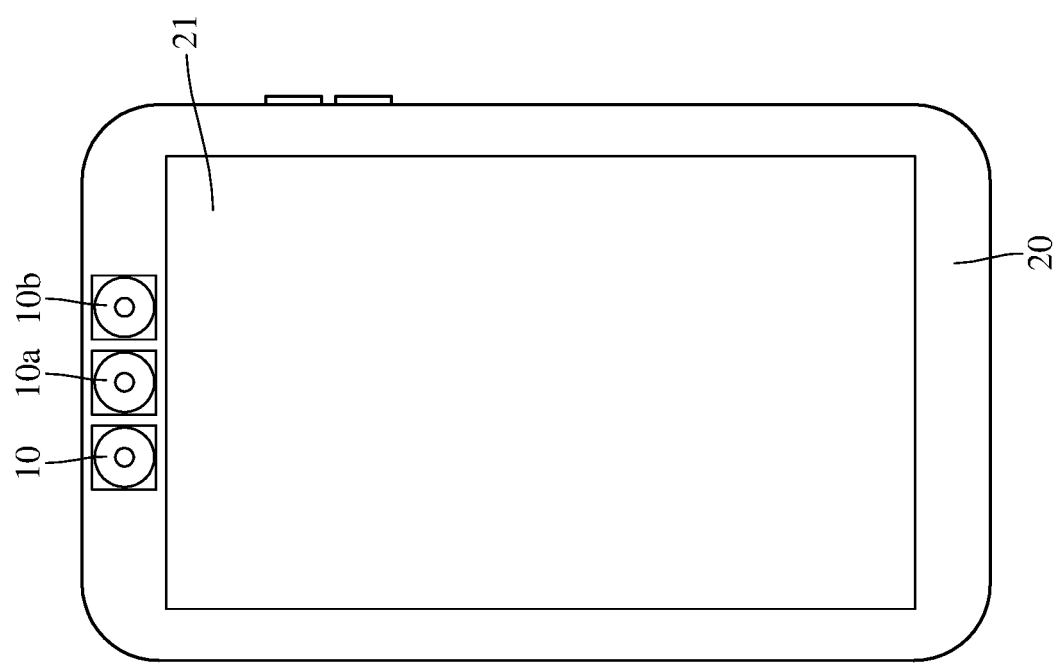
FIG. 24 is a perspective view of an electronic device according to the 11th embodiment of the present disclosure.

FIG. 24 is a perspective view of an electronic device according to the 11th embodiment of the present disclosure.

In this embodiment, an electronic device 20 is a smartphone including the image capturing unit 10 disclosed in the 10th embodiment, an image capturing unit 10a, an image capturing unit 10b, and a display unit 21. In FIG. 24, the image capturing units 10, 10a, 10b, and the display unit 21 are disposed on the same side of the electronic device 20, such that the image capturing units 10, 10a, 10b can be front-facing cameras of the electronic device 20 for taking selfies, but the present disclosure is not limited thereto.

The image capturing unit 10 is an ultra-wide-angle image capturing unit, the image capturing unit 10a is a wide-angle image capturing unit, and the image capturing unit 10b is a ToF (time of flight) image capturing unit. In this embodiment, the image capturing units 10, 10a have different fields of view, such that the electronic device 20 has various magnification ratios so as to meet the requirement of optical zoom functionality. In addition, the image capturing unit 10b can determine depth information of the imaged object. In this embodiment, the electronic device 20 includes multiple image capturing units 10, 10a and 10b, but the present disclosure is not limited to the number and arrangement of image capturing units.

12th Embodiment

Figure 25:
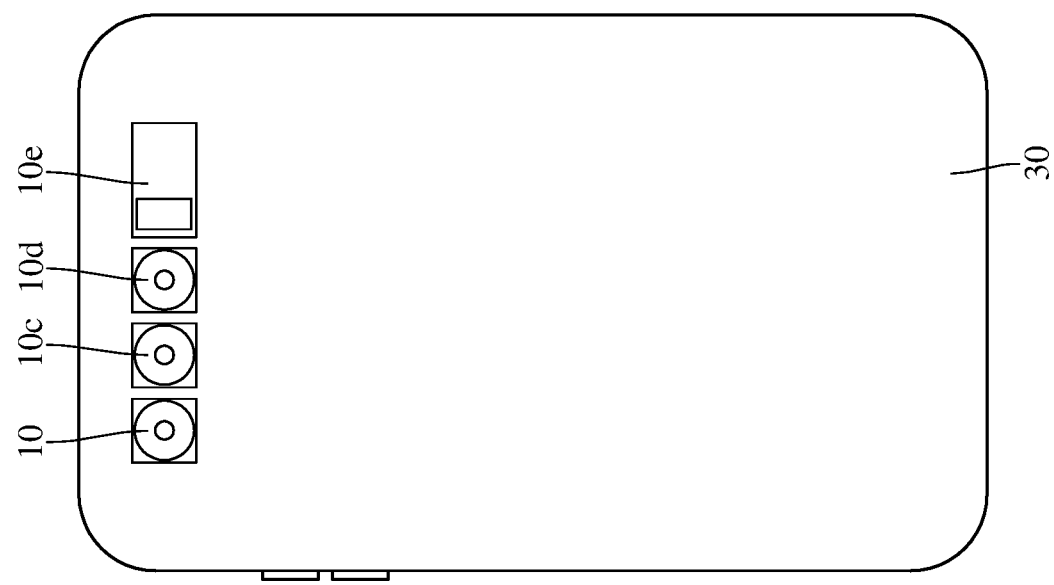
FIG. 25 is a perspective view of an electronic device according to the 12th embodiment of the present disclosure.

FIG. 25 is a perspective view of an electronic device according to the 12th embodiment of the present disclosure.

In this embodiment, an electronic device 30 is a smartphone including the image capturing unit 10 disclosed in the 10th embodiment, an image capturing unit 10c, an image capturing unit 10d, an image capturing unit 10e, and a display unit (not shown in figure). The image capturing units 10, 10c, 10d, and 10e are disposed on the same side of the electronic device 30, and the display unit is disposed on another side of the electronic device 30.

The image capturing unit 10 is an ultra-wide-angle image capturing unit having a field of view of 120 degrees, the image capturing unit 10c is a wide-angle image capturing unit having a field of view of 80 degrees, the image capturing unit 10d is a telephoto image capturing unit having a field of view of 50 degrees, and the image capturing unit 10e is a telephoto image capturing unit configured with light-folding element(s) and having a field of view of 20 degrees. Moreover, the image capturing unit 10 may have a field of view of between 100 degrees and 135 degrees, the image capturing unit 10c may have a field of view of between 70 degrees and 85 degrees, the image capturing unit 10d may have a field of view of between 30 degrees and 60 degrees, and the image capturing unit 10e may have a field of view of between 10 degrees and 30 degrees. The image capturing unit 10e with light-folding element(s) may have a configuration, for example, similar to that as shown in FIG. 37, FIG. 38 or FIG. 39, and a description in this regard will not be provided again. In this embodiment, the image capturing units 10, 10c, 10d, 10e have different fields of view, such that the electronic device 30 has various magnification ratios so as to meet the requirement of optical zoom functionality. The electronic device 30 includes multiple image capturing units 10, 10c, 10d and 10e, but the present disclosure is not limited to the number and arrangement of image capturing units.

13th Embodiment

Figure 26:
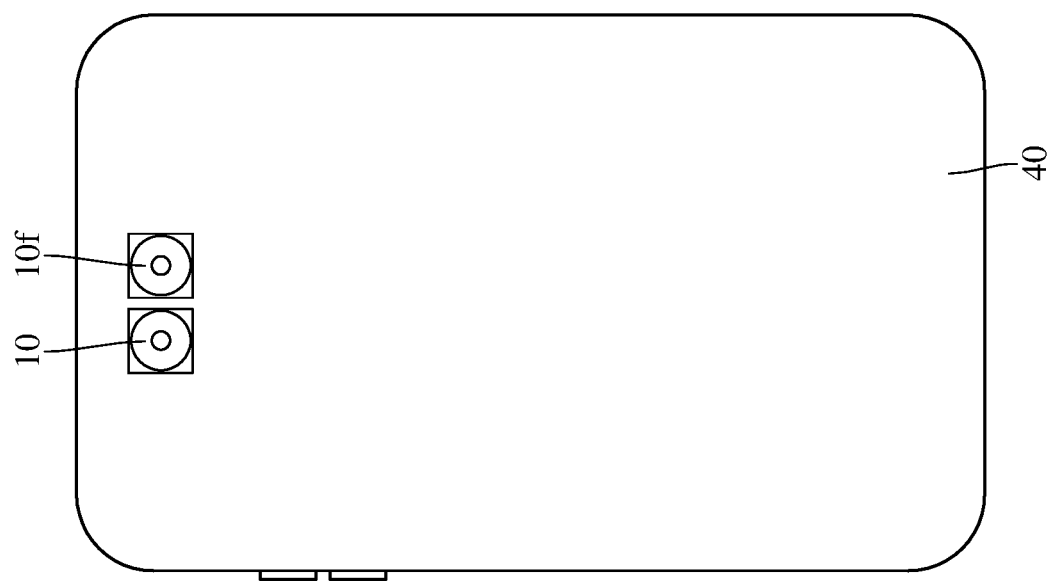
FIG. 26 is a perspective view of an electronic device according to the 13th embodiment of the present disclosure.

FIG. 26 is a perspective view of an electronic device according to the 13th embodiment of the present disclosure.

In this embodiment, an electronic device 40 is a smartphone including the image capturing unit 10 disclosed in the 10th embodiment, an image capturing unit 10f, and a display unit (not shown in figure). The image capturing units 10, 10f are disposed on the same side of the electronic device 40, and the display unit is disposed on another side of the electronic device 40.

The image capturing unit 10 is an ultra-wide-angle image capturing unit, and the image capturing unit 10f is a wide-angle image capturing unit. In this embodiment, the image capturing units 10, 10f have different fields of view, such that the electronic device 40 has various magnification ratios so as to meet the requirement of optical zoom functionality. The electronic device 40 includes multiple image capturing units 10, 10f, but the present disclosure is not limited to the number and arrangement of image capturing units.

14th Embodiment

Figure 27:
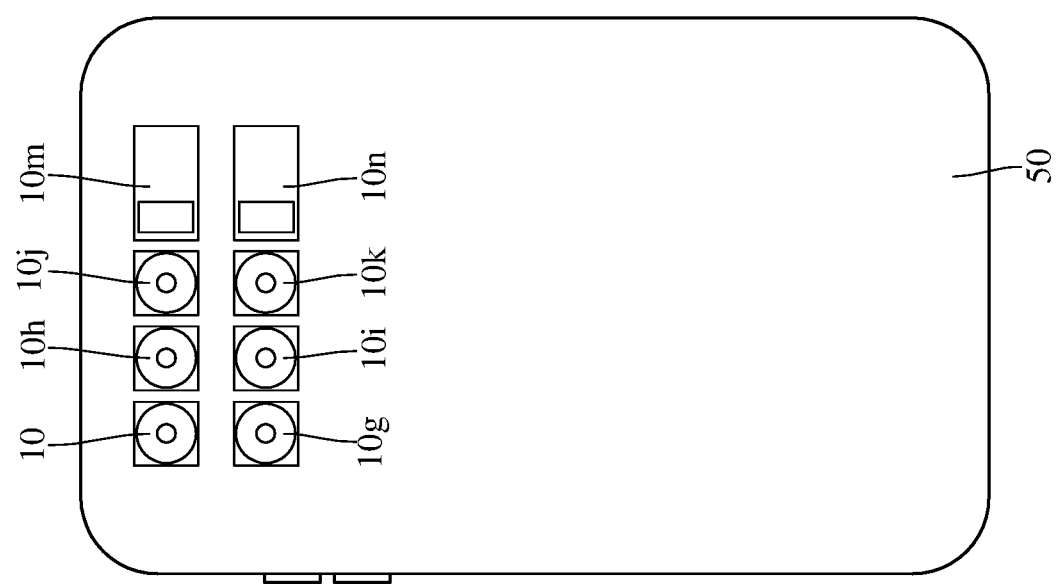
FIG. 27 is a perspective view of an electronic device according to the 14th embodiment of the present disclosure.

FIG. 27 is a perspective view of an electronic device according to the 14th embodiment of the present disclosure.

In this embodiment, an electronic device 50 is a smartphone including the image capturing unit 10 disclosed in the 10th embodiment, an image capturing unit 10g, an image capturing unit 10h, an image capturing unit 10i, an image capturing unit 10j, an image capturing unit 10k, an image capturing unit 10m, an image capturing unit 10n, and a display unit (not shown in figure). The image capturing units 10, 10g, 10h, 10i, 10j, 10k, 10m, 10n are disposed on the same side of the electronic device 50, and the display unit is disposed on another side of the electronic device 50.

The image capturing units 10, 10g are ultra-wide-angle image capturing units, the image capturing units 10h, 10i are wide-angle image capturing units, the image capturing units 10j, 10k are telephoto image capturing units, and the image capturing units 10m, 10n are telephoto image capturing units configured with light-folding element(s). The image capturing unit 10g includes the imaging optical lens assembly disclosed in the 1st embodiment, but the present disclosure is not limited thereto. The image capturing unit 10g may alternatively be provided with the imaging optical lens assembly disclosed in other embodiments. The image capturing units 10k, 10m with light-folding element(s) may respectively have a configuration, for example, similar to that as shown in FIG. 37, FIG. 38 or FIG. 39, and a description in this regard will not be provided again. In this embodiment, the image capturing units 10, 10g, 10h, 10i, 10j, 10k, 10m, 10n have different fields of view, such that the electronic device 50 has various magnification ratios so as to meet the requirement of optical zoom functionality. The electronic device 50 includes multiple image capturing units 10, 10g, 10h, 10i, 10j, 10k, 10m, 10n, but the present disclosure is not limited to the number and arrangement of image capturing units.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

15th Embodiment

Figure 40:
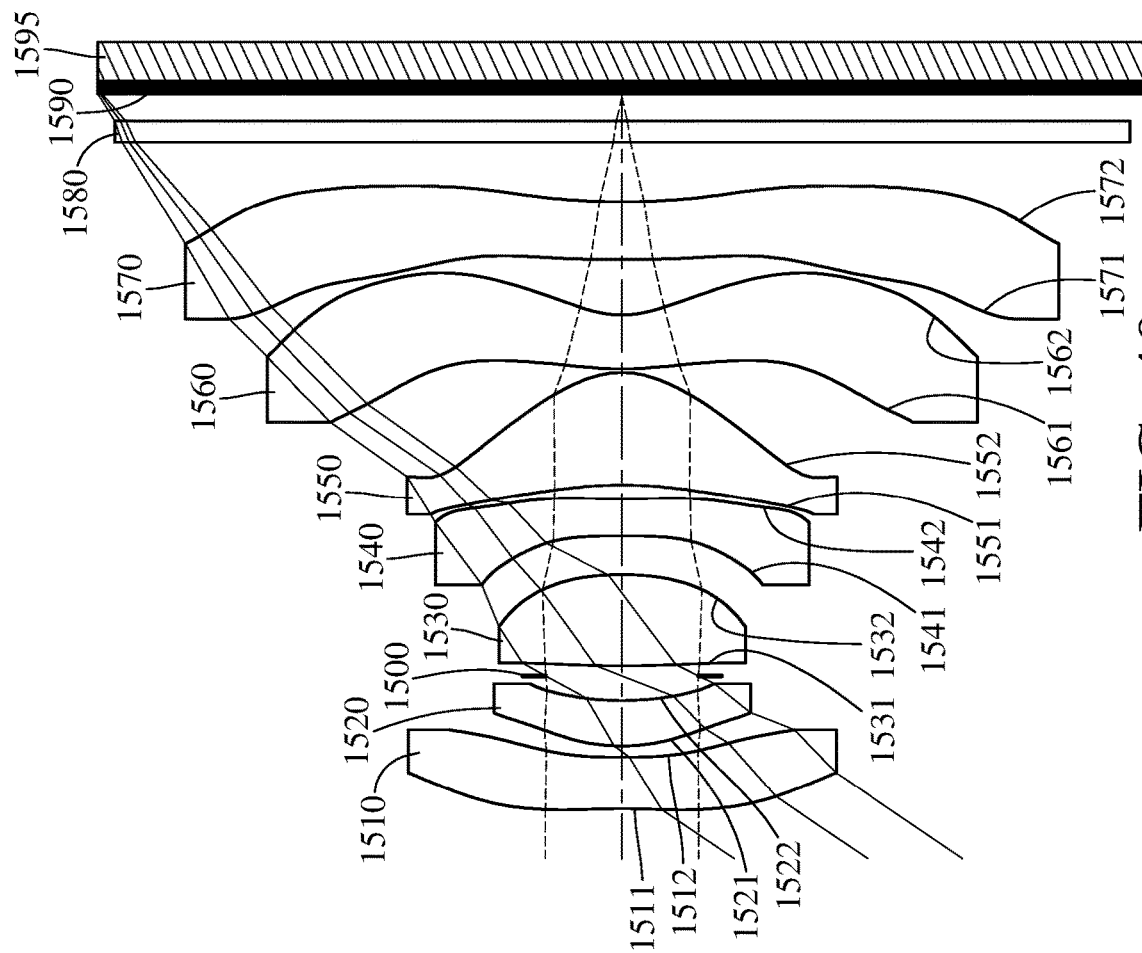
FIG. 40 is a cross-sectional view of an image capturing unit according to the 15th embodiment of the present disclosure.
Figure 41:
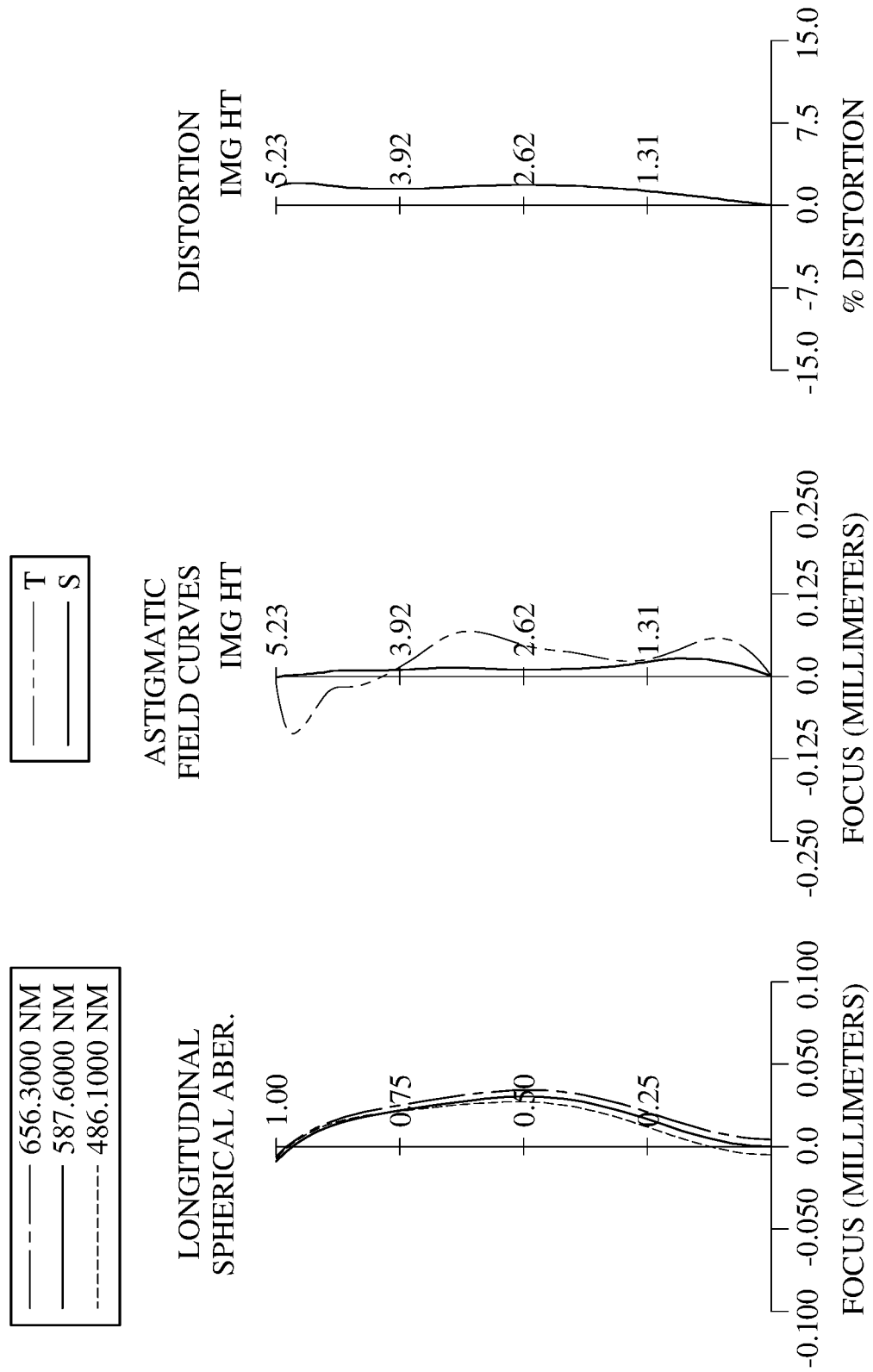
FIG. 41 shows spherical aberration curves, astigmatic field curves and a distortion curve of the image capturing unit according to the 15th embodiment.

FIG. 40 is a cross-sectional view of an image capturing unit according to the 15th embodiment of the present disclosure. FIG. 41 shows, in order from left to right, spherical aberration curves, astigmatic field curves and a distortion curve of the image capturing unit according to the 15th embodiment. In FIG. 40, the image capturing unit includes the imaging optical lens assembly (its reference numeral is omitted) of the present disclosure and an image sensor 1595. The imaging optical lens assembly includes, in order from an object side to an image side along an optical path, a first lens element 1510, a second lens element 1520, an aperture stop 1500, a third lens element 1530, a fourth lens element 1540, a fifth lens element 1550, a sixth lens element 1560, a seventh lens element 1570, an IR-cut filter 1580 and an image surface 1590. The imaging optical lens assembly includes seven lens elements (1510, 1520, 1530, 1540, 1550, 1560 and 1570) with no additional lens element disposed between each of the adjacent seven lens elements.

The first lens element 1510 with negative refractive power has an object-side surface 1511 being concave in a paraxial region thereof and an image-side surface 1512 being concave in a paraxial region thereof. The first lens element 1510 is made of plastic material and has the object-side surface 1511 and the image-side surface 1512 being both aspheric. The object-side surface 1511 of the first lens element 1510 has at least one convex critical point in an off-axis region thereof.

The second lens element 1520 with positive refractive power has an object-side surface 1521 being convex in a paraxial region thereof and an image-side surface 1522 being concave in a paraxial region thereof. The second lens element 1520 is made of plastic material and has the object-side surface 1521 and the image-side surface 1522 being both aspheric.

The third lens element 1530 with positive refractive power has an object-side surface 1531 being convex in a paraxial region thereof and an image-side surface 1532 being convex in a paraxial region thereof. The third lens element 1530 is made of plastic material and has the object-side surface 1531 and the image-side surface 1532 being both aspheric.

The fourth lens element 1540 with negative refractive power has an object-side surface 1541 being concave in a paraxial region thereof and an image-side surface 1542 being concave in a paraxial region thereof. The fourth lens element 1540 is made of plastic material and has the object-side surface 1541 and the image-side surface 1542 being both aspheric. The image-side surface 1542 of the fourth lens element 1540 has at least one critical point in an off-axis region thereof.

The fifth lens element 1550 with positive refractive power has an object-side surface 1551 being concave in a paraxial region thereof and an image-side surface 1552 being convex in a paraxial region thereof. The fifth lens element 1550 is made of plastic material and has the object-side surface 1551 and the image-side surface 1552 being both aspheric.

The sixth lens element 1560 with negative refractive power has an object-side surface 1561 being convex in a paraxial region thereof and an image-side surface 1562 being concave in a paraxial region thereof. The sixth lens element 1560 is made of plastic material and has the object-side surface 1561 and the image-side surface 1562 being both aspheric. The object-side surface 1561 of the sixth lens element 1560 has at least one critical point in an off-axis region thereof. The image-side surface 1562 of the sixth lens element 1560 has at least one critical point in an off-axis region thereof.

The seventh lens element 1570 with negative refractive power has an object-side surface 1571 being convex in a paraxial region thereof and an image-side surface 1572 being concave in a paraxial region thereof. The seventh lens element 1570 is made of plastic material and has the object-side surface 1571 and the image-side surface 1572 being both aspheric. The object-side surface 1571 of the seventh lens element 1570 has at least one critical point in an off-axis region thereof. The image-side surface 1572 of the seventh lens element 1570 has at least one critical point in an off-axis region thereof.

The IR-cut filter 1580 is made of glass material and located between the seventh lens element 1570 and the image surface 1590, and will not affect the focal length of the imaging optical lens assembly. The image sensor 1595 is disposed on or near the image surface 1590 of the imaging optical lens assembly.

The detailed optical data of the 15th embodiment are shown in Table 21 and the aspheric surface data are shown in Table 22 below.

TABLE 21

15th Embodiment
f = 3.48 mm, Fno = 2.26, HFOV = 55.8 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −7.307 | (ASP) | 0.522 | Plastic | 1.545 | 56.1 | −8.67 |
| 2 |  | 13.686 | (ASP) | 0.112 |  |  |  |  |
| 3 | Lens 2 | 1.993 | (ASP) | 0.455 | Plastic | 1.544 | 56.0 | 9.18 |
| 4 |  | 3.049 | (ASP) | 0.248 |  |  |  |  |
| 5 | Ape. Stop | Plano |  | 0.100 |  |  |  |  |
| 6 | Lens 3 | 10.953 | (ASP) | 0.913 | Plastic | 1.544 | 56.0 | 4.29 |
| 7 |  | −2.877 | (ASP) | 0.391 |  |  |  |  |
| 8 | Lens 4 | −15.984 | (ASP) | 0.370 | Plastic | 1.669 | 19.5 | −8.05 |
| 9 |  | 8.205 | (ASP) | 0.141 |  |  |  |  |
| 10 | Lens 5 | −4.591 | (ASP) | 1.130 | Plastic | 1.544 | 56.0 | 1.87 |
| 11 |  | −0.904 | (ASP) | 0.036 |  |  |  |  |
| 12 | Lens 6 | 3.230 | (ASP) | 0.540 | Plastic | 1.566 | 37.4 | −2.50 |
| 13 |  | 0.924 | (ASP) | 0.556 |  |  |  |  |
| 14 | Lens 7 | 26.789 | (ASP) | 0.582 | Plastic | 1.544 | 56.0 | −22.51 |
| 15 |  | 8.339 | (ASP) | 0.600 |  |  |  |  |
| 16 | IR-cut Filter | Plano |  | 0.210 | Glass | 1.517 | 64.2 | — |
| 17 |  | Plano |  | 0.274 |  |  |  |  |
| 18 | Image | Plano |  | 0.000 |  |  |  |  |

Note:
Reference wavelength is 587.6 nm (d-line).

TABLE 22

Aspheric Coefficients

| Surface # | 1 | 2 | 3 | 4 | 6 |
|---|---|---|---|---|---|
| k= | 6.6734E+00 | −7.5749E+01 | −3.0843E+00 | 6.7003E+00 | 3.8795E+01 |
| A4= | 1.3351E−01 | 2.5688E−01 | 1.5117E−01 | −4.2383E−03 | −6.9939E−03 |
| A6= | −9.0615E−02 | −3.4091E−01 | −3.0819E−01 | −7.3895E−02 | −7.5534E−02 |
| A8= | 5.6091E−02 | 2.9885E−01 | 2.9398E−01 | 1.4234E−01 | 2.2673E−01 |
| A10= | −2.6044E−02 | −1.8741E−01 | −1.9826E−01 | −1.9255E−01 | −3.8661E−01 |
| A12= | 8.4239E−03 | 7.8261E−02 | 8.3314E−02 | 1.5358E−01 | 3.0953E−01 |
| A14= | −1.7553E−03 | −2.0344E−02 | −1.4486E−02 | −3.2449E−02 | −8.8904E−02 |
| A16= | 2.0729E−04 | 2.9872E−03 | — | — | — |
| A18= | −1.0394E−05 | −1.9027E−04 | — | — | — |

| Surface # | 7 | 8 | 9 | 10 | 11 |
|---|---|---|---|---|---|
| k= | −1.3215E+00 | 0.0000E+00 | 0.0000E+00 | −1.2307E+00 | −3.5979E+00 |
| A4= | −8.0696E−02 | −1.7897E−01 | −1.5580E−01 | −7.5316E−02 | −1.5789E−01 |
| A6= | −1.0528E−01 | 1.4295E−03 | 1.4890E−01 | 2.4287E−01 | 1.6164E−01 |
| A8= | 3.4743E−01 | −7.9090E−03 | −1.6642E−01 | −3.0693E−01 | −1.2683E−01 |
| A10= | −6.0338E−01 | 1.1507E−01 | 1.4174E−01 | 2.3329E−01 | 8.1854E−02 |
| A12= | 5.7405E−01 | −9.7084E−02 | −7.1240E−02 | −1.1770E−01 | −3.8370E−02 |
| A14= | −2.9091E−01 | 2.0789E−02 | 2.0395E−02 | 4.0255E−02 | 1.1606E−02 |
| A16= | 6.0233E−02 | 4.7653E−03 | −3.1238E−03 | −9.0038E−03 | −2.0688E−03 |
| A18= | — | −1.8715E−03 | 1.9900E−04 | 1.1831E−03 | 1.9484E−04 |
| A20= | — | — | — | −6.8776E−05 | −7.4106E−06 |

| Surface # | 12 | 13 | 14 | 15 |
|---|---|---|---|---|
| k= | −2.5476E+01 | −5.1088E+00 | 2.9242E+01 | −1.3292E+00 |
| A4= | −6.7025E−02 | −6.5531E−02 | 4.9290E−02 | 2.9698E−02 |
| A6= | 5.4642E−02 | 3.3743E−02 | −5.2904E−02 | −2.5140E−02 |
| A8= | −3.2588E−02 | −1.3909E−02 | 2.0781E−02 | 7.4371E−03 |
| A10= | 1.3236E−02 | 3.9829E−03 | −4.8681E−03 | −1.1735E−03 |
| A12= | −4.2360E−03 | −8.5814E−04 | 7.7222E−04 | 1.0085E−04 |
| A14= | 1.0733E−03 | 1.4411E−04 | −8.5538E−05 | −3.3230E−06 |
| A16= | −2.0029E−04 | −1.7960E−05 | 6.5517E−06 | −1.9839E−07 |
| A18= | 2.5693E−05 | 1.5389E−06 | −3.3675E−07 | 2.7025E−08 |
| A20= | −2.1168E−06 | −8.3797E−08 | 1.1009E−08 | −1.2848E−09 |
| A22= | 1.0035E−07 | 2.5879E−09 | −2.0586E−10 | 2.9781E−11 |
| A24= | −2.0759E−09 | −3.4385E−11 | 1.6690E−12 | −2.8052E−13 |

In the 15th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 15th embodiment, so an explanation in this regard will not be provided again.

Moreover, these parameters can be calculated from Table 21 and Table 22 as the following values and satisfy the following conditions:

| 15th Embodiment | | | |
|---|---|---|---|
| f [mm] | 3.48 | (R7 + R8)/(R7 − R8) | 0.32 |
| Fno | 2.26 | (|R11| + |R12|)/f | 1.19 |
| HFOV [deg.] | 55.8 | f/|R13| + f/|R14| | 0.55 |
| FOV [deg.] | 111.6 | T23/T34 | 0.89 |
| V1/N1 | 36.30 | TL/ImgH | 1.37 |
| V2/N2 | 36.26 | 100 × |[ImgH − f × tan(HFOV)]/ [f × tan(HFOV)]| | 2.13 |
| V3/N3 | 36.26 | |f1/f2| | 0.94 |
| V4/N4 | 11.65 | |f/f1| + |f/f2| | 0.78 |
| V5/N5 | 36.26 | f3/f2 | 0.47 |
| V6 + V7 | 93.4 | f5/f3 | 0.44 |
| V6/N6 | 23.91 | Y11/Y72 | 0.49 |
| V7/V6 | 1.50 | Y72/f | 1.26 |
| V7/N7 | 36.26 | |V1 − V2| | 0.09 |
| f/R1 | −0.48 | |V3 − V2| | 0.00 |
| f/|R1| + f/|R2| | 0.73 | V1 + V2 + V3 | 168.04 |
| (R5 + R6)/ (R5 − R6) | 0.58 | — | — |

16th Embodiment

Figure 42:
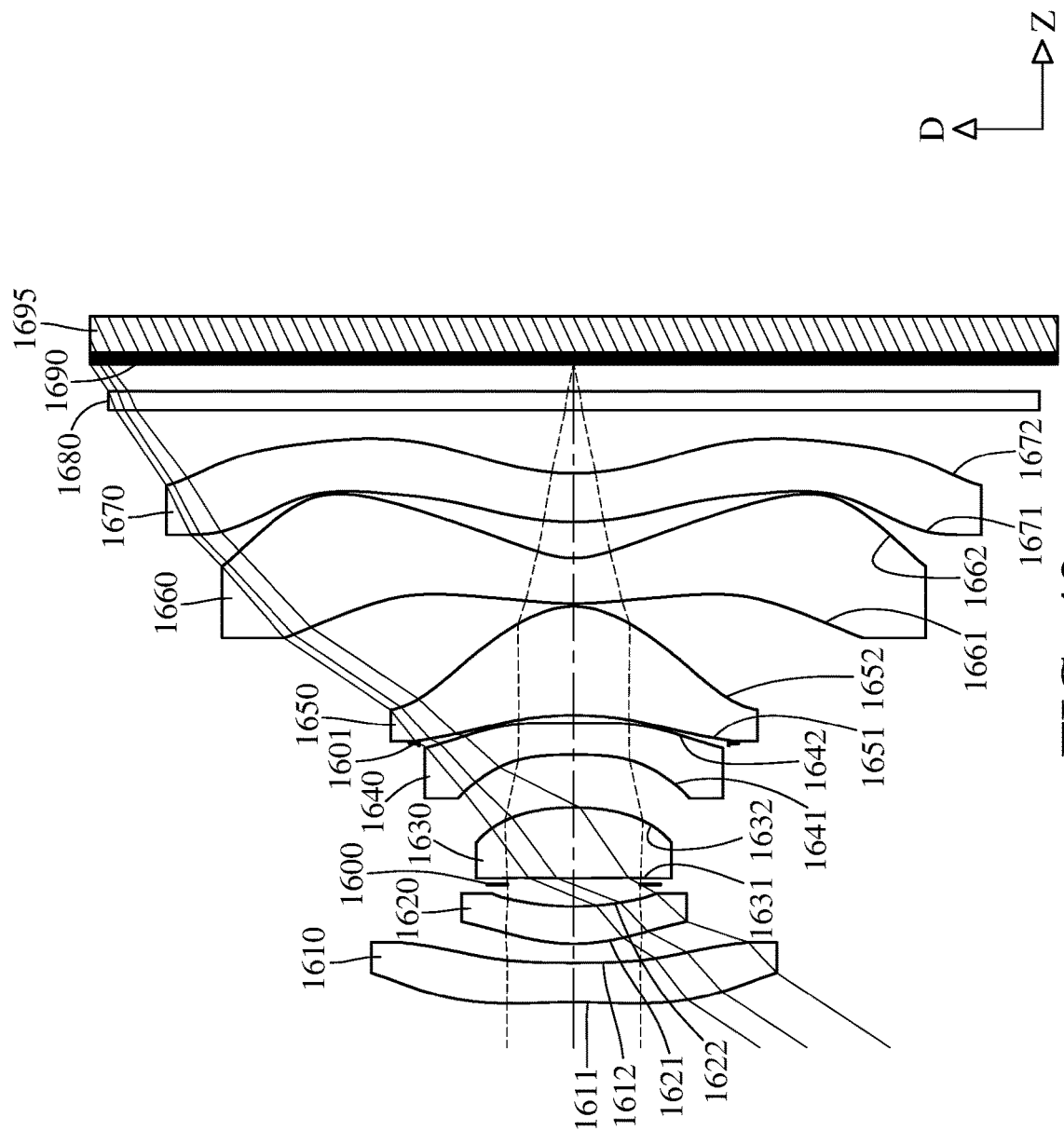
FIG. 42 is a cross-sectional view of an image capturing unit corresponding to a diagonal direction of a photosensitive area of an image sensor according to the 16th embodiment of the present disclosure.
Figure 43:
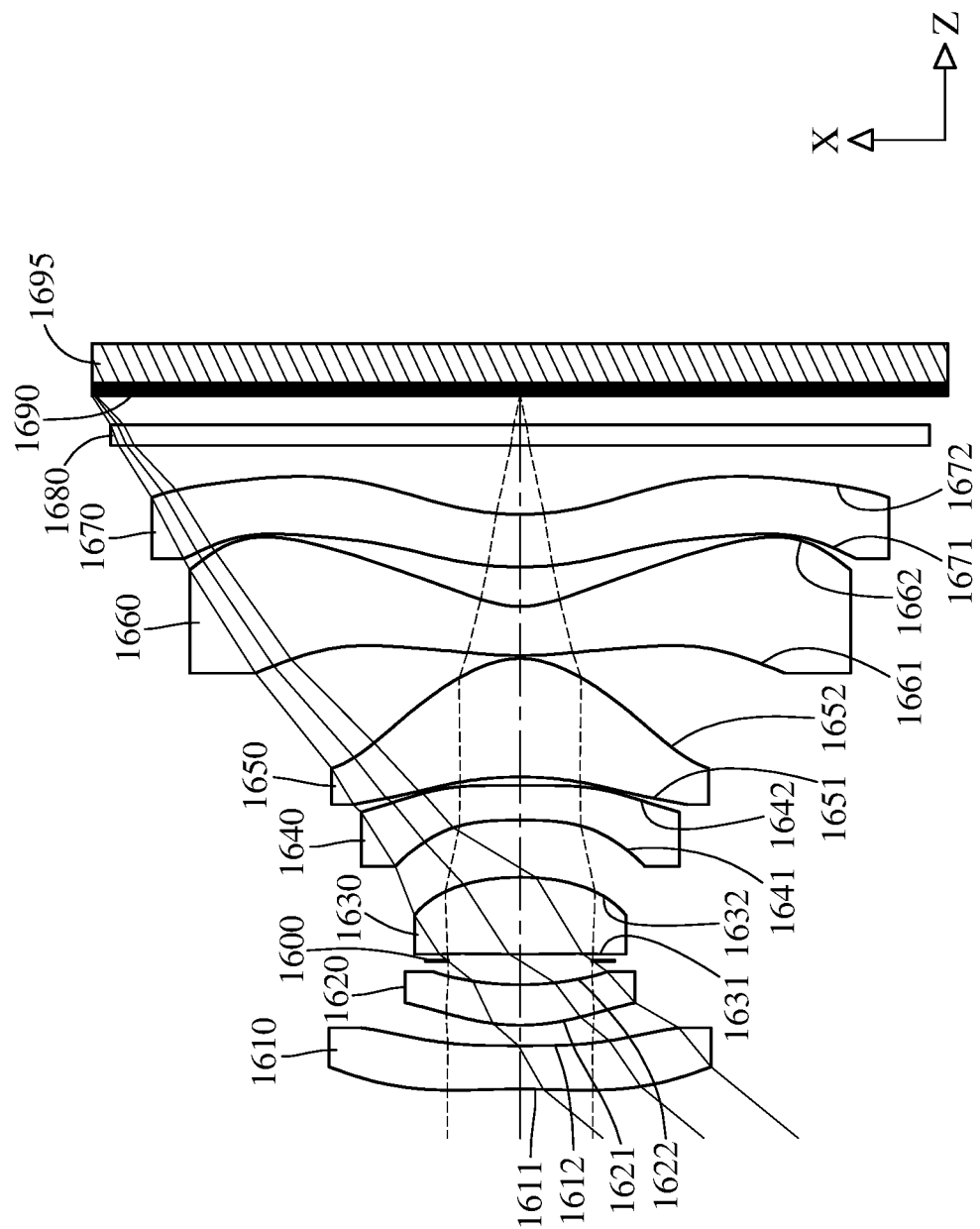
FIG. 43 is a cross-sectional view of the image capturing unit corresponding to a length direction of the photosensitive area of the image sensor according to the 16th embodiment of the present disclosure.
Figure 44:
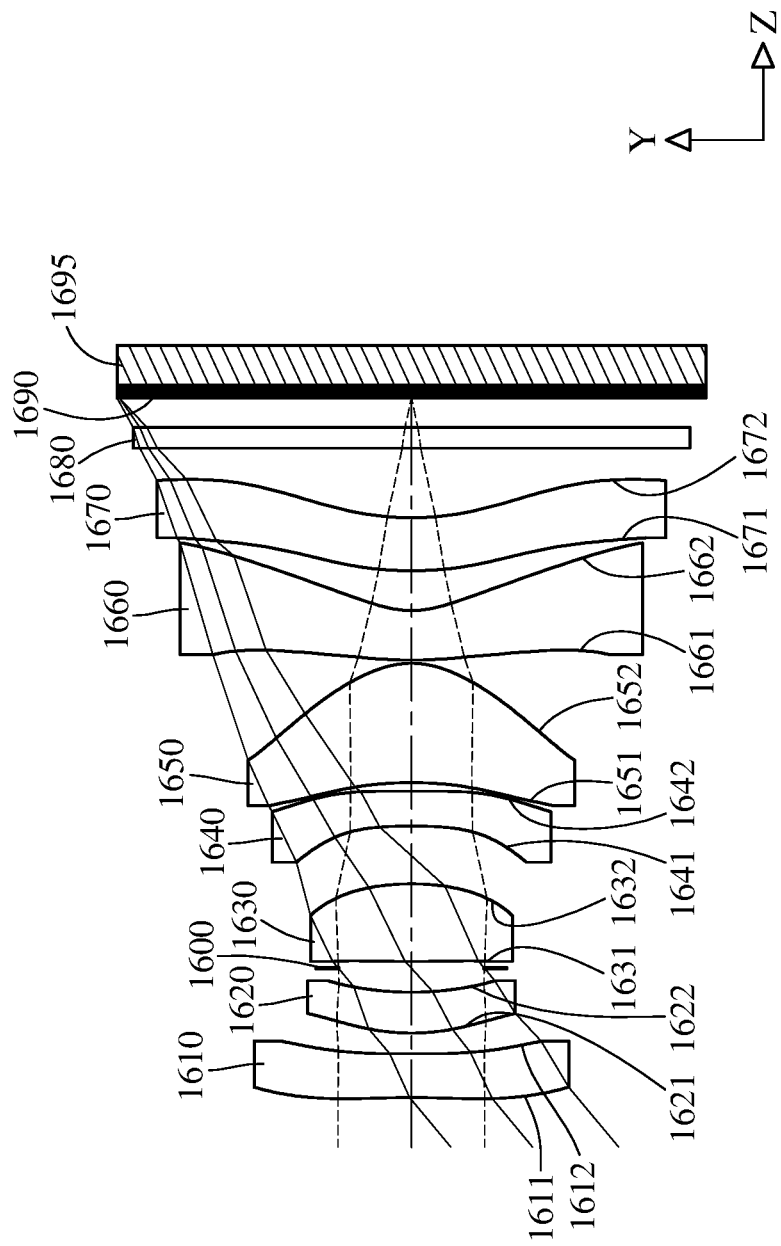
FIG. 44 is a cross-sectional view of the image capturing unit corresponding to a width direction of the photosensitive area of the image sensor according to the 16th embodiment of the present disclosure.
Figure 45:
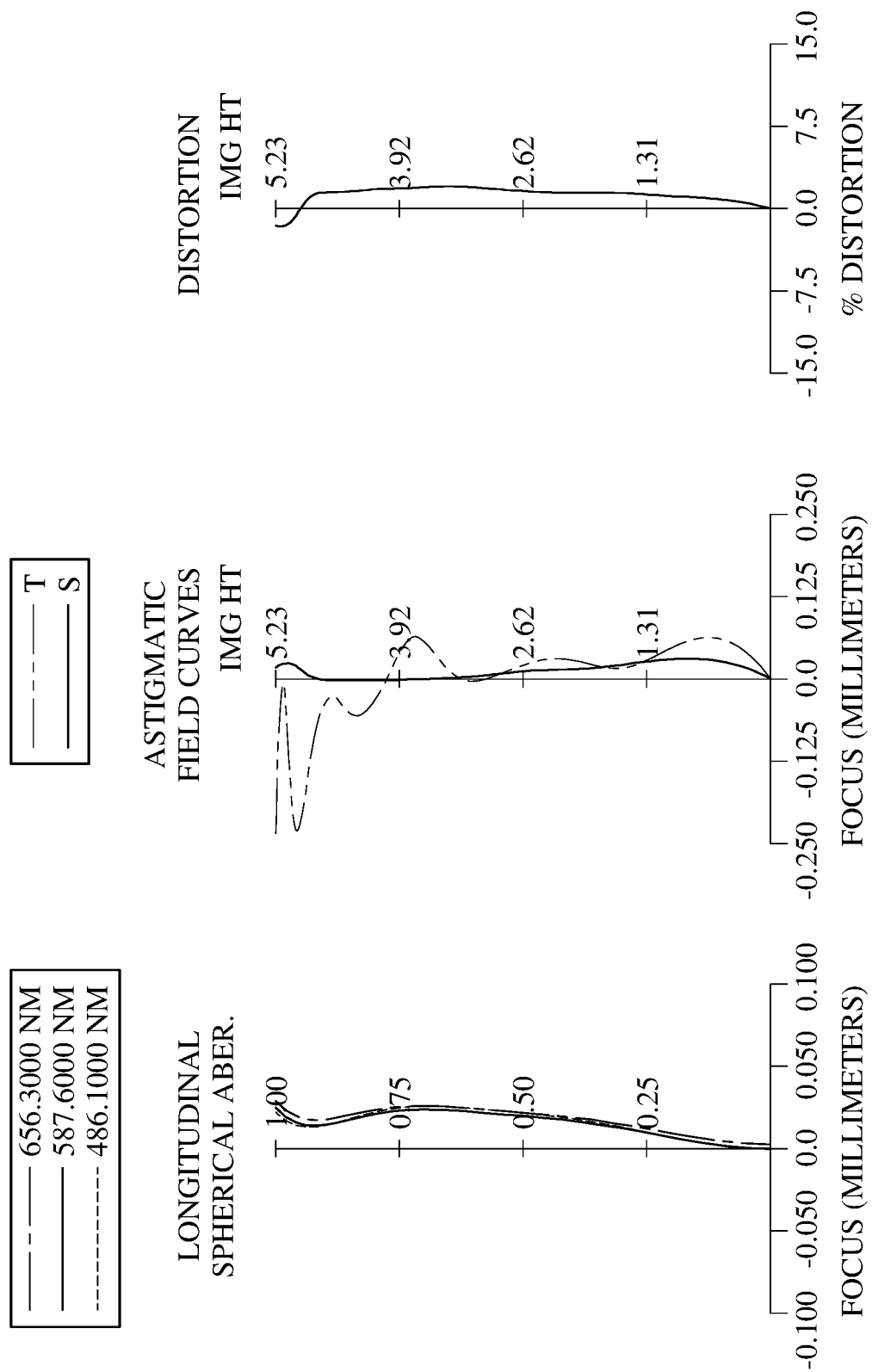
FIG. 45 shows spherical aberration curves, astigmatic field curves and a distortion curve of the image capturing unit according to the 16th embodiment.

FIG. 42 is a cross-sectional view of an image capturing unit corresponding to a diagonal direction of a photosensitive area of an image sensor according to the 16th embodiment of the present disclosure. FIG. 43 is a cross-sectional view of the image capturing unit corresponding to a length direction of the photosensitive area of the image sensor according to the 16th embodiment of the present disclosure. FIG. 44 is a cross-sectional view of the image capturing unit corresponding to a width direction of the photosensitive area of the image sensor according to the 16th embodiment of the present disclosure. FIG. 45 shows, in order from left to right, spherical aberration curves, astigmatic field curves and a distortion curve of the image capturing unit according to the 16th embodiment. In FIG. 42 to FIG. 44, the image capturing unit includes the imaging optical lens assembly (its reference numeral is omitted) of the present disclosure and an image sensor 1695. The imaging optical lens assembly includes, in order from an object side to an image side along an optical path, a first lens element 1610, a second lens element 1620, an aperture stop 1600, a third lens element 1630, a fourth lens element 1640, a stop 1601, a fifth lens element 1650, a sixth lens element 1660, a seventh lens element 1670, an IR-cut filter 1680 and an image surface 1690. The imaging optical lens assembly includes seven lens elements (1610, 1620, 1630, 1640, 1650, 1660 and 1670) with no additional lens element disposed between each of the adjacent seven lens elements.

The first lens element 1610 with negative refractive power has an object-side surface 1611 being concave in a paraxial region thereof and an image-side surface 1612 being concave in a paraxial region thereof. The first lens element 1610 is made of plastic material and has the object-side surface 1611 and the image-side surface 1612 being both aspheric.

The object-side surface 1611 of the first lens element 1610 has at least one convex critical point in an off-axis region thereof.

The second lens element 1620 with positive refractive power has an object-side surface 1621 being convex in a paraxial region thereof and an image-side surface 1622 being concave in a paraxial region thereof. The second lens element 1620 is made of plastic material and has the object-side surface 1621 and the image-side surface 1622 being both aspheric.

The third lens element 1630 with positive refractive power has an object-side surface 1631 being convex in a paraxial region thereof and an image-side surface 1632 being convex in a paraxial region thereof. The third lens element 1630 is made of plastic material and has the object-side surface 1631 and the image-side surface 1632 being both aspheric. The object-side surface 1631 of the third lens element 1630 has at least one critical point in an off-axis region thereof.

The fourth lens element 1640 with negative refractive power has an object-side surface 1641 being concave in a paraxial region thereof and an image-side surface 1642 being concave in a paraxial region thereof. The fourth lens element 1640 is made of plastic material and has the object-side surface 1641 and the image-side surface 1642 being both aspheric. The image-side surface 1642 of the fourth lens element 1640 has at least one critical point in an off-axis region thereof.

The fifth lens element 1650 with positive refractive power has an object-side surface 1651 being concave in a paraxial region thereof and an image-side surface 1652 being convex in a paraxial region thereof. The fifth lens element 1650 is made of plastic material and has the object-side surface 1651 and the image-side surface 1652 being both aspheric.

The sixth lens element 1660 with negative refractive power has an object-side surface 1661 being convex in a paraxial region thereof and an image-side surface 1662 being concave in a paraxial region thereof. The sixth lens element 1660 is made of plastic material and has the object-side surface 1661 being a freeform surface and the image-side surface 1662 being aspheric. The object-side surface 1661 of the sixth lens element 1660 has at least one critical point in an off-axis region thereof. The image-side surface 1662 of the sixth lens element 1660 has at least one critical point in an off-axis region thereof.

The seventh lens element 1670 with negative refractive power has an object-side surface 1671 being convex in a paraxial region thereof and an image-side surface 1672 being concave in a paraxial region thereof. The seventh lens element 1670 is made of plastic material and has the object-side surface 1671 and the image-side surface 1672 being both aspheric. The object-side surface 1671 of the seventh lens element 1670 has at least one critical point in an off-axis region thereof. The image-side surface 1672 of the seventh lens element 1670 has at least one critical point in an off-axis region thereof.

The IR-cut filter 1680 is made of glass material and located between the seventh lens element 1670 and the image surface 1690, and will not affect the focal length of the imaging optical lens assembly. The image sensor 1695 is disposed on or near the image surface 1690 of the imaging optical lens assembly.

In this embodiment, the sixth lens element 1660 is a freeform lens element, the object-side surface 1661 of the sixth lens element 1660 is a freeform surface, and the object-side surface 1661 of the sixth lens element 1660 has at least one critical point within a maximum effective radius area in an off-axis region thereof. Moreover, the object-side surface 1661 of the sixth lens element 1660 also has at least one critical point within a maximum effective radius area in an off-axis region thereof along the Y-axis direction. Moreover, the object-side surface 1661 of the sixth lens element 1660 also has at least one critical point within a maximum effective radius area in an off-axis region thereof along the X-axis direction.

Figure 46:
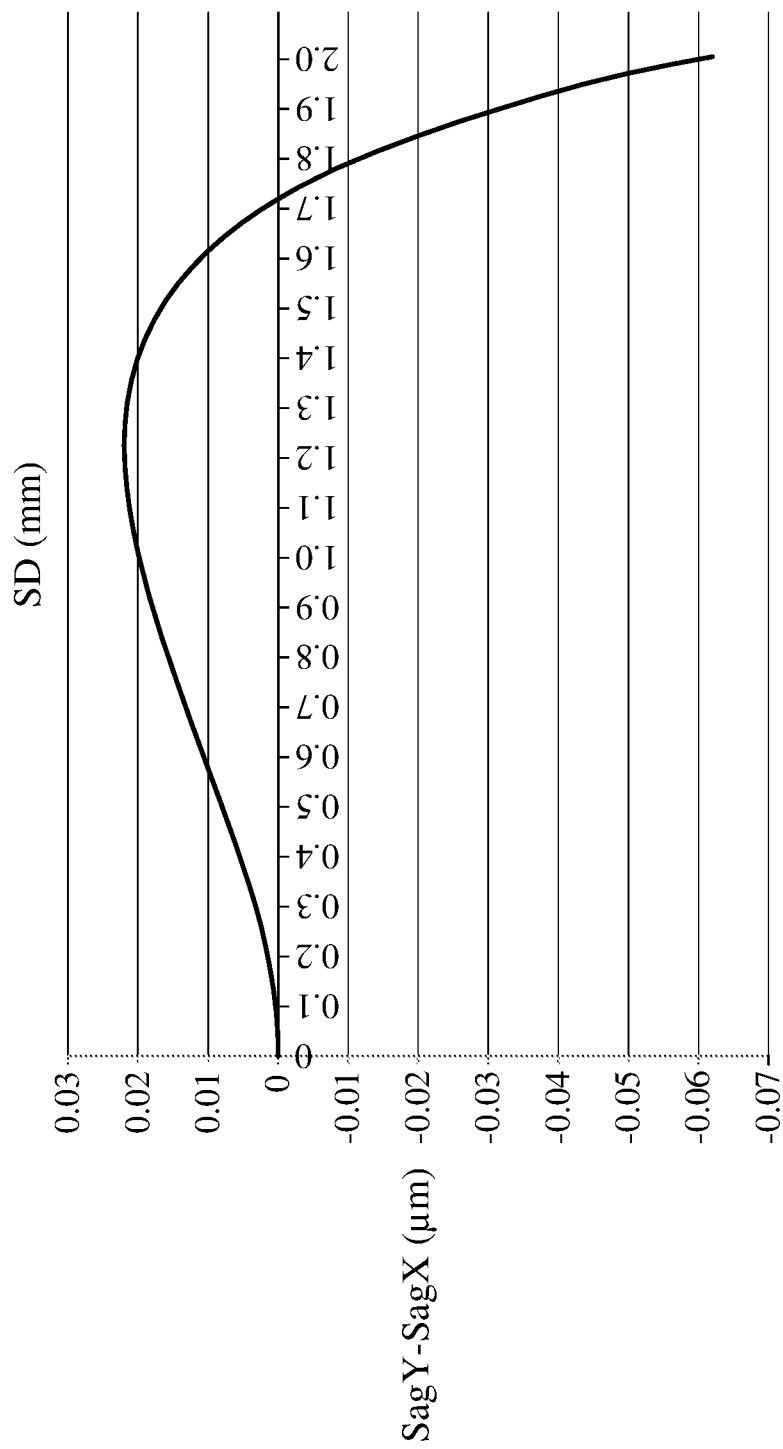
FIG. 46 is a data graph of SagY-SagX of the object-side surface of the sixth lens element according to the 16th embodiment of the present disclosure.

In this embodiment, the object-side surface 1661 of the sixth lens element 1660 satisfies the following condition: |DSagMax|=0.62 [um]. Please refer to FIG. 46, which is a data graph of SagY-SagX of the object-side surface of the sixth lens element according to the 16th embodiment of the present disclosure. FIG. 46 shows the values of SagY-SagX at each point at a distance of 0 to SDMaxY from the optical axis on the object-side surface 1661 of the sixth lens element 1660. In FIG. 46, the horizontal axis represents the effective radius SD of the freeform surface in the Y-axis direction, and the vertical axis represents the values of SagY-SagX.

The detailed optical data of the 16th embodiment are shown in Table 23, the aspheric surface data are shown in Table 24, and the freeform surface data are shown in Table 25 below. The tables presented below for the 16th embodiment are the corresponding schematic parameter and aberration curves, and the definitions of the tables are the same as Table 15, Table 16 and Table 17 of the 8th embodiment. Therefore, an explanation in this regard will not be provided again.

TABLE 23

16th Embodiment
f = 3.47 mm, Fno = 2.35, HFOV = 56.6 deg.
ImgHX = 4.327 mm, HFOVX = 50.7 deg., ImgHY = 2.944 mm, HFOVY = 39.7 deg.

| Surface # | | Curvature Radius | | | Thickness | Material | Index | Abbe # | Focal Length | |
|---|---|---|---|---|---|---|---|---|---|---|
| | | (Y-dir.) | (X-dir.) | | | | | | (Y-dir.) | (X-dir.) |
| 0 | Object | | Plano | | Infinity | | | | | |
| 1 | Lens 1 | −7.977 | | (ASP) | 0.441 | Plastic | 1.545 | 56.1 | −12.69 | |
| 2 | | 52.962 | | (ASP) | 0.209 | | | | | |
| 3 | Lens 2 | 2.166 | | (ASP) | 0.412 | Plastic | 1.544 | 56.0 | 11.25 | |
| 4 | | 3.127 | | (ASP) | 0.241 | | | | | |
| 5 | Ape. Stop | | Plano | | 0.070 | | | | | |
| 6 | Lens 3 | 22.532 | | (ASP) | 0.782 | Plastic | 1.544 | 56.0 | 4.13 | |
| 7 | | −2.466 | | (ASP) | 0.583 | | | | | |
| 8 | Lens 4 | −5.720 | | (ASP) | 0.350 | Plastic | 1.686 | 18.4 | −7.24 | |
| 9 | | 38.621 | | (ASP) | −0.223 | | | | | |
| 10 | Stop | | Plano | | 0.311 | | | | | |
| 11 | Lens 5 | −3.481 | | (ASP) | 1.205 | Plastic | 1.544 | 56.0 | 1.74 | |
| 12 | | −0.834 | | (ASP) | 0.030 | | | | | |
| 13 | Lens 6 | 3.725 | 3.726 | (FFS) | 0.500 | Plastic | 1.566 | 37.4 | −2.24 | −2.24 |
| 14 | | 0.900 | | (ASP) | 0.402 | | | | | |
| 15 | Lens 7 | 3.479 | | (ASP) | 0.535 | Plastic | 1.566 | 37.4 | −37.58 | |
| 16 | | 2.824 | | (ASP) | 0.700 | | | | | |
| 17 | IR-cut Filter | | Plano | | 0.210 | Glass | 1.517 | 64.2 | — | |
| 18 | | | Plano | | 0.299 | | | | | |
| 19 | Image | | Plano | | 0.000 | | | | | |

Note:
Reference wavelength is 587.6 nm (d-line).
An effective radius of the stop 1601 (Surface 10) is 1.710 mm.

TABLE 24

| Aspheric Coefficients | | | | | |
|---|---|---|---|---|---|
| Surface # | 1 | 2 | 3 | 4 | 6 |
| k= | 7.7827E+00 | 1.7215E+01 | −4.4105E+00 | 6.7995E+00 | −9.0000E+01 |
| A4= | 9.7574E−02 | 1.2035E−01 | 4.6463E−02 | −3.8067E−02 | −3.1175E−02 |
| A6= | −4.9346E−02 | −1.0591E−01 | −9.6329E−02 | 2.0756E−02 | 7.9369E−02 |
| A8= | 2.1452E−02 | 6.4025E−02 | 5.4815E−02 | −1.1344E−01 | −4.1588E−01 |
| A10= | −6.3715E−03 | −2.7616E−02 | −3.6114E−02 | 1.6288E−01 | 8.9175E−01 |
| A12= | 1.2018E−03 | 7.5148E−03 | 2.6225E−02 | −8.9828E−02 | −9.3081E−01 |
| A14= | −1.3255E−04 | −1.1312E−03 | −7.0442E−03 | 4.0551E−02 | 3.5394E−01 |
| A16= | 6.5069E−06 | 7.1606E−05 | — | — | — |
| Surface # | 7 | 8 | 9 | 11 | 12 |
| k= | 1.8813E+00 | 0.0000E+00 | 0.0000E+00 | −2.2937E+00 | −3.7827E+00 |
| A4= | −5.1231E−02 | −1.9053E−01 | −8.1930E−02 | 6.6478E−02 | −1.6119E−01 |
| A6= | −1.5105E−02 | 5.6043E−02 | −1.7204E−01 | −3.2905E−01 | 1.4018E−01 |
| A8= | 2.1827E−02 | −1.1676E−01 | 3.6576E−01 | 6.1529E−01 | −1.1923E−01 |
| A10= | −4.5084E−02 | 1.7126E−01 | −3.4876E−01 | −5.9438E−01 | 9.2334E−02 |
| A12= | 3.9230E−02 | −1.0160E−01 | 1.9893E−01 | 3.4226E−01 | −5.0687E−02 |
| A14= | −1.8435E−02 | 3.6924E−02 | −6.7847E−02 | −1.2185E−01 | 1.7880E−02 |

TABLE 24-continued

| | | | | |
|---|---|---|---|---|
| A16= | −1.1197E−03 | −1.3432E−02 | 1.2625E−02 | 2.6238E−02 | −3.7973E−03 |
| A18= | — | 2.7827E−03 | −9.8114E−04 | −3.1215E−03 | 4.3924E−04 |
| A20= | — | — | — | 1.5687E−04 | −2.1215E−05 |

| Surface # | 14 | 15 | 16 |
|---|---|---|---|
| k= | −5.5931E+00 | −8.6417E+00 | −6.8350E+00 |
| A4= | −4.5178E−02 | 4.7510E−02 | 3.5739E−02 |
| A6= | 2.8666E−02 | −4.6627E−02 | −3.0008E−02 |
| A8= | −1.0527E−02 | 1.7008E−02 | 9.3060E−03 |
| A10= | 2.3272E−03 | −3.4446E−03 | −1.7041E−03 |
| A12= | −3.2001E−04 | 4.3341E−04 | 2.0270E−04 |
| A14= | 2.7152E−05 | −3.5559E−05 | −1.6006E−05 |
| A16= | −1.3739E−06 | 1.9171E−06 | 8.3013E−07 |
| A18= | 3.7890E−08 | −6.5718E−08 | −2.7128E−08 |
| A20= | −4.3691E−10 | 1.3009E−09 | 5.0611E−10 |
| A22= | — | −1.1329E−11 | −4.1092E−12 |

TABLE 25

Freeform Coefficients

| Surface # | 13 |
|---|---|
| kx= | −8.8919E+00 |
| Ax4= | −1.0001E−01 |
| Ax6= | 8.1412E−02 |
| Ax8= | −3.8467E−02 |
| Ax10= | 1.0674E−02 |
| Ax12= | −1.8562E−03 |
| Ax14= | 2.0663E−04 |
| Ax16= | −1.4348E−05 |
| Ax18= | 5.6635E−07 |
| Ax20= | −9.6973E−09 |
| ky= | −8.9018E+00 |
| Ay4= | −9.9999E−02 |
| Ay6= | 8.1411E−02 |
| Ay8= | −3.8467E−02 |
| Ay10= | 1.0674E−02 |
| Ay12= | −1.8562E−03 |
| Ay14= | 2.0663E−04 |
| Ay16= | −1.4348E−05 |
| Ay18= | 5.6635E−07 |
| Ay20= | −9.6975E−09 |

In the 16th embodiment, the equations of the freeform surface profiles of the aforementioned lens elements are the same as the equations of the 8th embodiment, and the equation of the axisymmetric aspheric surface profiles of the aforementioned lens elements is the same as the equation of the 1st embodiment. Also, except for the parameters of f, HFOV, HFOVX, HFOVY, ImgHX, ImgHY, |DSagMax| shown in the following table are the same as those stated in the 8th embodiment, the definitions of the parameters shown in the following table are the same as those stated in the 1st embodiment with corresponding values for the 16th embodiment, so an explanation in this regard will not be provided again.

Moreover, these parameters can be calculated from Table 23, Table 24 and Table 25 as the following values and satisfy the following conditions:

| 16th Embodiment | | | |
|---|---|---|---|
| f [mm] | 3.47 | (R7 + R8)/(R7 − R8) | −0.74 |
| Fno | 2.35 | (|R11| + |R12|)/f | 1.33 |
| HFOV [deg.] | 56.6 | f/|R13| + f/|R14| | 2.23 |
| FOV [deg.] | 113.2 | T23/T34 | 0.53 |
| V1/N1 | 36.30 | TL/ImgH | 1.35 |
| V2/N2 | 36.26 | 100 × |[ImgH − f × tan(HFOV)]/[f × tan(HFOV)]| | 0.54 |

-continued

| 16th Embodiment | | | |
|---|---|---|---|
| V3/N3 | 36.26 | |f1/f2| | 1.13 |
| V4/N4 | 10.90 | |f/f1| + |f/f2| | 0.58 |
| V5/N5 | 36.26 | f3/f2 | 0.37 |
| V6 + V7 | 74.9 | f5/f3 | 0.42 |
| V6/N6 | 23.91 | Y11/Y72 | 0.50 |
| V7/V6 | 1.00 | Y72/f | 1.30 |
| V7/N7 | 23.91 | |DSagMax| [um] | 0.62 |
| f/R1 | −0.43 | |V1 − V2| | 0.09 |
| f/|R1| + f/|R2| | 0.50 | |V3 − V2| | 0.00 |
| (R5 + R6)/(R5 − R6) | 0.80 | V1 + V2 + V3 | 168.04 |

The foregoing description, for the purpose of explanation, has been described with reference to specific embodiments. It is to be noted that TABLES 1-25 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising seven lens elements, and the seven lens elements being, in order from an object side to an image side along an optical path, a first lens element, a second lens element, a third lens element, a fourth lens element, a fifth lens element, a sixth lens element and a seventh lens element;
    wherein there are a total of seven lens elements in the imaging optical lens assembly, the third lens element with positive refractive power has an image-side surface being convex in a paraxial region thereof, the fourth lens element has negative refractive power, the fifth lens element has an object-side surface being concave in a paraxial region thereof, the sixth lens element with negative refractive power has an object-side surface being convex in a paraxial region thereof and an image-side surface being concave in a paraxial region thereof, and the image-side surface of the sixth lens element has at least one critical point in an off-axis region thereof;

wherein a focal length of the imaging optical lens assembly is f, a focal length of the second lens element is f2, a focal length of the third lens element is f3, a curvature radius of an object-side surface of the first lens element is R1, a curvature radius of the object-side surface of the sixth lens element is R11, a curvature radius of the image-side surface of the sixth lens element is R12, an Abbe number of the second lens element is V2, a refractive index of the second lens element is N2, and the following conditions are satisfied:

$-0.60 < f/R1 < 1.10;$ $f3/f2 < 1.60;$ $(|R11|+|R12|)/f < 2.50;$ and $30 < V2/N2.$ 2. The imaging optical lens assembly of claim 1, wherein the fifth lens element has positive refractive power, a maximum field of view of the imaging optical lens assembly is FOV, an f-number of the imaging optical lens assembly is Fno, an axial distance between the object-side surface of the first lens element and an image surface is TL, a maximum image height of the imaging optical lens assembly is ImgH, and the following conditions are satisfied:

85 [deg.] < FOV < 175 [deg.];

$0.80 < Fno < 2.40;$ and $TL/ImgH < 1.75.$

3. The imaging optical lens assembly of claim 1, wherein the focal length of the imaging optical lens assembly is f, a curvature radius of an object-side surface of the seventh lens element is R13, a curvature radius of an image-side surface of the seventh lens element is R14, and the following condition is satisfied:

$f/|R13|+f/|R14| < 1.60.$

4. The imaging optical lens assembly of claim 1, wherein an Abbe number of the first lens element is V1, the Abbe number of the second lens element is V2, an Abbe number of the third lens element is V3, and the following conditions are satisfied:

$|V1-V2| < 10;$ and $|V3-V2| < 10.$

5. The imaging optical lens assembly of claim 1, wherein an Abbe number of the first lens element is V1, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the i-th lens element is Vi, a refractive index of the first lens element is N1, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, and at least one lens element of the imaging optical lens assembly satisfies the following condition:

$Vi/Ni < 12.0,$ wherein $i = 1, 3, 4, 5, 6$ or 7.

6. The imaging optical lens assembly of claim 1, wherein a focal length of the first lens element is f1, the focal length of the second lens element is f2, and the following condition is satisfied:

$0.60 < |f1/f2| < 1.75.$

7. The imaging optical lens assembly of claim 1, wherein an axial distance between the second lens element and the third lens element is T23, an axial distance between the third lens element and the fourth lens element is T34, and the following condition is satisfied:

$0.75 < T23/T34 < 3.0.$

8. The imaging optical lens assembly of claim 1, wherein an Abbe number of the sixth lens element is V6, an Abbe number of the seventh lens element is V7, and the following condition is satisfied:

$0.25 < V7/V6 < 2.0.$

9. The imaging optical lens assembly of claim 1, wherein a maximum image height of the imaging optical lens assembly is ImgH, the focal length of the imaging optical lens assembly is f, a maximum field of view of the imaging optical lens assembly is FOV, half of the maximum field of view of the imaging optical lens assembly is HFOV, and the following conditions are satisfied:

$100 \times |[ImgH - f \times \tan(HFOV)] / [f \times \tan(HFOV)]| < 10$

100 [deg.] < FOV < 175 [deg.]; and

10. The imaging optical lens assembly of claim 1, wherein an Abbe number of the first lens element is V1, the Abbe number of the second lens element is V2, an Abbe number of the third lens element is V3, and the following condition is satisfied:

$160 < V1 + V2 + V3 < 250.$

11. An image capturing unit, comprising:
the imaging optical lens assembly of claim 1; and
an image sensor disposed on an image surface of the imaging optical lens assembly.

12. An electronic device, comprising:
the image capturing unit of claim 11.

13. An imaging optical lens assembly comprising seven lens elements, and the seven lens elements being, in order from an object side to an image side along an optical path, a first lens element, a second lens element, a third lens element, a fourth lens element, a fifth lens element, a sixth lens element and a seventh lens element;
wherein there are a total of seven lens elements in the imaging optical lens assembly, the object-side surface of the first lens element is concave in a paraxial region thereof, the third lens element with positive refractive power has an image-side surface being convex in a paraxial region thereof, the fifth lens element has an object-side surface being concave in a paraxial region thereof, the sixth lens element with negative refractive power has an object-side surface being convex in a paraxial region thereof and an image-side surface being concave in a paraxial region thereof, and the image-side surface of the sixth lens element has at least one critical point in an off-axis region thereof;
wherein a focal length of the imaging optical lens assembly is f, a focal length of the second lens element is f2, a focal length of the third lens element is f3, a curvature radius of an object-side surface of the first lens element is R1, a curvature radius of the object-side surface of the sixth lens element is R11, a curvature radius of the image-side surface of the sixth lens element is R12, an Abbe number of the second lens element is V2, a refractive index of the second lens element is N2, and the following conditions are satisfied:

$$-0.60 < f/R1 < 1.10;$$

$$f3/f2 < 1.60;$$

$$(|R11|+|R12|)/f < 2.50; \text{ and}$$

$$30 < V2/N2.$$

14. The imaging optical lens assembly of claim 13, wherein the object-side surface of the first lens element has a convex critical point in an off-axis region thereof.

15. The imaging optical lens assembly of claim 13, wherein the focal length of the imaging optical lens assembly is f, the curvature radius of the object-side surface of the first lens element is R1, a curvature radius of an image-side surface of the first lens element is R2, and the following condition is satisfied:

$$f/|R1|+f/|R2| < 0.80.$$

16. The imaging optical lens assembly of claim 13, wherein an Abbe number of the first lens element is V1, the Abbe number of the second lens element is V2, an Abbe number of the third lens element is V3, and the following conditions are satisfied:

$$|V1-V2| < 10; \text{ and}$$

$$|V3-V2| < 10.$$

17. The imaging optical lens assembly of claim 13, wherein an Abbe number of the sixth lens element is V6, an Abbe number of the seventh lens element is V7, and the following condition is satisfied:

$$0.25 < V7/V6 < 2.0.$$

18. The imaging optical lens assembly of claim 13, wherein a maximum effective radius of an image-side surface of the seventh lens element is Y72, the focal length of the imaging optical lens assembly is f, and the following condition is satisfied:

$$1.05 < Y72/f < 1.75.$$

19. The imaging optical lens assembly of claim 13, wherein a maximum field of view of the imaging optical lens assembly is FOV, an f-number of the imaging optical lens assembly is Fno, an axial distance between the object-side surface of the first lens element and an image surface is TL, a maximum image height of the imaging optical lens assembly is ImgH, and the following conditions are satisfied:

$$95 \text{ [deg.]} < FOV < 175 \text{ [deg.]};$$

$$0.80 < Fno < 2.40; \text{ and}$$

$$TL/ImgH < 1.75.$$

20. An imaging optical lens assembly comprising seven lens elements, and the seven lens elements being, in order from an object side to an image side along an optical path, a first lens element, a second lens element, a third lens element, a fourth lens element, a fifth lens element, a sixth lens element and a seventh lens element;
wherein there are a total of seven lens elements in the imaging optical lens assembly, the third lens element with positive refractive power has an image-side surface being convex in a paraxial region thereof, the fifth lens element has an object-side surface being concave in a paraxial region thereof, the sixth lens element with negative refractive power has an object-side surface being convex in a paraxial region thereof and an image-side surface being concave in a paraxial region thereof, the object-side surface of the sixth lens element has at least one critical point in an off-axis region thereof, and the image-side surface of the sixth lens element has at least one critical point in an off-axis region thereof;
wherein an f-number of the imaging optical lens assembly is Fno, a focal length of the imaging optical lens assembly is f, a focal length of the third lens element is f3, a focal length of the fifth lens element is f5, a curvature radius of an object-side surface of the first lens element is R1, an Abbe number of the second lens element is V2, an Abbe number of the sixth lens element is V6, an Abbe number of the seventh lens element is V7, a refractive index of the second lens element is N2, and the following conditions are satisfied:

$$0.80 < Fno < 2.40;$$

$$f/R1 < 0.50;$$

$$f5/f3 < 1.20;$$

$$V7/V6 < 2.50; \text{ and}$$

$$30 < V2/N2.$$

21. The imaging optical lens assembly of claim 20, wherein each of at least two lens elements of the imaging optical lens assembly has at least one critical point in an off-axis region thereof.

22. The imaging optical lens assembly of claim 20, wherein the Abbe number of the sixth lens element is V6, the Abbe number of the seventh lens element is V7, and the following condition is satisfied:

$$0.25 < V7/V6 < 2.0.$$

23. The imaging optical lens assembly of claim 20, wherein the focal length of the imaging optical lens assembly is f, a focal length of the first lens element is f1, a focal length of the second lens element is f2, and the following condition is satisfied:

$$|f/f1|+|f/f2| < 0.85.$$

24. The imaging optical lens assembly of claim 20, wherein a maximum field of view of the imaging optical lens assembly is FOV, an axial distance between the object-side surface of the first lens element and an image surface is TL, a maximum image height of the imaging optical lens assembly is ImgH, and the following conditions are satisfied:

$$85 \text{ [deg.]} < FOV < 175 \text{ [deg.]}; \text{ and}$$

$$TL/ImgH < 1.75.$$

25. The imaging optical lens assembly of claim 20, wherein a maximum effective radius of the object-side surface of the first lens element is Y11, a maximum effective radius of an image-side surface of the seventh lens element is Y72, and the following condition is satisfied:

$$0.4 < Y11/Y72 < 1.50.$$

26. The imaging optical lens assembly of claim 20, wherein the second lens element has an object-side surface being convex in a paraxial region thereof and an image-side surface being concave in a paraxial region thereof, an Abbe number of the first lens element is V1, an Abbe number of the third lens element is V3, an Abbe number of the fourth lens element is V4, an Abbe number of the fifth lens element is V5, the Abbe number of the sixth lens element is V6, the Abbe number of the seventh lens element is V7, an Abbe number of the i-th lens element is Vi, a refractive index of the first lens element is N1, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, and at least one lens element of the imaging optical lens assembly satisfies the following condition:

$Vi/Ni<12.0$, wherein $i=1,3,4,5,6$ or $7$.

27. The imaging optical lens assembly of claim 20, wherein a maximum effective radius of an image-side surface of the seventh lens element is Y72, the focal length of the imaging optical lens assembly is f, a maximum image height of the imaging optical lens assembly is ImgH, half of a maximum field of view of the imaging optical lens assembly is HFOV, and the following conditions are satisfied:

$1.05<Y72/f<1.75$; and $100\times|[ImgH-f\times\tan(HFOV)]/[f\times\tan(HFOV)]|<10$.

28. The imaging optical lens assembly of claim 27, wherein at least one of an object-side surface and an image-side surface of at least one of the seven lens elements comprises at least one freeform surface, an effective radius of the at least one freeform surface in a Y-axis direction is SD, a maximum absolute difference between two displacements in parallel with an optical axis respectively from an intersection point between the at least one freeform surface and the optical axis to two points on the at least one freeform surface at a distance of SD from the optical axis in the Y-axis direction and an X-axis direction is |DSagMax|, and the at least one freeform surface satisfies the following condition:

$0.1\ [um]<|DSagMax|$.

29. An imaging optical lens assembly comprising seven lens elements, and the seven lens elements being, in order from an object side to an image side along an optical path, a first lens element, a second lens element, a third lens element, a fourth lens element, a fifth lens element, a sixth lens element and a seventh lens element;
wherein there are a total of seven lens elements in the imaging optical lens assembly, the sixth lens element has an object-side surface being convex in a paraxial region thereof and an image-side surface being concave in a paraxial region thereof, the image-side surface of the sixth lens element has at least one critical point in an off-axis region thereof, and at least one of an object-side surface and an image-side surface of at least one of the seven lens elements comprises at least one freeform surface;
wherein an Abbe number of the second lens element is V2, an Abbe number of the sixth lens element is V6, an Abbe number of the seventh lens element is V7, a maximum field of view of the imaging optical lens assembly is FOV, a refractive index of the second lens element is N2, and the following conditions are satisfied:

$V7/V6<2.50$;

$100\ [deg.]<FOV<175\ [deg.]$; and $30<V2/N2$.

30. The imaging optical lens assembly of claim 29, wherein the first lens element has negative refractive power, the sixth lens element has negative refractive power, an f-number of the imaging optical lens assembly is Fno, an axial distance between an object-side surface of the first lens element and an image surface is TL, a maximum image height of the imaging optical lens assembly is ImgH, and the following conditions are satisfied:

$0.80<Fno<2.40$; and $TL/ImgH<1.75$.

31. The imaging optical lens assembly of claim 29, wherein each of at least two of the seven lens elements has at least one critical point in an off-axis region thereof.

32. The imaging optical lens assembly of claim 29, wherein an Abbe number of the first lens element is V1, the Abbe number of the second lens element is V2, an Abbe number of the third lens element is V3, and the following condition is satisfied:

$160<V1+V2+V3<250$.

33. The imaging optical lens assembly of claim 29, wherein the at least one freeform surface has at least one critical point within a maximum effective radius area in an off-axis region thereof, an effective radius of the at least one freeform surface in a Y-axis direction is SD, a displacement in parallel with an optical axis from an intersection point between the at least one freeform surface and the optical axis to a point on the at least one freeform surface at a distance of SD from the optical axis in the Y-axis direction is SagY, a displacement in parallel with the optical axis from the intersection point between the at least one freeform surface and the optical axis to a point on the at least one freeform surface at a distance of SD from the optical axis in an X-axis direction is SagX, a maximum absolute difference between SagX and SagY is |DSagMax|, and the at least one freeform surface satisfies the following condition:

$0.1\ [um]<|DSagMax|$.

34. The imaging optical lens assembly of claim 29, wherein a maximum image height of the imaging optical lens assembly is ImgH, a focal length of the imaging optical lens assembly is f, half of the maximum field of view of the imaging optical lens assembly is HFOV, and the following condition is satisfied:

$100\times|[ImgH-f\times\tan(HFOV)]/[f\times\tan(HFOV)]|<10$.

35. The imaging optical lens assembly of claim 29, wherein at least one lens surface of an object-side surface and an image-side surface of at least one of the seven lens elements is non-circular.

36. The imaging optical lens assembly of claim 35, wherein the at least one non-circular lens surface is substantially rectangular, and a ratio of a length to a width of the at least one substantially rectangular lens surface ranges from 1.20 to 1.90.

37. The imaging optical lens assembly of claim 29, wherein at least one of the seven lens elements has a positioning structure at a periphery thereof, and the positioning structure comprises at least one pair of flat cut surfaces being parallel to each other.

38. An electronic device, comprising an image capturing unit, wherein the image capturing unit comprises the imaging optical lens assembly of claim 29 and an image sensor, and the image sensor is disposed on an image surface of the imaging optical lens assembly.

* * * * *

UNITED STATES PATENT AND TRADEMARK OFFICE
CERTIFICATE OF CORRECTION

PATENT NO. : 11,719,911 B2
APPLICATION NO. : 17/115731
DATED : August 8, 2023
INVENTOR(S) : Yu Jui Lin It is certified that error appears in the above-identified patent and that said Letters Patent is hereby corrected as shown below:

In the Claims

Column 68, Line 27-Line 28 (Claim 9):
Delete:
"100×|[ImgH-f×tan(HFOV)]/[f×tan(HFOV)]| < 10
100 [deg.] < FOV < 175 [deg.]; and"
And insert therefor:
--100×|[ImgH-f×tan(HFOV)]/[f×tan(HFOV)]| < 10; and
100 [deg.] < FOV < 175 [deg.].--.

Column 69, Line 5 (Claim 13):
Delete:
"-0.60 < f/R1 < 1.10"
And insert therefor:
-- -0.60 < f/R1 < 0.50--.

Signed and Sealed this
Nineteenth Day of September, 2023

Katherine Kelly Vidal
*Director of the United States Patent and Trademark Office*